(12) United States Patent
Fenn et al.

(10) Patent No.: US 12,384,097 B2
(45) Date of Patent: *Aug. 12, 2025

(54) ADDITIVE MANUFACTURING USING REACTIVE COMPOSITIONS

(71) Applicant: PPG Industries Ohio, Inc., Cleveland, OH (US)

(72) Inventors: David R. Fenn, Allison Park, PA (US); Kurt G. Olson, Gibsonia, PA (US); Reza M. Rock, Pittsburgh, PA (US); Cynthia Kutchko, Pittsburgh, PA (US); Susan F. Donaldson, Allison Park, PA (US); Anthony J. Fogl, Swissvale, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 357 days.

This patent is subject to a terminal disclaimer.

(21) Appl. No.: 16/639,877

(22) PCT Filed: Aug. 17, 2018

(86) PCT No.: PCT/IB2018/056254
§ 371 (c)(1),
(2) Date: Feb. 18, 2020

(87) PCT Pub. No.: WO2019/035099
PCT Pub. Date: Feb. 21, 2019

(65) Prior Publication Data
US 2020/0361136 A1 Nov. 19, 2020

Related U.S. Application Data

(63) Continuation-in-part of application No. 15/680,846, filed on Aug. 18, 2017, now Pat. No. 10,434,704.

(51) Int. Cl.
*B29C 64/106* (2017.01)
*B29C 64/205* (2017.01)
(Continued)

(52) U.S. Cl.
CPC .......... *B29C 64/106* (2017.08); *B29C 64/205* (2017.08); *B29C 64/336* (2017.08);
(Continued)

(58) Field of Classification Search
CPC .... B29C 64/106; B29C 64/205; B29C 64/336
See application file for complete search history.

(56) References Cited

U.S. PATENT DOCUMENTS 3,517,082 A 6/1970 Cockerham
3,563,957 A 2/1971 Beebe
(Continued)

FOREIGN PATENT DOCUMENTS

CA 2378348 A1 2/2001
CA 2950215 A1 12/2015
(Continued)

OTHER PUBLICATIONS

Wikipedia contributors. (Jan. 29, 2023). Standard temperature and pressure. In Wikipedia, The Free Encyclopedia. Retrieved 23:35, Feb. 2, 2023, from https://en.wikipedia.org/w/index.php?title=Standard_temperature_and_pressure&oldid=1136174609 (Year: 2023).*
(Continued)

*Primary Examiner* — Michael M. Robinson

(57) ABSTRACT

Methods of additive manufacture using coreactive components are disclosed. Thermosetting compositions for additive manufacturing are also disclosed.

20 Claims, 6 Drawing Sheets

(51) Int. Cl.
| | |
|---|---|
| *B29C 64/336* | (2017.01) |
| *B33Y 10/00* | (2015.01) |
| *B33Y 70/00* | (2020.01) |
| *C08G 18/12* | (2006.01) |
| *C08G 18/50* | (2006.01) |
| *C08G 18/75* | (2006.01) |
| *C08K 3/36* | (2006.01) |
| *C08L 63/00* | (2006.01) |
| *C08L 75/02* | (2006.01) |
| *C08L 81/02* | (2006.01) |

(52) U.S. Cl.
CPC ......... *C08G 18/12* (2013.01); *C08G 18/5024* (2013.01); *C08G 18/755* (2013.01); *C08K 3/36* (2013.01); *C08L 63/00* (2013.01); *C08L 75/02* (2013.01); *C08L 81/02* (2013.01); *B33Y 10/00* (2014.12); *B33Y 70/00* (2014.12)

(56) References Cited

U.S. PATENT DOCUMENTS

| | | | |
|---|---|---|---|
| 3,799,854 A | 3/1974 | Jerabek | |
| 3,919,351 A | 11/1975 | Chang | |
| 4,046,729 A | 9/1977 | Scriven et al. | |
| 4,147,769 A | 4/1979 | Dea et al. | |
| 4,220,679 A | 9/1980 | Backhouse | |
| 4,403,003 A | 9/1983 | Backhouse | |
| 4,546,045 A | 10/1985 | Elias | |
| 4,623,711 A | 11/1986 | Morris et al. | |
| 4,681,811 A | 7/1987 | Simpson et al. | |
| 4,732,790 A | 3/1988 | Blackburn et al. | |
| 4,798,746 A | 1/1989 | Claar et al. | |
| 5,071,904 A | 12/1991 | Martin et al. | |
| 5,114,989 A | 5/1992 | Elwell et al. | |
| 5,262,259 A | 11/1993 | Chou et al. | |
| 5,468,802 A | 11/1995 | Wilt et al. | |
| 5,777,061 A | 7/1998 | Yonek et al. | |
| 6,172,179 B1 | 1/2001 | Zook et al. | |
| 6,259,962 B1 | 7/2001 | Gothait | |
| 6,313,254 B1 | 11/2001 | Meijs et al. | |
| 6,454,972 B1 | 9/2002 | Morisette et al. | |
| 6,509,418 B1 | 1/2003 | Zook et al. | |
| 6,558,753 B1 | 5/2003 | Ylitalo et al. | |
| 6,639,025 B2 | 10/2003 | Sakugawa | |
| 6,875,800 B2 | 4/2005 | Vanier et al. | |
| 6,894,086 B2 | 5/2005 | Munro et al. | |
| 7,009,032 B2 | 3/2006 | Bojkova et al. | |
| 7,247,596 B2 | 7/2007 | Jialanella et al. | |
| 7,390,859 B2 | 6/2008 | Sawant et al. | |
| 7,455,804 B2 | 11/2008 | Patel et al. | |
| 7,531,117 B2 | 5/2009 | Ederer et al. | |
| 7,578,958 B2 | 8/2009 | Patel et al. | |
| 7,767,130 B2 | 8/2010 | Elsner et al. | |
| 7,875,666 B2 | 1/2011 | Gilmore et al. | |
| 7,879,955 B2 | 2/2011 | Rao et al. | |
| 7,955,537 B2 | 6/2011 | Ederer et al. | |
| 7,957,825 B2 | 6/2011 | Marsh et al. | |
| 8,138,273 B2 | 3/2012 | Rao et al. | |
| 8,466,220 B2 | 6/2013 | Rao et al. | |
| 8,535,463 B2 | 9/2013 | Allen et al. | |
| 8,541,513 B2 | 9/2013 | Hobbs et al. | |
| 8,729,216 B2 | 5/2014 | Hobbs et al. | |
| 8,816,023 B2 | 8/2014 | Anderson et al. | |
| 8,876,513 B2 | 11/2014 | Lim et al. | |
| 8,883,392 B2 | 11/2014 | Napadensky et al. | |
| 8,952,124 B2 | 2/2015 | Rao et al. | |
| 8,993,691 B2 | 3/2015 | Anderson et al. | |
| 9,079,833 B2 | 7/2015 | Klobes et al. | |
| 9,122,819 B2 | 9/2015 | McDowell et al. | |
| 9,216,547 B2 | 12/2015 | Elsey | |
| 9,370,132 B2 | 6/2016 | Coppola | |
| 9,382,640 B2 | 7/2016 | Yamagata | |
| 9,422,451 B2 | 8/2016 | Rao et al. | |
| 9,452,445 B2 | 9/2016 | Frankenberger | |
| 9,540,540 B2 | 1/2017 | Rao et al. | |
| 9,650,537 B2 | 5/2017 | Kunc et al. | |
| 9,663,619 B2 | 5/2017 | Echigoya et al. | |
| 9,708,440 B2 | 7/2017 | Das et al. | |
| 9,744,720 B2 | 8/2017 | Napadensk | |
| 9,796,858 B2 | 10/2017 | Powell et al. | |
| 9,862,059 B2 | 1/2018 | Liebl et al. | |
| 9,873,761 B1 | 1/2018 | Das et al. | |
| 9,883,711 B2 | 2/2018 | McDowell et al. | |
| 9,944,826 B2 | 4/2018 | Czaplewski et al. | |
| 9,982,164 B2 | 5/2018 | Rolland et al. | |
| 9,992,917 B2 | 6/2018 | Yanke et al. | |
| 10,005,294 B1 | 6/2018 | Kanungo et al. | |
| 10,016,941 B1 | 7/2018 | Beard et al. | |
| 10,059,595 B1 | 8/2018 | Farbstein | |
| 10,071,350 B2 | 9/2018 | Lewis et al. | |
| 10,074,449 B2 | 9/2018 | White et al. | |
| 10,139,808 B2 | 11/2018 | Engelbart et al. | |
| 10,174,781 B2 | 1/2019 | Zook et al. | |
| 10,232,549 B2 | 3/2019 | Hayes et al. | |
| 10,243,295 B2 | 3/2019 | Matlack et al. | |
| 10,253,195 B2 | 4/2019 | Fenn et al. | |
| 10,259,956 B2 | 4/2019 | Chopra et al. | |
| 10,350,823 B2 | 7/2019 | Rolland et al. | |
| 10,400,057 B2 | 9/2019 | Kwisnek et al. | |
| 10,449,714 B2 | 10/2019 | Achten et al. | |
| 10,464,031 B2 | 11/2019 | Lewis et al. | |
| 10,538,031 B2 | 1/2020 | Chen et al. | |
| 10,625,470 B2 | 4/2020 | Sun et al. | |
| 10,639,842 B2 | 5/2020 | Leibig et al. | |
| 10,639,844 B2 | 5/2020 | Rolland et al. | |
| 10,683,381 B2 | 6/2020 | Abell et al. | |
| 10,688,770 B2 | 6/2020 | Boydston et al. | |
| 10,772,246 B2 | 9/2020 | Speaker et al. | |
| 10,792,860 B2 | 10/2020 | Wantanabe et al. | |
| 10,932,399 B1 | 2/2021 | Nowak et al. | |
| 10,947,969 B2 | 3/2021 | Overend et al. | |
| 10,948,082 B2 | 3/2021 | Delong et al. | |
| 10,968,340 B1 | 4/2021 | Mapkar et al. | |
| 11,192,632 B2 | 12/2021 | Dovey | |
| 11,209,084 B2 | 12/2021 | Dovey | |
| 2001/0043990 A1 | 11/2001 | Chong et al. | |
| 2002/0122928 A1 | 9/2002 | Botrie et al. | |
| 2002/0182339 A1 | 12/2002 | Taylor et al. | |
| 2003/0004599 A1 | 1/2003 | Herbak | |
| 2004/0189311 A1 | 9/2004 | Glezer et al. | |
| 2004/0220327 A1 | 11/2004 | Cosman et al. | |
| 2005/0171275 A1 | 8/2005 | Patel et al. | |
| 2005/0287354 A1 | 12/2005 | Jennings et al. | |
| 2006/0046068 A1* | 3/2006 | Barancyk | C08J 7/042 428/423.1 |
| 2006/0108450 A1 | 5/2006 | Klinkenberg et al. | |
| 2007/0141267 A1 | 6/2007 | Sonnenschein et al. | |
| 2009/0065357 A1 | 3/2009 | Glezer et al. | |
| 2009/0126225 A1 | 5/2009 | Jarvis | |
| 2010/0041839 A1 | 2/2010 | Anderson et al. | |
| 2010/0076143 A1 | 3/2010 | Yakulis et al. | |
| 2010/0113252 A1 | 5/2010 | Bordia et al. | |
| 2010/0234485 A1 | 9/2010 | Kohli et al. | |
| 2010/0286426 A1 | 11/2010 | Cremer | |
| 2012/0117822 A1 | 5/2012 | Jarvis | |
| 2012/0142832 A1 | 6/2012 | Varma et al. | |
| 2012/0159785 A1 | 6/2012 | Pyles et al. | |
| 2012/0244337 A1 | 9/2012 | Gavin | |
| 2012/0313056 A1 | 12/2012 | Baran et al. | |
| 2013/0073073 A1 | 3/2013 | Pettis | |
| 2013/0095253 A1 | 4/2013 | Lindsay et al. | |
| 2013/0196124 A1 | 8/2013 | Flores et al. | |
| 2013/0237661 A1 | 9/2013 | Brust et al. | |
| 2013/0244340 A1 | 9/2013 | Davis et al. | |
| 2013/0253084 A1 | 9/2013 | Duggal et al. | |
| 2013/0271526 A1 | 10/2013 | Ciampini et al. | |
| 2013/0284359 A1 | 10/2013 | Virnelson | |
| 2013/0295290 A1 | 11/2013 | Anderson et al. | |
| 2013/0302575 A1 | 11/2013 | Moegele et al. | |
| 2013/0307730 A1 | 11/2013 | Fang et al. | |
| 2013/0344340 A1 | 12/2013 | Senkfor et al. | |
| 2014/0012406 A1 | 1/2014 | Cioffi et al. | |
| 2014/0017460 A1 | 1/2014 | Xu et al. | |

(56) References Cited

U.S. PATENT DOCUMENTS

| | | |
|---|---|---|
| 2014/0220354 A1 | 8/2014 | Gao et al. |
| 2014/0323647 A1 | 10/2014 | Voit et al. |
| 2014/0331520 A1 | 11/2014 | Yakulus et al. |
| 2015/0014881 A1* | 1/2015 | Elsey .................. B33Y 10/00 425/130 |
| 2015/0307738 A1 | 10/2015 | Schmucker et al. |
| 2015/0321434 A1 | 11/2015 | Sterman et al. |
| 2016/0009029 A1 | 1/2016 | Cohen et al. |
| 2016/0039145 A1 | 2/2016 | Steiner |
| 2016/0083619 A1 | 3/2016 | Anderson et al. |
| 2016/0090507 A1 | 3/2016 | Keledjian et al. |
| 2016/0107391 A1 | 4/2016 | Parish et al. |
| 2016/0152775 A1 | 6/2016 | Tobis et al. |
| 2016/0167299 A1 | 6/2016 | Jallouli et al. |
| 2016/0244628 A1 | 8/2016 | Breton et al. |
| 2016/0244980 A1 | 8/2016 | Urban et al. |
| 2016/0250688 A1 | 9/2016 | Coppola |
| 2016/0256926 A1 | 9/2016 | Ruppert |
| 2016/0257067 A1 | 9/2016 | Boydston et al. |
| 2016/0271872 A1 | 9/2016 | Sand |
| 2016/0271878 A1 | 9/2016 | Nuechterlein et al. |
| 2016/0297104 A1* | 10/2016 | Guillemette .......... B33Y 30/00 |
| 2016/0326386 A1 | 11/2016 | Toyserkani et al. |
| 2016/0332382 A1 | 11/2016 | Coward et al. |
| 2016/0333152 A1 | 11/2016 | Cook et al. |
| 2016/0374428 A1 | 12/2016 | Kormann et al. |
| 2017/0057160 A1 | 3/2017 | Duty et al. |
| 2017/0066196 A1 | 3/2017 | Beard et al. |
| 2017/0114208 A1 | 4/2017 | Rao et al. |
| 2017/0145202 A1 | 5/2017 | Sparks et al. |
| 2017/0246802 A1 | 8/2017 | Pyzik et al. |
| 2017/0260418 A1 | 9/2017 | Wu et al. |
| 2017/0266691 A1 | 9/2017 | Travis |
| 2017/0266877 A1 | 9/2017 | Tyler |
| 2017/0291357 A1 | 10/2017 | Fong et al. |
| 2017/0321083 A1 | 11/2017 | Fenn et al. |
| 2017/0341296 A1 | 11/2017 | Fenn et al. |
| 2017/0347460 A1 | 11/2017 | Cao et al. |
| 2017/0369620 A1 | 12/2017 | Abell et al. |
| 2017/0369737 A1 | 12/2017 | Cui et al. |
| 2018/0029291 A1 | 2/2018 | Matzner et al. |
| 2018/0056582 A1 | 3/2018 | Matusik et al. |
| 2018/0059541 A1 | 3/2018 | Campbell et al. |
| 2018/0086002 A1 | 3/2018 | Sun et al. |
| 2018/0100075 A1 | 4/2018 | Chopra et al. |
| 2018/0127617 A1 | 5/2018 | Kabagambe et al. |
| 2018/0133952 A1 | 5/2018 | Gu et al. |
| 2018/0133953 A1 | 5/2018 | Achten et al. |
| 2018/0133954 A1 | 5/2018 | Watanabe et al. |
| 2018/0155520 A1 | 6/2018 | Nazarpour et al. |
| 2018/0162981 A1 | 6/2018 | Achten et al. |
| 2018/0207863 A1 | 7/2018 | Porter et al. |
| 2018/0215854 A1* | 8/2018 | Paranthaman ..... C08G 18/0838 |
| 2018/0215881 A1 | 8/2018 | Hanan et al. |
| 2018/0223795 A1 | 8/2018 | Tobin et al. |
| 2018/0244854 A1 | 8/2018 | Drazba et al. |
| 2018/0264719 A1 | 9/2018 | Rolland et al. |
| 2018/0273703 A1 | 9/2018 | Rousseaux et al. |
| 2018/0362784 A1* | 12/2018 | Gorin .................. C08K 3/04 |
| 2019/0001553 A1 | 1/2019 | Robeson et al. |
| 2019/0010370 A1 | 1/2019 | Lin et al. |
| 2019/0030795 A1 | 1/2019 | Jiang et al. |
| 2019/0037969 A1* | 2/2019 | Busbee ............. A43B 23/0245 |
| 2019/0040204 A1 | 2/2019 | Beyer et al. |
| 2019/0118497 A1 | 4/2019 | Kierbel et al. |
| 2019/0152133 A1 | 5/2019 | Busbee |
| 2019/0176998 A1 | 6/2019 | Renwick et al. |
| 2019/0217536 A1 | 7/2019 | Honorato et al. |
| 2019/0248065 A1 | 8/2019 | Gorin et al. |
| 2019/0276689 A1 | 9/2019 | Dhoble et al. |
| 2019/0358983 A1 | 11/2019 | Busbee et al. |
| 2020/0131385 A1 | 4/2020 | Bartow et al. |
| 2020/0164572 A1 | 5/2020 | Bartow et al. |
| 2020/0180220 A1 | 6/2020 | Nelson et al. |
| 2020/0217332 A1 | 7/2020 | Mohr et al. |
| 2020/0276797 A1 | 9/2020 | Zdrojek et al. |
| 2020/0312782 A1 | 10/2020 | Eid et al. |
| 2021/0008793 A1 | 1/2021 | Pokrass et al. |

FOREIGN PATENT DOCUMENTS

| | | |
|---|---|---|
| CN | 102896923 A | 1/2013 |
| CN | 104031383 A | 9/2014 |
| CN | 105313332 A | 2/2016 |
| CN | 107471629 A | 12/2017 |
| CN | 109041563 A | 12/2018 |
| CN | 109247005 A | 1/2019 |
| CN | 110628192 A | 12/2019 |
| CN | 111087792 A | 5/2020 |
| CN | 111391305 A | 7/2020 |
| CN | 111774561 A | 10/2020 |
| DE | 19937770 A1 | 2/2001 |
| DE | 102011003619 A1 | 8/2012 |
| DE | 102015220699 A1 | 3/2017 |
| EP | 0437374 B1 | 12/1996 |
| EP | 2416950 A1 | 2/2012 |
| EP | 2658702 A1 | 11/2013 |
| EP | 2719484 A1 | 4/2014 |
| EP | 2851208 A1 | 3/2015 |
| EP | 3059171 A1 | 8/2016 |
| EP | 3232071 A1 | 10/2017 |
| EP | 3550142 A1 | 10/2019 |
| EP | 3626442 A1 | 3/2020 |
| EP | 3626443 A1 | 3/2020 |
| FR | 3039553 A1 | 2/2017 |
| JP | H03-210364 A | 9/1991 |
| JP | H04-366617 A | 12/1992 |
| JP | 2001-518408 A | 10/2001 |
| JP | 2002-166460 A | 6/2002 |
| JP | 2003-506228 | 2/2003 |
| JP | 2011-105906 A | 6/2011 |
| JP | 5085800 B1 | 11/2012 |
| JP | 2013-136724 A | 7/2013 |
| JP | 2014-521797 A | 8/2014 |
| JP | 2015-512816 A | 4/2015 |
| JP | H06-026637 B2 | 11/2015 |
| JP | 2016-530430 A | 9/2016 |
| JP | 62-53354 B2 | 12/2017 |
| JP | 2018-002896 A | 1/2018 |
| JP | 2018-502197 A | 1/2018 |
| JP | 2019-504919 A | 2/2019 |
| KR | 101891560 A | 3/2018 |
| KR | 10-2018-0104558 A | 9/2018 |
| RU | 2247087 C2 | 2/2005 |
| RU | 2332265 C2 | 8/2008 |
| RU | 2532190 C2 | 10/2014 |
| RU | 2014113527 A | 10/2015 |
| RU | 2673840 C1 | 11/2018 |
| RU | 2677143 C1 | 1/2019 |
| TW | 201509698 A | 3/2015 |
| TW | 201821248 A | 6/2018 |
| WO | 2001/010630 A1 | 2/2001 |
| WO | 2004/076852 A1 | 9/2004 |
| WO | 2006/073695 A1 | 7/2006 |
| WO | 2007/044735 A2 | 4/2007 |
| WO | 2010/024904 A1 | 3/2010 |
| WO | 2013/091003 A1 | 6/2013 |
| WO | 2016/061060 A1 | 4/2016 |
| WO | 2016/085914 A1 | 6/2016 |
| WO | 2016/085976 A1 | 6/2016 |
| WO | 2016/106352 A1 | 6/2016 |
| WO | 2016085992 A1 | 6/2016 |
| WO | 2016/149032 A1 | 9/2016 |
| WO | 2016/164562 A1 | 10/2016 |
| WO | 2016/182805 A1 | 11/2016 |
| WO | 2016/201103 A1 | 12/2016 |
| WO | 2017/087055 A1 | 5/2017 |
| WO | 2017/112682 A1 | 6/2017 |
| WO | 2017095658 A1 | 6/2017 |
| WO | 2017/144461 A1 | 8/2017 |
| WO | 2018/005686 A1 | 1/2018 |
| WO | 2018/007579 A1 | 1/2018 |
| WO | 2017/130685 A1 | 2/2018 |
| WO | 2018/026829 A1 | 2/2018 |

(56) References Cited

FOREIGN PATENT DOCUMENTS

| WO | 2018/031532 A1 | 2/2018 |
| --- | --- | --- |
| WO | 2018/049038 A1 | 3/2018 |
| WO | 2018/072034 A1 | 4/2018 |
| WO | 2018/085650 A1 | 5/2018 |
| WO | 2017/092764 A1 | 6/2018 |
| WO | 2018/106822 A1 | 6/2018 |
| WO | 2018/113875 A1 | 6/2018 |
| WO | 2018/157148 A1 | 8/2018 |
| WO | 2019089235 A1 | 5/2019 |
| WO | 2019/173511 A1 | 9/2019 |
| WO | 2019/191509 A1 | 10/2019 |
| WO | 2019/204770 A1 | 10/2019 |
| WO | 2019/217848 A1 | 11/2019 |
| WO | 2019/224699 A1 | 11/2019 |
| WO | 2020/107365 A1 | 6/2020 |
| WO | 2020/147567 A1 | 7/2020 |
| WO | 2020/251661 A1 | 12/2020 |

OTHER PUBLICATIONS

International Search Report and Written Opinion for Application No. PCT/US2020/039557, mailed on Oct. 8, 2020, 13 pages.
Rios et al., "Evaluation of Advanced Polymers for Additive Manufacturing", CRADA Final Report, Sep. 8, 2017.
International Search Report and Written Opinion for Application No. PCT/US2015/062297, mailed on Mar. 4, 2016, 10 pages.
International Search Report and Written Opinion for Application No. PCT/US2015/062445, mailed on Mar. 1, 2016, 10 pages.
International Search Report and Written Opinion for Application No. PCT/US2015/062412, mailed on Mar. 2, 2016, 9 pages.
International Search Report and Written Opinion for Application No. PCT/IB2018/056254, mailed on Nov. 19, 2018, 10 pages.
International Search Report and Written Opinion for Application No. PCT/US2019/026672, mailed on Jul. 25, 2019, 12 pages.
International Preliminary Report on Patentability for Application No. PCT/US2015/062297, mailed on May 30, 2017, 7 pages.
International Preliminary Report on Patentability for Application No. PCT/US2015/062445, mailed on May 30, 2017, 8 pages.
International Preliminary Report on Patentability for Application No. PCT/US2015/062412, mailed on May 30, 2017, 7 pages.
First Report for Australian Application No. 2015 353730, mailed on Mar. 15, 2018, 6 pages.
First Report for Australian Application No. 2015 353634, mailed on Mar. 5, 2018, 6 pages.
First Report for Australian Application No. 2015 353618, mailed on Sep. 21, 2017, 6 pages.
Canadian Office Action for Application No. 2,968,549, mailed on May 7, 2018, 4 pages.
Canadian Office Action for Application No. 2,968,670, mailed on Jun. 11, 2018, 3 pages.
Canadian Office Action for Application No. 2,968,538, mailed on Jun. 6, 2018, 4 pages.
Russia Office Action for Application No. 2017121858, mailed on May 16, 2018, 2 pages.
Russia Office Action for Application No. 2017122126, mailed on May 16, 2018, 4 pages.
Asif, M. et al., "A new photopolymer extrusion 5-axis 3D printer," Additive Manufacturing, 2018, vol. 23, p. 355-361.
Asif, M. et al., "A New 3D Printing Technique Using Extrusion of Photopolymer," Conference Paper, Jan. 2017, 11 pages.
"The JEFFAMINE® Polyetheramines," Huntsman, 2007, 6 pages.
Broekaert, "Polyurea Spray Coatings: The Technology and Latest Developments," Paint & Coatings Industry, Mar. 2002, 15 pages.
Formlabs White Paper: 3D Printing with Desktop Stereolithography, An Introduction for Professional Users, Jun. 2015, retrieved from https://archive-media.formlabs.com/upload/Intro-sla-whitepaper-04.pdf, 12 pages.
Hurlbert. "Visual perception: Learning to see through noise", Current Biology, Mar. 2000, vol. 10, No. 6, p. R231-R233.
Kitano, H. et al., "Unexpected Visible-Light-Induced Free Radical Photopolymerization at Low Light Intensity and High Viscosity Using a Titanocene Photoinitiator," Journal of Applied Polymer Science, 2013, p. 611-618.
Krober, P. et al., "Reactive inkjet printing of polyurethanes," Journal of Material Chemistry, 2009, vol. 19, p. 5234-5238.
Quadion LLC, Minnesota Rubber and Plastic, Thermoset Plastics vs Thermoplastics, https://www.mnrubber.com/Design_Guide/5-2.html, Oct. 25, 2014, accessed Nov. 7, 2019.
Smith, P. et al., "Reactive inkjet printing," Journal of Materials Chemistry, 2012, vol. 22, p. 10965-10970.
Zhu et al., "Water-based coatings for 3D printed parts", Journal of Coatings Technology and Research, Jul. 2015, vol. 12, No. 5, p. 889-897.
International Search Report and Written Opinion for Application No. PCT/US2020/017428, mailed on Jul. 29, 2020, 18 pages.
International Search Report and Written Opinion for Application No. PCT/US2020/017455, mailed on May 25, 2020, 11 pages.
International Search Report and Written Opinion for Application No. PCT/US2020/017464, mailed on May 25, 2020, 9 pages.
International Search Report and Written Opinion for Application No. PCT/US2020/017417, mailed on Jun. 12, 2020, 10 pages.
International Search Report and Written Opinion for Application No. PCT/US2020/017441, mailed on Jun. 22, 2020, 8 pages.
Viscosity of Water, retrieved from https://www.engineersedge.com/physics/water_density_viscosity_specific_weight_13146.htm, accessed Apr. 20, 2020, first published Jun. 25, 2014.
Universal Selector by SpecialChem, Desmophen® 550 U Technical Data Sheet—Supplied by Covestro, Mar. 4, 2021, 2 pages, http://coatings.specialchem.com.
Covestro Desmodur® VL Product Data Sheet, Sep. 1, 2015, 3 pages.
Arapov, K. et al., "Conductivity Enhancement of Binder-Based Graphene Inks by Photonic Annealing and Subsequent Compression Rolling," Advanced Engineering Materials, 2016, 6 pages.
Atif, R. et al., "Mechanical, Thermal, and Electrical Properties of Graphene-Epoxy Nanocomposites—A Review," Polymers, 2016, vol. 8, No. 281, 37 pages.
Lan, Y. et al., "Electrically conductive thermoplastic polyurethan/polypropylene nanocomposites with selectively distributed graphene," Polymer, 2016, vol. 97, p. 11-19.
Strankowski, M. et al., "Morphology, Mechanical and Thermal Properties of Thermoplastic Polyurethane Containing Reduced Graphene Oxide ad Graphene nanoplatelets," Materials, 2018, vol. 11, No. 82, 18 pages.

\* cited by examiner

ADDITIVE MANUFACTURING USING REACTIVE COMPOSITIONS

GOVERNMENT LICENSE RIGHTS

This invention was made with government support under Contract Number DE-AC05-00OR22725 awarded by the U.S. Department of Energy and under Cooperative Research and Development Agreement NFE-14-05242. The government has certain rights in the invention.

This application claims the benefit of U.S. application Ser. No. 15/680,846 filed on Aug. 18, 2017, which is incorporated by reference in its entirety.

FIELD

The present invention relates to compositions and methods for additive manufacturing of coreactive materials including polyureas.

BACKGROUND

Additive manufacturing is an area of significant interest. Many additive manufacturing methods using a wide variety of materials have been developed, each having their own advantages and disadvantages.

In PCT International Publication No. WO 2016/085914 additive manufacturing using coreactive components is disclosed. The rheological parameters of coreactive compositions were determined and correlated with manufacturability.

SUMMARY

According to the present invention, methods of reactive additive manufacturing comprise providing a first component comprising a first compound into a first pump; providing a second component comprising a second compound into a second pump, wherein the first compound is reactive with the second compound; pumping the first component from the first pump, and pumping the second component from the second pump through a mixer to provide a coreactive composition; and depositing the coreactive composition.

According to the present invention, extrudates are formed by methods according to the present invention.

According to the present invention, objects are formed using the methods according to the present invention.

Reference is now made to certain compounds and methods. The disclosed embodiments are not intended to be limiting of the claims. To the contrary, the claims are intended to cover all alternatives, modifications, and equivalents.

BRIEF DESCRIPTION OF THE DRAWINGS

The drawings described herein are for illustration purposes only. The drawings are not intended to limit the scope of the present disclosure.

DETAILED DESCRIPTION

Figure 1:
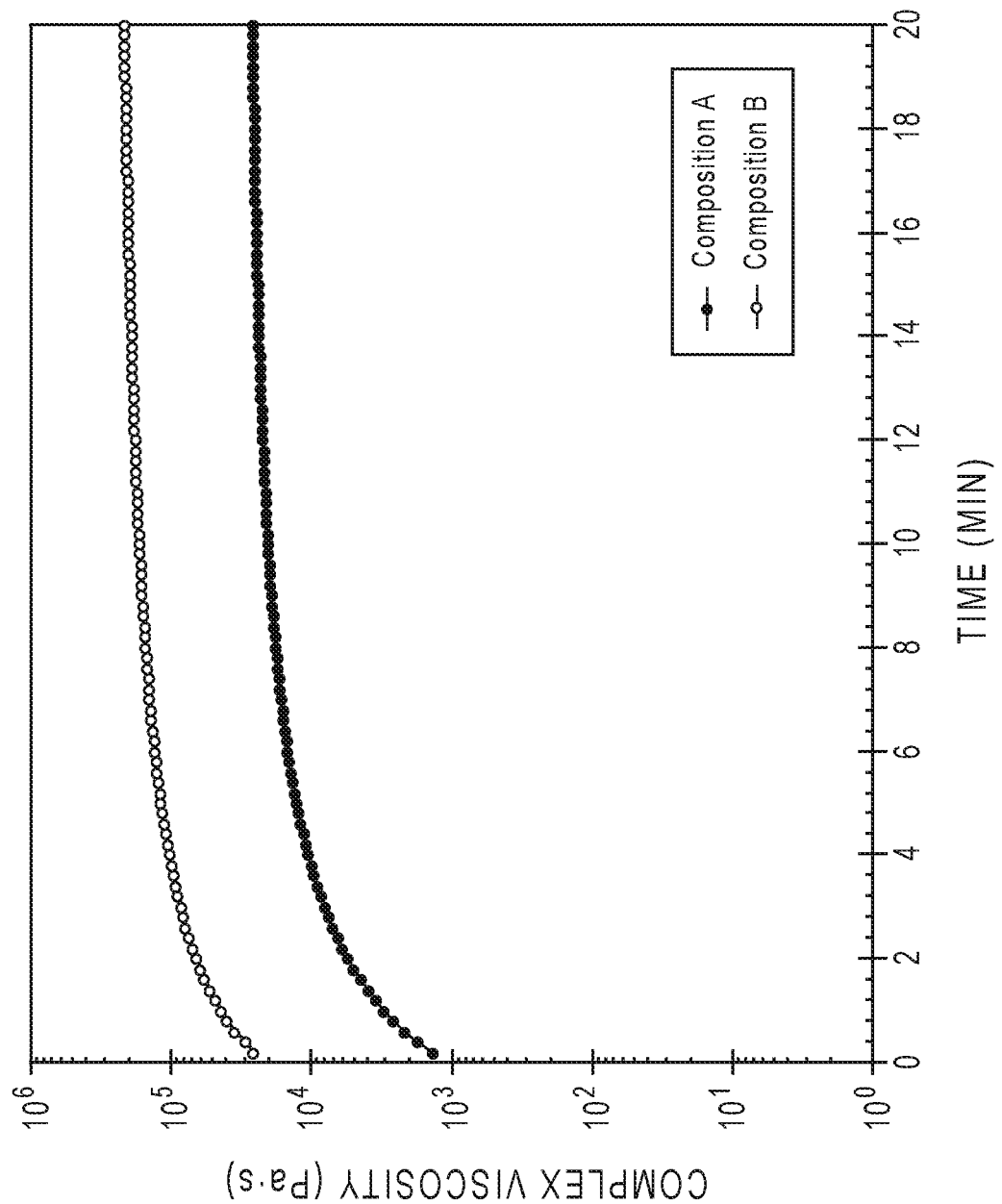
FIG. 1 is a graph showing the complex viscosity during cure for two polyurea compositions.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

"Extrusion" refers to a process used to create objects in which material is pushed through a die. An extrusion die has a shape and dimensions suitable to build an object. An extrusion die may have a fixed shape or a shape that can be changed during extrusion. Co-extrusion can be used to combine one or more compositions in the extrudate. Co-extrusion can be used to provide regions having different compositions across the profile of a part. For example, a core of an extrudate can have one composition, one side of the extrudate can have a second composition, and one side of the extrudate can have a third composition. For example, a part can be fabricated having an aesthetic exterior surface and an electrically conductive inner surface.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means chemical reaction product(s) of the recited reactants and can include partial reaction products as well as fully reacted products and other reaction products that are present in a lesser amount.

"Monomer" refers to compounds characterized, for example, by a molecular weight less than 1,000 Daltons, less than 800 Daltons, less than 600 Daltons, less than 500 Daltons, or less than 400 Daltons. A monomer may or may not have repeating units. A monomer can comprise two or more, such 2 to 6, reactive functional groups. A monomer encompasses certain polyfunctionalizing agents.

"Polyfunctionalizing agent" refers to a compound having reactive functionality of three or more, such as from 3 to 6. A polyfunctionalizing agent can have three reactive functional groups and can be referred to as a trifunctionalizing agent. A polyfunctionalizing agent can have, for example, reactive terminal thiol groups, reactive terminal alkenyl groups, reactive isocyanate groups, reactive epoxy groups, reactive Michael donor groups, reactive Michael acceptor groups, or reactive amine. A polyfunctionalizing agent can have a calculated molecular weight, for example, less than 2,000 Daltons, less than 1,800 Daltons, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, or less than 200 Daltons. For example, a polyfunctionalizing agent can have a calculated molecular weight from 100 Daltons to 2,000 Daltons, from 200 Daltons to 2,000 Daltons, from 200 Daltons to 1,800 Daltons, from 300 Daltons to 1,500 Daltons, or from 300 Daltons to 1,000 Daltons.

A polyfunctionalizing agent can have the structure of Formula (1):

B{—V—R}$_z$      (1)

where B is the core of the polyfunctionalizing agent, each V is an organic moiety, each R is a moiety terminated in a reactive functional group such as a thiol group, an alkenyl group, an epoxy group, an isocyanate group, an amine group, a Michael acceptor group, or other functional group disclosed herein, and z is an integer from 3 to 6, such as 3, 4, 5, or 6. In polyfunctionalizing agents of Formula (1), each V can independently be, for example, $C_{2-10}$ alkanediyl, $C_{2-10}$ heteroalkanediyl, substituted $C_{2-10}$ alkanediyl, or substituted $C_{2-10}$ heteroalkanediyl; and each R can be a reactive functional group.

Examples of suitable alkenyl-terminated polyfunctionalizing agents include triallyl cyanurate (TAC), triallylisocyanurate (TATC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris [2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Suitable polythiol polyfunctionalizing agents are commercially available, for example, from Bruno Bock Thiochemicals under the Thiocuret tradename.

Examples of suitable polyamine polyfunctionalizing agents include trianino nonane.

Examples of suitable polyisocyanate polyfunctionalizing agents include polysiocyanate trimers, such as trimers of hexamethylene diisocyanate isocyanurate or isophorone diisocyanate isocyanurate, or the corresponding allophonates or biurets.

"Prepolymer" refers to a compound having repeat units in backbone and can be characterized, for example, by a weight average molecular weight from 1,000 Daltons to 20,000 Daltons, from 1,000 Daltons to 10,000 Daltons, or from 2,000 Daltons to 5,000 Daltons. A prepolymer includes homopolymers, copolymers, and oligomers. A weight average molecular weight of a prepolymer can be determined by gel permeation chromatography (GPC) using appropriate standards, in many cases polystyrene or sulfonated polystyrene. "Prepolymer" refers to oligomers, homopolymers, and copolymers including block copolymers and graft copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer such as a thiol-terminated sulfur-containing prepolymer provided by the present disclosure can be combined with a curing agent to provide a curable composition, which can cure to provide a cured polymer network. Prepolymers are liquid at room temperature (25° C.) and pressure (760 torr; 101 kPa).

"Reactive functional group" refers to a chemical group capable of chemically reacting with another reactive functional group to form a covalent bond.

"Co-reactive composition" refers to a composition comprising at least two compounds capable of chemically reacting with each other to form covalent bonds.

"Gel time" refers to the duration from when a coreactive composition is first mixed to the time the composition becomes a solid and is no longer stirrable by hand.

"Tack free time" refers to the duration from when a reactive composition is first mixed to the time a cotton ball applied to the surface of the reactive composition does not adhere.

"Full cure time" refers to duration between the time when mutually reactive components are first combined and mixed to form a reactive composition until the time when the hardness of the composition no longer increases.

"Isocyanate" refers to a —N=C=O group.

"Alkenyl" refers to a —CH=CH$_2$ group.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

"Thiol" refers to an —SH group.

"Amine" refers to a —N(R)$_2$ group where each R is independently selected from hydrogen and an organic group. An amine can comprise a primary amine group (—NH$_2$), a secondary amine group (—NH—), a tertiary amine group (—NH$_3$), or a combination of any of the foregoing.

"Michael donor" refers to compounds capable of reacting with activated alkenyl groups in a 1,4-addition reaction. Examples of Michael donors include activated methylenes such as malonates and nitroalkanes.

"Michael acceptor" refers to an activated alkene, such as an alkenyl group proximate to an electron-withdrawing group such as a ketone, nitro, halo, nitrile, carbonyl, or nitro group. Michael acceptors are well known in the art A "Michael acceptor group" refers to an activated alkenyl group and an electron-withdrawing group. A Michael acceptor group can be selected from a vinyl ketone, a vinyl sulfone, a quinone, an enamine, a ketimine, oxazolidine, and an acrylate. Other examples of Michael acceptors are disclosed in Mather et al., *Prog. Polym. Sci.* 2006, 31, 487-531, and include acrylate esters, acrylonitrile, acrylamides, maleimides, alkyl methacrylates, cyanoacrylates. Other Michael acceptors include vinyl ketones, α,β-unsaturated aldehydes, vinyl phosphonates, acrylonitrile, vinyl pyridines, certain azo compounds, β-keto acetylenes and acetylene esters.

"Actinic radiation" refers to energy that can be applied to a composition to generate a reaction initiating species from a photopolymerization initiator upon irradiation therewith, and includes, for example, α-rays, γ-rays, X-rays, ultraviolet (UV) light, visible light, infrared, or an electron beam.

"Residence time" refers to the duration after two mutually reactive components are first mixed to form a coreactive composition until the time the coreactive composition is extruded from a deposition apparatus such as, for example, the time when the coreactive composition is extruded from a nozzle connected to a mixer. For example, a nozzle can have a length between where the nozzle is coupled to a mixer and the exit orifice, and the length of time that a coreactive composition is in the nozzle is the residence time.

Specific gravity is determined according to ASTM D1475.

Shore A hardness is measured using a Type A durometer in accordance with ASTM D2240.

Tensile strength and elongation are measured according to AMS 3279.

"Viscosity" is measured using an Anton Paar MCR 302 rheometer with a gap from 1 mm at 25° C. and a shear rate of 100 sec$^{-1}$. "Low shear viscosity" is measured using an Anton Paar MCR 302 rheometer with a gap from 1 mm at 25° C. and a shear rate of 1 sec$^{-1}$. High shear viscosity" is measured using an Anton Paar MCR 302 rheometer with a gap from 1 mm at 25° C. and a shear rate of 100 sec$^{-1}$. Dynamic viscosity is measured using an Anton Paar MCR 302 rheometer with a 25 mm-diameter parallel plate spindle, an oscillation frequency of 1 Hz and amplitude of 0.3%, and with a rheometer plate temperature of 25° C.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Additive manufacturing using coreactive components has several advantages compared to alternative additive manufacturing methods. Additive manufacturing using coreactive components can create stronger parts because the materials forming successive layers can be co-reacted to from covalent bonds between the layers. Also, because the components have a low viscosity when mixed higher filler content can be used. The higher filler content can be used to modify the mechanical and/or electrical properties of the materials of the built object. Coreactive components can extend the chemistries used in additively manufactured parts to provide improved properties such as solvent resistance, electrical conductive, thermal conductivity, and light weight. Finally, because the curing rate of the coreactive compounds can be fast, coreactive additive manufacturing can facilitate the use of high deposition speeds.

For additive manufacturing of coreactive components it is generally desirable that the rate of reaction between the reactive components and/or the deposition process be controlled such that the composition maintains a relatively low viscosity during deposition and then increases rapidly to provide a stable base upon which to apply subsequent layers. The low viscosity during deposition can facilitate faster printing rates.

There are a number of chemistries that can be employed in additive manufacturing of coreactive components. Examples of coreactive systems include polyisocyanates and polyamines which form polyureas. Polyureas are attractive for use in reactive additive manufacturing. The reaction of polyisocyanates and polyamines can proceed rapidly at room temperature thereby avoid the need to control heat flow during deposition. The polyurea reaction can also proceed rapidly in the absence of a catalyst.

The present disclosure is directed to the production of structural objects using three-dimensional printing. A three-dimensional object may be produced by forming successive portions or layers of an object by depositing a coreactive composition comprising at least two coreactive components onto a substrate and thereafter depositing additional portions or layers of the coreactive composition over the underlying deposited portion or layer and/or adjacent the previously deposited portion or layer. Layers can be successively deposited adjacent a previously deposited layer to build a printed object. A coreactive composition can be mixed and then deposited or the reactive components be deposited separately. When deposited separately, the reactive components can be deposited simultaneously, sequentially, or both simultaneously and sequentially.

A coreactive composition refers to a composition having at least one first compound that is reactive with a least one second compound. A first component can comprise the at least one first compound, and a second component can comprise the at least one second compound. In addition to the first compound and the second compound the respective first and second components can comprise other reactive components and additives such as fillers, rheology modifiers, adhesion promoters and others. The at least one first compound can comprise a first functional group and the at least one second compound can comprise a second functional group, where the first functional group is reactive with the second functional group. The first functional group can be reactive with the second functional group at 25° C. and in the absence of a catalyst. The first compound and the second compound can have a single reactive functional group, but generally comprise two or more reactive functional groups such as from 2 to 20 functional groups, from 2 to 16, from 2 to 12, from 2 to 8, from 2 to 6, from 2 to 4, or from 2 to 3 reactive functional groups. The reactive functional groups can terminal functional groups, pendent functional groups, or a combination of terminal and pendent functional groups.

A first component and a second component can be combined and mixed to provide a coreactive composition.

Deposition and similar terms refer to the application of a printing material comprising a thermosetting or coreactive composition and/or its reactive components onto a substrate (for a first portion of the object) or onto previously deposited portions or layers of the object. Each coreactive component may independently include monomers, prepolymers, adducts, and/or crosslinking agents, which can chemically react with the constituents of another coreactive component.

By "portions of an object" is meant subunits of an object, such as layers of an object. The layers may be on successive horizontal parallel planes. The portions may be parallel planes of the deposited material or beads of the deposited material produced as discreet droplets or as a continuous stream of material. The at least two reactive components may each be provided neat or may also include a solvent (organic and/or water) and/or other additives as described below. Reactive components provided by the present disclosure may be substantially free of solvent. By substantially free is meant that the reactive components comprise less than 5 wt %, less than 4 wt %, less than 2 wt %, or less than 1 wt % of solvent, where wt % is based on the total weight of a reactive component. Similarly, a coreactive composition provided by the present disclosure may be substantially free of solvent, such as having less than 5 wt %, less than 4 wt %, less than 2 wt %, or less than 1 wt % of solvent, where wt % is based on the total weight of the coreactive composition.

The at least two coreactive components may be mixed together and subsequently deposited as a mixture of coreactive components that react to form portions of an object. For example, two coreactive components may be mixed together and deposited as a mixture of coreactive components that react to form a thermoset by delivery of at least two separate streams of the coreactive components into a mixer such as a static mixer and/or a dynamic mixer to produce a single stream that is then deposited. The coreactive components may be at least partially reacted by the time a coreactive composition comprising the reaction mixture is deposited. The deposited reaction mixture may react at least in part after deposition and may also react with previously deposited portions and/or subsequently deposited portions of the object such as underlying layers or overlying layers of the object.

Two or more reactive components can be deposited using any suitable equipment. The selection of suitable deposition equipment depends on a number of factors including the deposition volume, the viscosity of the composition and the complexity of the part being fabricated. Each of the two or more reactive components can be introduced into an independent pump and injected into a mixer to combine and mix the two reactive components. A nozzle can be coupled to the mixer and the mixed coreactive composition can be pushed under pressure or extruded through the nozzle.

A pump can be, for example, a positive displacement pump, a syringe pump, a piston pump, or a progressive cavity pump. The two pumps delivering the two reactive components can be placed in parallel or placed in series. A suitable pump can be capable of pushing a liquid or viscous liquid through a nozzle orifice. This process can also be referred to as an extrusion. A reactive component can be introduced into the mixer using two pumps in series.

For example, the two or more coreactive components can be deposited by dispensing materials through a disposable nozzle attached to a progressive cavity two-component dosing system such as a ViscoTec co-DUO 450 precision dosing system, where the coreactive components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the coreactive materials form an extrudate to provide an initial layer of coreactive material and successive layers on a base. The deposition system can be positioned orthogonal to the base, but also may be set at any suitable angle to form the extrudate such that the extrudate and deposition system form an obtuse angle with the extrudate being parallel to the base. The extrudate refers to the combined coreactive components, i.e., a coreactive composition, that have been mixed, for example, in a static mixer or in a dynamic mixer.

The base, the deposition system, or both the base and the deposition system may be moved to build up a three-dimensional object. The motion can be made in a predetermined manner, which may be accomplished using any suitable CAD/CAM method and apparatus such as robotics and/or computerize machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of coreactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two coreactive components and feed the coreactive materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the coreactive materials. The dispensing section can be, for example, a straight tube having any of the above orifice diameters. The length of the dispensing section can be configured to provide a region in which the coreactive components can begin to react and build viscosity before being deposited on the object. The length of the dispensing section can be selected, for example, based on the speed of deposition, the rate of reaction of the co-reactants, and the desired viscosity. Co-reactants can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates. The flow rate can be, for example, from 1 mL/min to 20 mL/min, from 2 mL/min to 15 mL/min, from 3 mL/min to 10 mL/min, or from 4 mL/min to 8 mL/min, through a nozzle having a diameter, for example, from 0.8 mm to 1 mm. In general, a suitable residence time is less than the gel time of the coreactive composition. A suitable gel time can be less than 10 min, less than 8 min, less than 6 min, less than 5 min, less than 4 min, less than 3 min, less than 2 min, or less than 1 min. A gel time of the coreactive composition can be, for example, from 0.5 min to 10 min, from 1 min to 7 min, from 2 min to 6 min, or from 3 min to 5 min.

A coreactive composition can have a gel time, for example, less than 5 minutes, less than 4 minutes, less than 3 minutes, less than 2 minutes, less than 1 minute, less than 45 seconds, less than 30 seconds, less than 15 seconds, or less than 5 seconds. A coreactive composition can have a gel time, for example, from 0.1 seconds to 5 minutes, from 0.2 seconds to 3 minutes, from 0.5 seconds to 2 minutes, from 1 second to 1 minute, or from 2 seconds to 40 seconds.

A static and/or dynamic mixing nozzle can be heated or cooled to control, for example, the rate of reaction between the coreactive compounds and/or the viscosity of the coreactive compounds. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the coreactive compounds.

Coreactive compositions useful in additive manufacturing can exhibit a tack free time measured using a cotton ball test as described in the examples of longer than 3 minutes, longer than 4 minutes, longer than 5 minutes, or longer than 6 minutes after mixing the coreactive compositions. Coreactive compositions having a tack free time less than 3 minutes tend to cure too fast for practical application. For example, such coreactive compositions can become too viscous in the static and/or dynamic mixing nozzle and can clog the nozzle. A coreactive composition can have a tack free time, for example, from 3 minutes to 20 minutes, from 4 minutes to 15 minutes, or from 5 minutes to 10 minutes.

Coreactive compositions useful in additive manufacturing can have a G"/G' ratio (ratio of shear loss modulus G" to shear storage modulus G'), for example, greater than 2, greater than 3 or greater than 4, determined at t=0 after mixing the coreactive compositions.

Suitable coreactive chemistries include polyurea chemistries. As an example of a polyurea chemistry, a polyisocyanate can comprise a polyisocyanate prepolymer and/or polyisocyanate monomer, and a polyamine component can comprise a polyamine prepolymer and/or polyamine monomer.

A polyisocyanate and/or a polyamine can be difunctional, trifunctional, or a combination thereof. A polyisocyanate and/or polyamine can comprise prepolymers and/or monomers having a functionality, for example, from 2 to 6, such as from four (4) to six (6).

A polyisocyanate prepolymer and/or polyamine prepolymer can have a number average molecular weight, for example, from 500 Daltons to 20,000 Daltons, from 1,000 Daltons to 10,000 Daltons, from 1,000 Daltons to 8,000 Daltons, from 1,000 Daltons to 6,000 Daltons, from 1,500 Daltons to 5,500 Daltons, or from 2,000 Daltons to 6,000 Daltons.

A polyisocyanate can comprise the reaction product of reactants comprising a polyol prepolymer and a polyisocyanate such as a diisocyanate and/or the reaction product of reactants comprising a polyamine prepolymer and a polyisocyanate such as a diisocyanate.

A polyisocyanate can be prepared by reacting a polytetramethylene ether glycol such as Polymeg® (LyondellBasell) having a molecular weight within a range from 500 Daltons to 2,500 Daltons with a diisocyanate such as isophorone diisocyanate.

A polyisocyanate can be prepared by reacting a polyetheramine such as Jeffamine® (Huntsman), e.g., a polyoxypropylenediamine, having a molecular weight within a range from 500 Daltons to 2,500 Daltons with a diisocyanate such as isophorone diisocyanate.

Reactive compositions provided by the present disclosure can comprise a filler. For example, a reactive composition can comprise from 0.1 wt % to 30 wt %, from 0.1 wt % to 20 wt %, from 2 wt % to 20 wt %, or from 5 wt % to 15 wt %, where wt % is based on the total weight of the coreactive composition. The polyisocyanate component, the polyamine component, or both the polyisocyanate and polyamine components can comprise filler.

To facilitate complete mixing of the co-reactants in the static and/or dynamic mixing nozzle, it can be useful that the viscosity of the coreactive compositions be similar such as, for example, within 5%, within 10%, within 20%, within 30%, within 40%, or within 50% of each other. A filler can be added to impart certain properties to a built object and/or as rheology modifier. The viscosity can be modified with additives such as rheology modifiers, reactive diluents, and/or solvents. For coreactive components having different viscosities, a longer mixing tube can be used to facilitate complete mixing.

When using a coreactive system in which one component comprises a higher molecular weight prepolymer and the second component comprises a lower molecular weight curing agent, it can be desirable to increase the viscosity of the second component comprising the lower molecular weight curing agent. Increasing the amount (wt %) filler in the reactive composition can increase the initial viscosity of a component and can slow the increase in viscosity of the curing composition.

Figure 2:
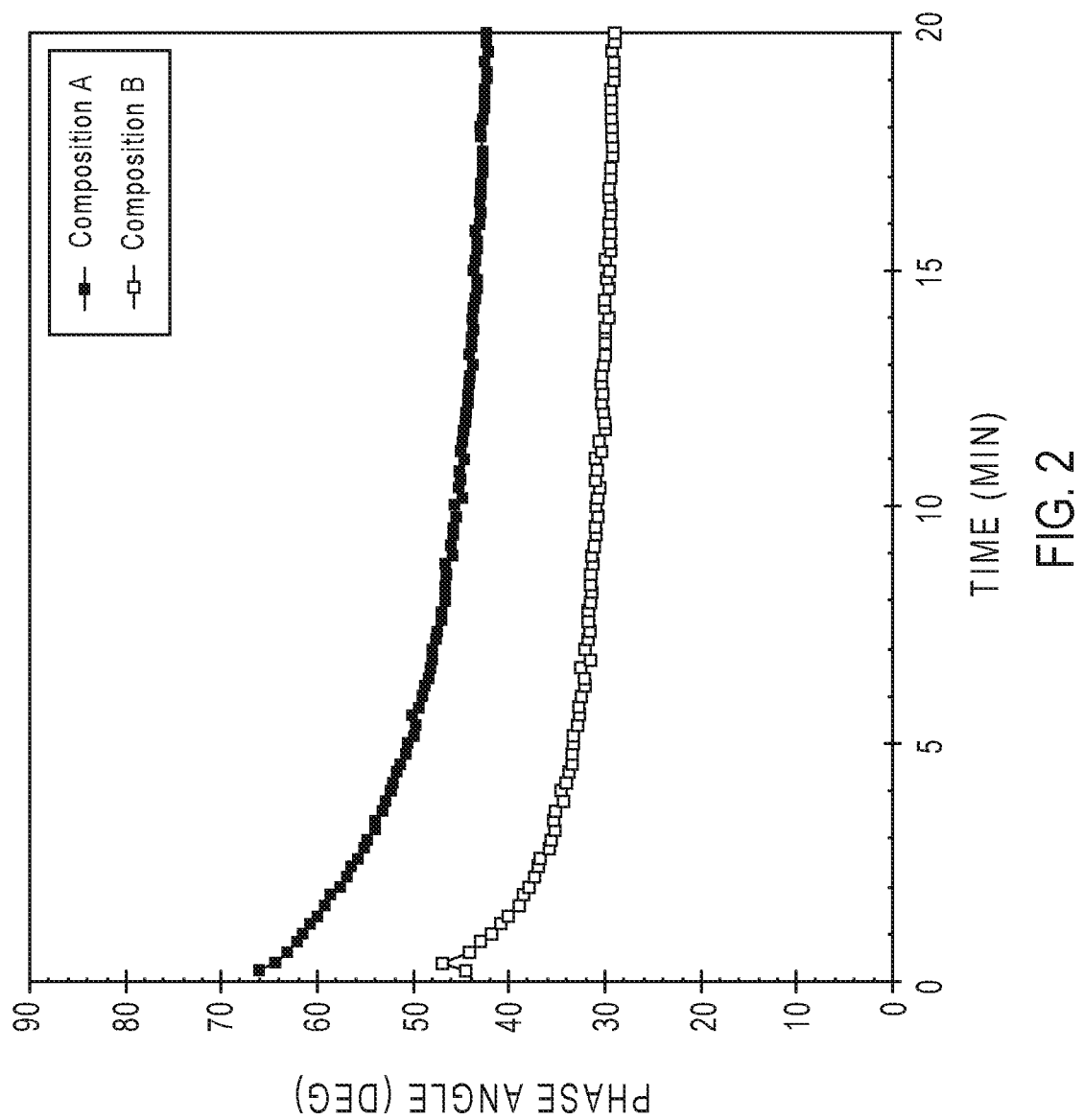
FIG. 2 is a graph showing the phase angle of the viscosity during cure for two polyurea compositions.

The complex viscosity |η*| and the phase angle δ for two compositions after mixing with a polyamine curing agent are shown in FIGS. 1 and 2, respectively. Note that the compositions referred to in the figures as Composition A and Composition B do not correspond to the compositions evaluated in Example 1.

Composition B (with Jeffamine® D-2000/IPDI) is more elastic than composition A (with Polymeg® 2000/IPDI). A complex viscosity |η*| within a range from about $10^4$ Pa×s to $10^5$ Pa×s is suitable for additive manufacturing and provides successful builds. However, as reflected in the low initial phase angle of about 45° (FIG. 2), composition B rapidly cures rendering the material unsuitable for additive manufacturing. Composition A, on the other hand begins with an initial phase angle δ of about 650 and does not fall to 45 until about 8 minutes after the polyisocyanate and polyamine components are first mixed. Based on these studies, a composition is no longer printable when the phase angle is 450 and less.

Figure 3:
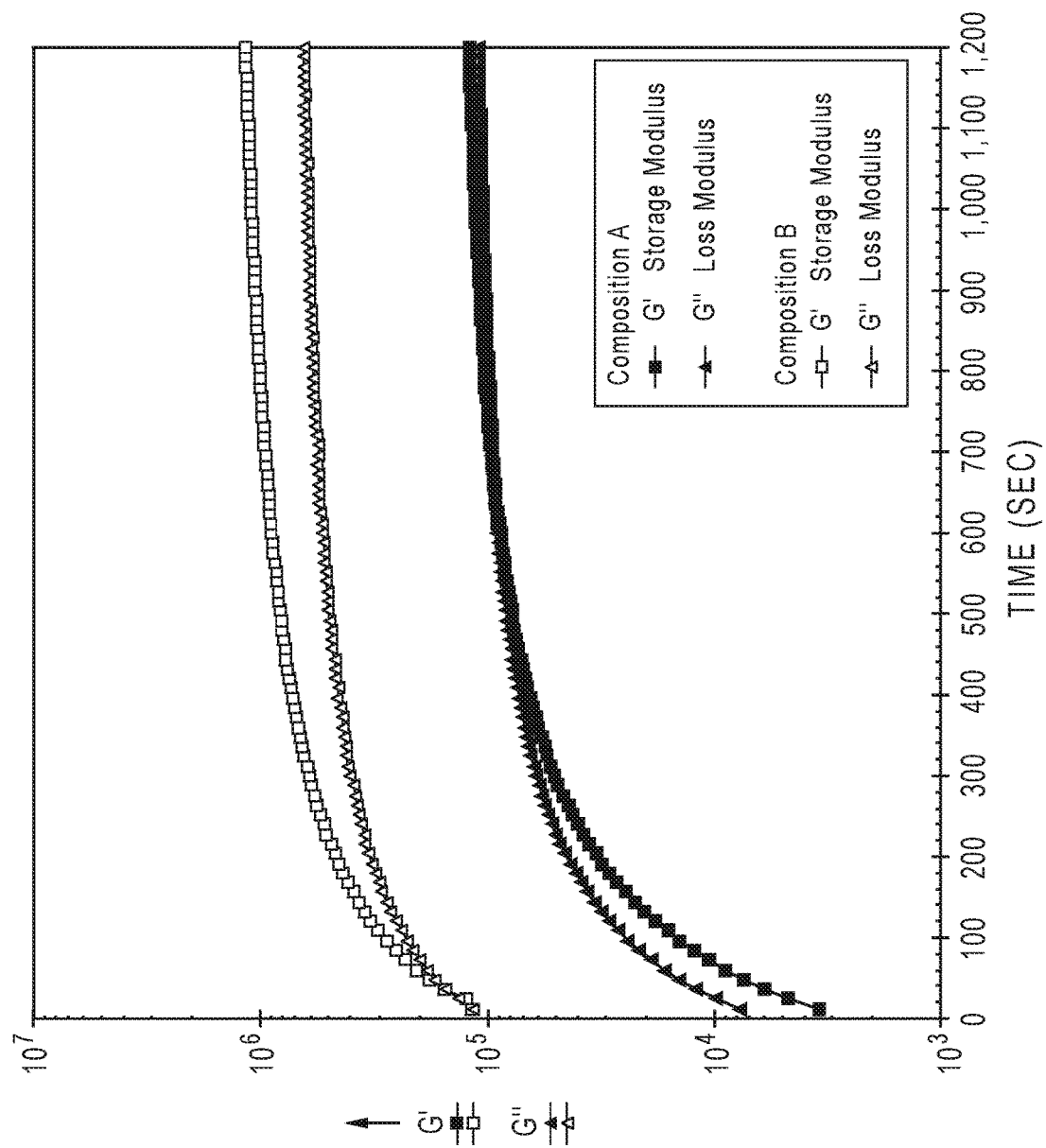
FIG. 3 shows the shear storage modulus G' and the shear loss modulus G" during cure for two polyurea compositions.

FIG. 3 shows the shear storage modulus G' and the shear loss modulus G" with time for two coreactive compositions. Composition A comprising Polymeg® 2000/IPDI, Jeffamine® T-5000, and 5 wt % filler exhibited an initial modulus ratio G"/G' of about 2 and after about 7 minutes reached a ratio of about 1.

In comparison, reactive composition B comprising Jeffamine® D-2000/IPDI Jeffamine® T-5000, and 5 wt % filler exhibited an initial modulus ratio G"/G' of about 1 and increased overtime to a ratio less than 1.

Phase angle δ depicted in FIG. 2 is calculated from the values reported in FIG. 3 using the relation tan δ=G"/G'.

Figure 4:
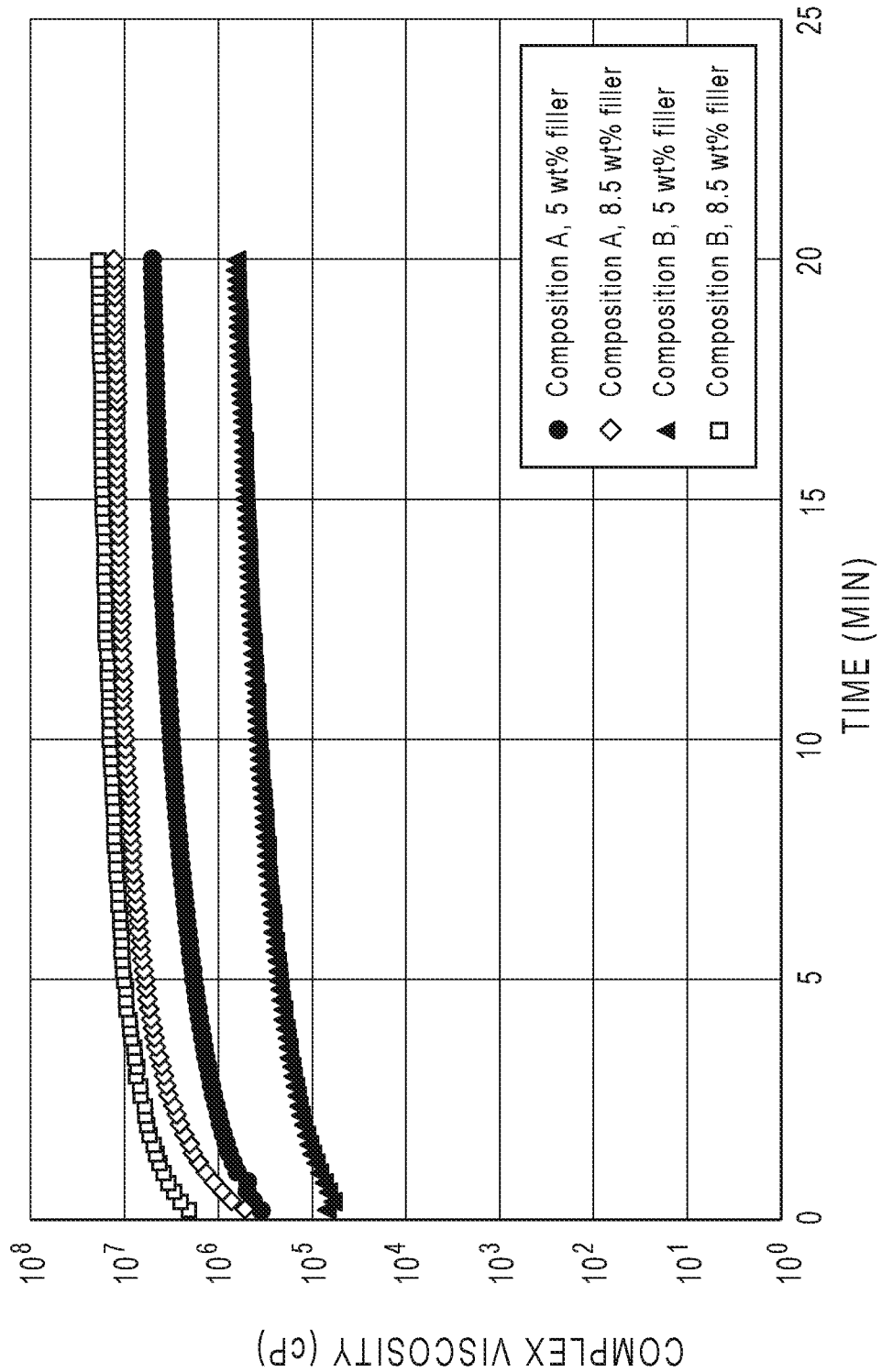
FIG. 4 is a graph showing the complex viscosity during cure for four polyurea compositions.
Figure 5:
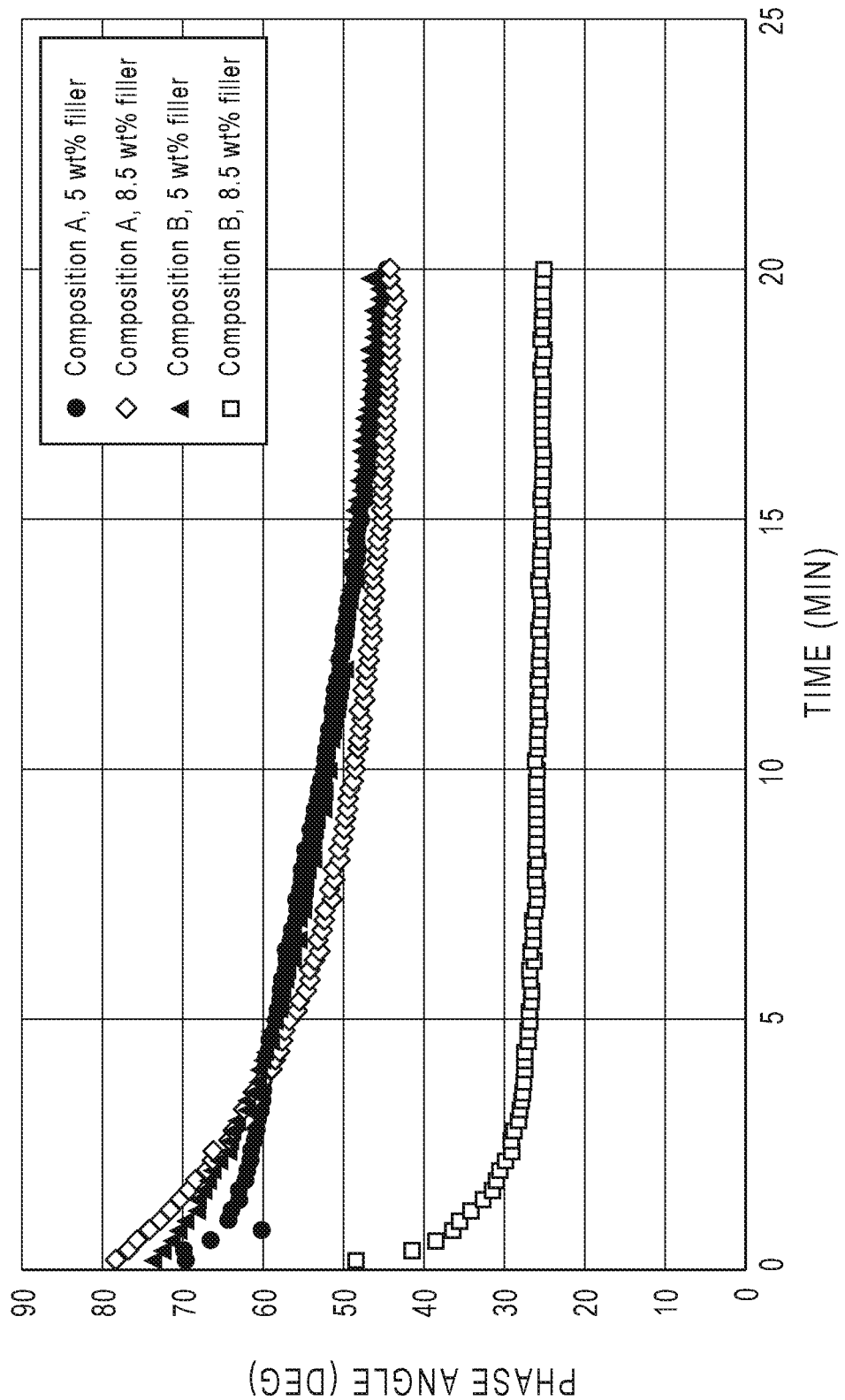
FIG. 5 is a graph showing the complex viscosity during cure for four polyurea compositions.

FIGS. 4 and 5 shown the complex viscosity |η*| and phase angle δ, respectively for various compositions having different amounts of filler. Composition A included Polymeg® 2000/IPDI combined with Jeffamine® T5000, Clearlink® 1000, Petrolite® T5000, and filler. Composition B included Jeffamine® D2000/IPDI combined with Jeffamine® T5000, Clearlink® 1000, Petrolite® T5000, and filler. The amount of the Cabosil® TS-720 fumed silica is indicated in the figures.

Also, the initial storage modulus G' and shear loss modulus G" was about one (1) order of magnitude less for the Polymeg® 2000 composition compared to the Jeffamine® D-2000 composition.

Based on the experimental results, it was determined that compositions having the following properties after mixing the coreactive components, either independently or in various combinations can be successfully printed using, for example, a two-component progressive cavity pump: initial G"/G' ratio is within a range from 1 to 5, such as greater than 2, greater than 3 or greater than 4; initial phase angle δ within a range from 45 to 890; tan δ>45 at 7 minutes and/or initial viscosities of the single coreactive components differ from each other by no more than 20%.

Figure 6:
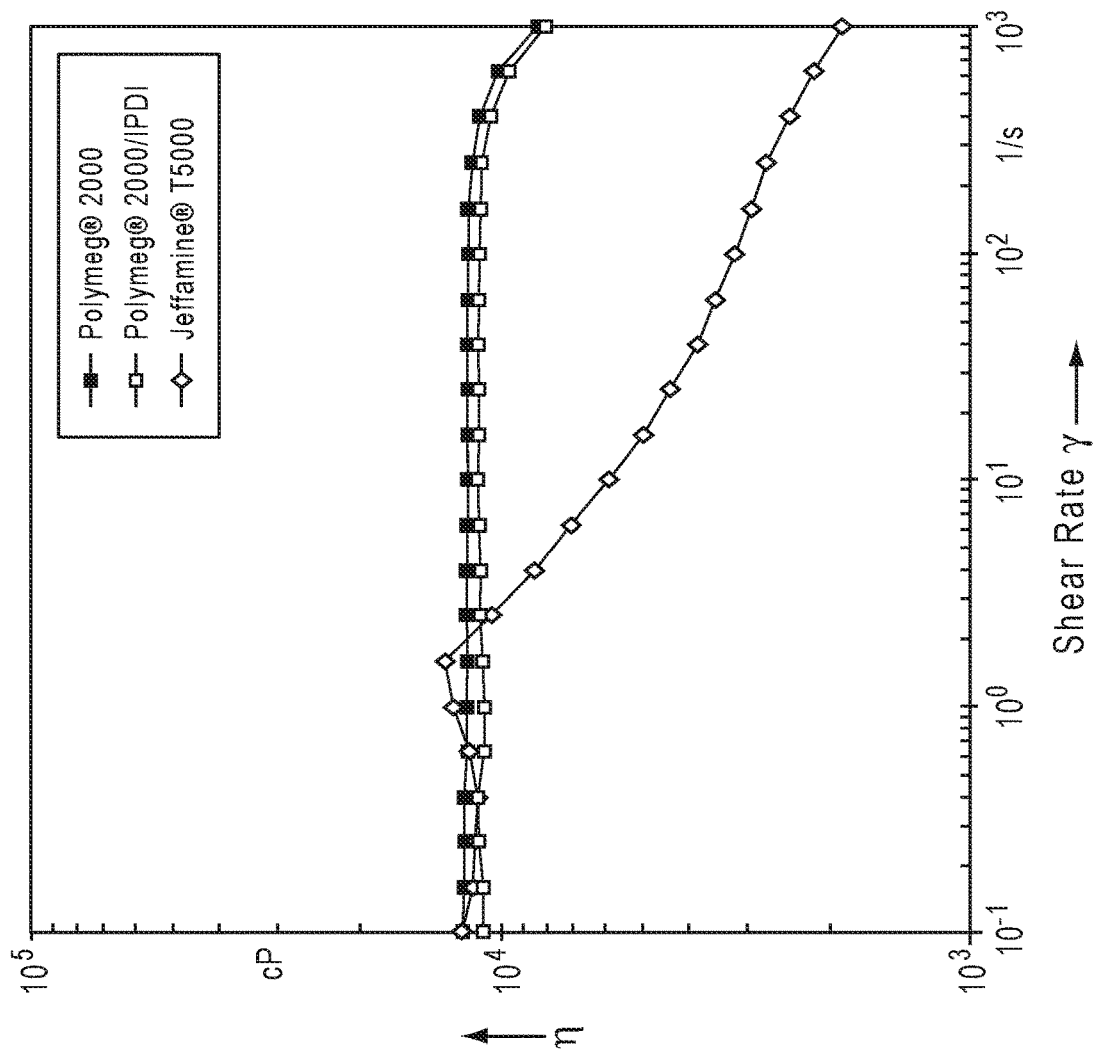
FIG. 6 is a graph showing the dependence of the viscosity $\eta$ (cP) on the shear rate $\gamma$ ($sec^{-1}$) for three (3) prepolymers.

FIG. 6 shows the shear dependent viscosity for six (6) prepolymers. Polymeg® 2000, IPDI-terminated Polymeg® 2000, and Jeffamine® T-5000 have similar viscosities at shear rates from 0.1 sec$^{-1}$ to about 2 sec$^{-1}$.

For polyurea curing chemistries in additive manufacturing it can be useful for the a coreactive composition to have a viscosity, for example, within a range from $0.7 \times 10^4$ cP to $0.1.3 \times 10^4$ cP, from $0.8 \times 10^4$ cP to $1.2 \times 10^4$ cP, or from $0.9 \times 10^4$ cP to $1.1 \times 10^4$ cP, measured using an Anton Paar MCR 301 or 302 rheometer with a gap set to 1 mm, with a 25 mm-diameter parallel plate spindle, and an oscillation frequency of 1 Hz and amplitude of 0.3%.

The high viscosity and short gel time of the Jeffamine®-derived prepolymer, Jeffamine® T-500 in FIG. 6, may also be due to the presence of pendent hydroxyl groups that can increase the hydrogen bonding between prepolymers.

Throughout an additively printed object, different parts of an object may be formed using different proportions of the two coreactive components such that different parts of an object may be characterized by different material properties. For example, some parts of an object may be rigid and other parts of an object may be flexible.

It will be appreciated that the viscosity, reaction rate, and other properties of the coreactive components may be adjusted to control the flow of the coreactive components and/or the thermosetting compositions such that the deposited portions and/or the object achieves and retains a desired structural integrity following deposition. The viscosity of the coreactive components may be adjusted by the inclusion of a solvent, or the coreactive components may be substantially free of a solvent or completely free of a solvent. The viscosity of the coreactive components may be adjusted by the inclusion of a filler, or the coreactive components may be substantially free of a filler or completely free of a filler. The viscosity of the coreactive components may be adjusted by using components having lower or higher molecular weight. For example, a coreactive component may comprise a prepolymer, a monomer, or a combination of a prepolymer and a monomer. The viscosity of the coreactive components may be adjusted by changing the deposition temperature.

The co-reactive components may have a viscosity and temperature profile that may be adjusted for the particular deposition method used, such as mixing prior to deposition and/or ink-jetting. The viscosity may be affected by the composition of the coreactive components themselves and/or may be controlled by the inclusion of rheology modifiers as described herein.

It can be desirable that the viscosity and/or the reaction rate be such that following deposition of the coreactive components the composition retains an intended shape following deposition. For example, if the viscosity is too low and/or the reaction rate is too slow a deposited composition may flow in a way the compromises the desired shape of a finished object. Similarly, if the viscosity is too high and/or the reaction rate is too fast, the desired shape may be compromised.

For example, each of the coreactive components that are deposited together may each independently have a viscosity at 25° C. and a shear rate at 0.1 sec$^{-1}$ to 100 sec$^{-1}$ from 200 cP to 20,000,000 cP, from 1,000 cP to 18,000,000 cP, from 5,000 cP to 15,000,000 cP, from 5,000 cP to 10,000,000 cP, from 5,000 cP to 5,000,000 cP, from 5,000 cP to 1,000,000 cP, from 5,000 cP to 100,000 cP, from 5,000 cP to 50,000 cP, from 5,000 centipoise (cP) to 20,000 cP, from 6,000 cP to 15,000 cP, from 7,000 cP to 13,000 cP, or from 8,000 cP to 12,000 cP. Viscosity values are measured using an Anton Paar MCR 302 rheometer with a gap from 1 mm at a temperature of 25° C. and a shear rate of 100 sec$^{-1}$. A suitable viscosity can depend on several factors including the deposition system used for printing, the dimensions of the system, the deposition speed, and the cure rate of the reactive components.

The coreactive composition form from the combination of the two or more reactive components can have a dynamic viscosity, for example, from 200 cP to 20,000,000 cP, from 1,000 cP to 18,000,000 cP, from 5,000 cP to 15,000,000 cP, from 5,000 cP to 10,000,000 cP, from 5,000 cP to 5,000,000 cP, from 5,000 cP to 1,000,000 cP, from 5,000 cP to 100,000 cP, from 5,000 cP to 50,000 cP, from 5,000 centipoise (cP) to 20,000 cP, from 6,000 cP to 15,000 cP, from 7,000 cP to 13,000 cP, or from 8,000 cP to 12,000 cP.

The rate of interlayer crosslinking between successive and adjacent layers of a deposited object can be controlled to facilitate interlayer reaction and thereby improve the interlayer strength. For example, it can be desirable that adjacent layers be covalently bonded to each other. To accomplish this, a second layer can be deposited onto a first layer before the first layer is fully cured such that the first layer has unreacted functional groups capable of reacting with functional groups of the second layer. The rate of interlayer crosslinking can be controlled, for example, by adjusting the time between deposition of successive layers, adjusting the temperature, adjusting the concentration of a catalyst, and/or adjusting the components of the composition such as the amount of monomer and prepolymer. A deposited layer may be homogeneous, or a deposited layer may be inhomogeneous. For an inhomogeneous layer, a cross-section of the layer may have different chemical compositions. For example, to improve interlayer adhesion, a part of a layer may have an excess of a certain coreactive functionality that can then react with an excess of a coreactive functionality of an overlying layer. Similarly, to improve interlayer adhesion, a lower part of a layer may have an excess of a certain coreactive functionality that can then react with an excess of a coreactive functionality of an underlying layer. To improve interlayer bonding and/or adhesion, a tie coating, film, or layer may be applied or deposited over a deposited layer prior to or during deposition of an overlying layer. The interlayer tie layer can include, for example, compounds reactive with the adjoining layers, catalysts, and/or adhesion promoters. An interlayer tie coat can be applied to a surface of the extrudate by coextrusion.

The coreactive components may include a first compound having at least two functional groups per molecule (referred to as the "A" functional groups) and a second compound having at least two functional groups per molecule (referred to as the "B" functional groups), where the A functional groups and the B functional groups are coreactive with each other, are different from each other, and at least one of the two coreactive compounds includes a saturated functional group.

A "saturated functional group" refers to a functional group of a coreactive compound that does not include an unsaturated reactive group, although there may be unsaturation in other (non-reactive) portions of the compound. An example of a saturated group includes thiol groups and an example of an unsaturated group includes alkenyl and acrylate groups. Examples of saturated functional groups include thiol, hydroxyl, primary amine, secondary amine, and epoxy groups. In certain compositions, a saturated functional group can be a thiol, a primary amine, a secondary amine, or a combination of any of the foregoing. In certain compositions, a saturated functional group can be a thiol, a primary amine, a secondary amine, an epoxy, or a combination of any of the foregoing. Examples of unsaturated functional groups include alkenyl groups, activated unsaturated groups such as acrylate, maleic, or fumaric acid groups, isocyanate groups, acyclic carbonate groups, acetoacetate groups, carboxylic acid groups, Michael acceptor groups, vinyl ether groups, (meth)acrylate groups, and malonate groups.

In certain compositions a saturated group comprises amine groups, and an unsaturated group comprises isocyanate groups.

Compositions provided by the present disclosure can comprise a first compound comprising a first functional group, and a second compound comprising a second functional group, wherein the second functional group is reactive with the first functional group. Compositions provided by the present disclosure can comprise a first compound comprising a first functional group, and a second compound comprising a second functional group, wherein the second functional group is reactive with the first functional group, and both of the functional groups do not comprise ethylenically unsaturated groups. Examples of ethylenically unsaturated groups include (meth)acrylate groups, Michael acceptor groups, and vinyl ether groups.

In certain compositions provided by the present disclosure the first component and the second component do not include a polyisocyanate and a polyol.

B functional groups may be capable of reacting with the A functional groups at moderate temperature such as less than 140° C., less than 100° C., less than 60° C., less than 50° C., less than 40° C., less than 30° C., or less than 25° C. The A and B functional groups may react together at room temperature such as 25° C. One or both of the coreactive components may have on average more than two reactive groups per molecule, in which case the mixture of coreactive components comprises a thermosetting composition. Suitable coreactive functional groups are described, for example, in Noomen, Proceedings of the XIIIth International Conference in Organic Coatings Science and Technology, Athens, 1987, page 251; and in Tillet et al., *Progress in Polymer Science*, 36 (2011), 191-217, which is incorporated by reference in its entirety. The reaction between the A groups and the B groups may not involve the elimination of a by-product. Such reactions are often referred to as addition reactions. Examples of suitable coreactive functional groups A and B are listed in Table 1.

TABLE 1

Functional Groups.

| Functional Groups A | Functional Groups B |
| --- | --- |
| Carboxylic acid | Epoxy |
| Activated unsaturated groups such as acrylate, maleic or fumaric | Primary or secondary amine |
| Isocyanate | Primary or secondary amine |
| Isocyanate | Hydroxyl |
| Cyclic carbonate | Primary or secondary amine |
| Acetoacetate | Primary or secondary amine |
| Epoxy | Primary or secondary amine |
| Thiol | Alkenyl |
| Thiol | Vinyl ether |
| Thiol | (Meth)acrylate |
| Activated unsaturated groups such as acrylate or maleic | Malonate |

A first coreactive component may include compounds having more than one type of functional group A, and the second coreactive component may include compounds having more than one type of functional group B, such that an additive manufacturing material can comprise at least two sets of coreactive A and B groups, wherein at least one coreactive compound has a functional group that is saturated. For example, a first coreactive component may have compounds with hydroxyl groups and secondary amine groups (i.e., at least two different functional groups) and the second coreactive component may have compounds with isocyanate groups. One or both of the coreactive components may optionally comprise a catalyst for catalyzing the reaction between the A groups and the B groups.

The A groups and the B groups may be attached to any suitable compound such as a monomer and/or a prepolymer. The A groups and the B groups may be attached to a prepolymer such as polyester, polyurethane, or acrylic prepolymer.

The functional groups A and B may be terminal groups and/or pendent groups. A coreactive compound can have a functionality of two or a functionality greater than two, such as a functionality from 2 to 6. Each functional group of a coreactive compound can be the same or certain functional groups of a coreactive compound can be different. For example, a coreactive compound can have more than one different type of functional group reactive with an isocyanate, such as a primary amine group, a secondary amine group, or a hydroxyl group.

In a composition comprising at least two coreactive compounds, the first compound can comprise a polyamine and the second compound can comprise a polyisocyanate; the first compound can comprise a polyalkenyl compound and the second compound can comprise a polythiol; or the first compound can comprise a Michael addition acceptor and the second compound can comprise a Michael addition donor. In a composition comprising at least two coreactive compounds, the first compound can comprise an isocyanate-functional prepolymer; and the second compound can comprise a compound such as a monomer and/or prepolymer comprising a primary amine, a secondary amine, a hydroxyl, or a combination of any of the foregoing. In a composition comprising at least two coreactive compounds, the first compound can comprise a polythiol and the second compound can comprise a polyepoxide; or the first compound can comprise a polyamine and the second compound can comprise a polyepoxide A coreactive composition for additive manufacturing can comprise a first compound comprising a first functional group, and a second compound comprising a second functional group, wherein the first and second functional groups are reactive with each other, and at least one of the first functional group and the second functional group comprises a saturated functional group. One of the first and second functional groups may be an unsaturated functional group, or both the first and second functional groups may be a saturated functional group. Both the first functional group and the second functional groups are not unsaturated functional groups. A composition provided by the present disclosure may contain additional coreactive components, which may comprise saturated and/or unsaturated functional groups.

The coreactive functional groups can react to form covalent bonds. The reaction between the coreactive functional groups can be catalyzed by a catalyst. The catalyst can comprise a catalyst effective in catalyzing the reaction between the coreactive compounds and the coreactive functional groups. In certain compositions, the reaction between the coreactive functional groups does not involve a free-radical initiated reaction. Compositions provided by the present disclosure can be thermoset compositions.

Compositions provided by the present disclosure may include two coreactive components or more than two coreactive components. A reactive component can comprise a combination of reactive compounds having the same functional group, such as a combination of monomers and prepolymers having the same functional group. An additional coreactive component, e.g., a third coreactive component, can comprise a compound having a different functional group reactive with a first functional group or the second functional group. An additional coreactive component can impart an additional property to the composition. For example, the reaction rate of the additional coreactive component with one of the other coreactive components may be rapid and thereby facilitate the ability of a deposited layer to maintain a desired shape before the other coreactive components fully cure. For example, the composition having a faster reaction rate can form the core of an extrusion or a surface of an extrusion and the composition having a slower reaction rate can form the exterior surface of the extrusion or the core of the extrusion, respectively.

The first component and the second component can be combined in a suitable ratio to forma curable coreactive composition. For example, the functional Group A to functional Group B equivalent ratio of a curable composition can be from 1:1 to 1.5:1, from 1:1 to 1.45:1, from 1:1 to 3:1, from 1.2:1 to 1.5:1, or from 1.2:1 to 1.4:1. A suitable functional Group A to functional Group B equivalent ratio of a curable composition can be, for example, from 2:1 to 1:2, from 1.5:1 to 1:1.5, or from 1.1:1 to 1:1.1.

Compositions provided by the present disclosure can include one or both of the co-reactive components such that the ratio of coreactive components in one portion of the object differs from the ratio of coreactive components in another part of the object. In this manner, portions of an object may have differing cured compositions. The different compositions may differ by the weight percent of the coreactive compounds, the equivalent ratio of reactive monomers or reactants within the coreactive compounds, the type and/or level of filler, the crosslinking density, and/or properties such as glass transition temperature. Accordingly, one portion of an object produced in the three-dimensional printing may have different material properties such as different chemical, physical, thermal, or material properties than those of another portion of the three-dimensional object. For example, an exterior surface of an object, an interior of an object, and/or an interior surface of an object can have different properties. The different properties can be within an extrusion. For example, one or more surfaces or a portion of a surface of an extrudate can have different properties compared to another surface or portion of a surface, and/or a surface or portion of a surface can have different properties than the core. The core of the extrudate also may not be homogeneous such that for a cross-section of an extrudate the properties can be different in different portions of the cross-section.

In addition, one portion of an object may partially react with at least some other coreactive components in an adjacent portion of the object. Such reaction may occur during deposition and/or after the coreactive components are deposited in each adjacent portion, whereby the coreactive components react in part within each adjacent portion and the coreactive components between adjacent portions react. In this manner, the deposited portions of an object may be covalently bound together as the coreactive compositions react between the portions of the object, thereby increasing the physical and structural integrity of the three-dimensional object. For example, unreacted isocyanate and/or amine groups present on the surface of an underlying deposited layer, can react with unreacted groups of a subsequently deposited layer. This increases the strength/integrity of the object by providing reaction between layers of deposited material, in addition to reaction within the same layer.

An additively manufactured object can include layers formed from a thermosetting or coreactive composition, such as a polyurea composition, that is produced from at least two deposited coreactive components and which may be crosslinked. In the case of polyurea, one of the coreactive components may include an isocyanate-functional prepolymer or oligomer and another coreactive component may include an amine such as a primary or secondary amine. The isocyanate-functional coreactive components may further include isocyanate-functional monomers. The amine-containing coreactive component may further include another reactant with functional groups reactive with the isocyanate-functional prepolymer, oligomer, and/or monomer such as hydroxyl groups. Adjacent portions of a printed three-dimensional object may be reacted with some of the coreactive compositions in one or more adjacent portions.

For a polyurea composition, the coreactive components may include an isocyanate-functional component that may include polyisocyanate monomers and/or prepolymers, or a blend of polyisocyanates. A polyisocyanate prepolymer can be a polyisocyanate which is pre-reacted with a sufficient amount of polyamine(s) or other isocyanate-reactive components such as one or more polyols, so that reactive isocyanate sites on the polyisocyanate remain in the isocyanate-functional prepolymer.

Reactive components can comprise reactive compounds where the reactive compounds can comprise a prepolymer or combination of prepolymers, a monomer or combination of monomers, or a combination of any of the foregoing. The prepolymers and monomers in a reactive component can have the same reactive functional group or different functional groups. For example, a reactive component can include polyamines and polyols, and can be combined with a reactive component comprising polyisocyanates.

A polyisocyanate can comprise a polyisocyanate prepolymers, a polyisocyanate monomer, or a combination thereof.

A polyisocyanate can include a polyisocyanate prepolymer prepared by reacting a prepolymer having terminal groups reactive with isocyanate groups with a polyisocyanate such as a diisocyanate. For example, a polyisocyanate prepolymer can be prepared by reacting a polyol prepolymer and/or a polyamine prepolymer with a polyisocyanate such as a diisocyanate. Suitable polyisocyanate prepolymers are commercially available.

Suitable monomeric polyisocyanates include, for example, isophorone diisocyanate (IPDI), which is 3,3,5-trimethyl-5-isocyanato-methyl-cyclohexyl isocyanate; hydrogenated diisocyanates such as cyclohexylene diisocyanate, 4,4'-methylenedicyclohexyl diisocyanate ($H_{12}MDI$); mixed aralkyl diisocyanates such as tetramethylxylyl diisocyanates, $OCN-C(-CH_3)_2-C_6H_4C(CH_3)_2-NCO$; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate, and 2-methyl-1,5-pentamethylene diisocyanate.

Aliphatic isocyanates can be useful in producing three-dimensional polyurea objects that are resistant to degradation by UV light.

Examples of suitable monomeric aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

Suitable polyisocyanates also include polyisocyanates prepared from dimers and trimers of diisocyanate monomers. Dimers and trimers of diisocyanate monomers can be prepared, for example, by methods described in U.S. Pat. No. 5,777,061 at column 3, line 44 through column 4, line 40, which is incorporated by reference in its entirety. Dimers and trimers of diisocyanate monomers may contain linkages selected from isocyanurate, uretdione, biuret, allophanate and combinations thereof, such as Desmodur® N3600, Desmodur® CP2410, and Desmodur® N3400, available from Bayer Material Science.

A polyisocyanate can also comprise a polyisocyanate prepolymer. For example, a polyisocyanate can include an isocyanate-terminated polyether diol, an isocyanate-terminated extended polyether diol, or a combination thereof. An extended polyether diol refers to a polyether diol that has been reacted with an excess of a diisocyanate resulting in an isocyanate-terminated polyether prepolymer with increased molecular weight and urethane linkages in the backbone. Examples of polyether diols include Terathane® polyether diols such as Terathane® 200 and Terathane® 650 available from Invista or the PolyTHF® polyether diols available from BASF. Isocyanate-terminated polyether prepolymers can be prepared by reacting a diisocyanate and a polyether diol as described in U.S. Application Publication No. 2013/0244340, which is incorporated by reference in its entirety. The number average molecular weight of an extended isocyanate-terminated prepolymer can be, for example, from 250 Daltons to 10,000 Daltons, or from 500 Daltons to 7,500 Daltons.

A polyisocyanate prepolymer can include an isocyanate-terminated polytetramethylene ether glycol such as polytetramethylene ether glycols produced through the polymerization of tetrahydrofuran. Examples of suitable polytetramethylene ether glycols include Polymeg® polyols (LyondellBasell), PolyTHF® polyether diols (BASF), or Terathane® polyols (Invista).

A polyisocyanate prepolymer can include an isocyanate-terminated polyetheramine. Examples of polyether amines include Jeffamine® polyetheramines (Huntsman Corp.), and polyetheramines available from BASF. Examples of suitable polyetheramines include polyoxypropylenediamine.

A polyisocyanate prepolymer can include a difunctional isocyanate, a trifunctional isocyanate, a difunctional isocyanate-terminated prepolymer, an extended difunctional isocyanate-terminated prepolymer, or a combination of any of the foregoing.

A polyisocyanate can include monomeric polyisocyanate or combination of monomeric polyisocyanates. A monomeric polyisocyanate can be a diisocyanate or can have an isocyanate functionality, for example from 3 to 6.

Examples of suitable monomeric polyisocyanates include isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_2MDI$); mixed aralkyl diisocyanates such as tetramethylxylyl diisocyanates, $OCN-C(CH_3)_2-C_6H_4C(CH_3)_2-NCO$; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate.

Suitable monomeric aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

An amine-functional coreactant component used to produce a three-dimensional polyurea object may include primary amines, secondary amines, tertiary amines, or combinations thereof. A polyamine can be a diamine or a polyamine having an amine functionality, for example from 3 to 6, or a combination thereof. A polyamine can be a monomeric polyamine, a polyamine prepolymer, or a combination thereof, Examples of suitable monomeric aliphatic polyamines include, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluene diamine, 2,4'- and/or 4,4'-di amino-dicyclohexylmethane, 5-amino-1,3,3-trimethylcyclohexanemethylamine (isophoronediamine), 1,3-cyclohexanebis(methylamine) (1,3 BAC), and 3,3'-dialkyl-4,4'-diaminodicyclohexyl methanes (such as 3,3'-dimethyl-4,4'-diaminodicyclohexyl methane and 3,3'-diethyl-4,4'-diaminodicyclohexyl methane), 2,4- and/or 2,6-diaminotoluene and 2,4'- and/or 4,4'-diaminodiphenyl methane, or mixtures thereof.

Suitable secondary amines include acrylates and methacrylate-modified amines. By "acrylate and methacrylate modified amines" includes both mono- and poly-acrylate modified amines as well as acrylate or methacrylate modified mono- or poly-amines. Acrylate or methacrylate modified amines can include aliphatic amines.

A secondary amine may include an aliphatic amine, such as a cycloaliphatic diamine. Such amines are available commercially from Huntsman Corporation (Houston, TX) under the designation of Jefflink™ such as Jefflink™ 754. The amine may be provided as an amine-functional resin. Such amine-functional resins may be a relatively low viscosity, amine-functional resins suitable for use in the formulation of high solids polyurea three-dimensional objects. An amine-functional resin may comprise an ester of an organic acid, for example, an aspartic ester-based amine-functional reactive resin that is compatible with isocyanates; e.g., one that is solvent-free. An example of such polyaspartic esters is the derivative of diethyl maleate and 1,5-diamino-2-methylpentane, available commercially from Bayer Corporation, PA under the trade name Desmophen™ NH1220. Other suitable compounds containing aspartate groups may be employed as well.

A polyamine can include high molecular weight primary amines, such as polyoxyalkyleneamines. Polyoxyalkyleneamines contain two or more primary amino groups attached to a backbone, derived, for example, from propylene oxide, ethylene oxide, or a mixture thereof. Examples of such amines include polyoxypropylenediamine and glycerol tris[poly(propylene glycol), amine-terminated] ether such as those available under the designation Jeffamine™ from Huntsman Corporation. Such polyetheramines can have a molecular weight from 200 Daltons to 7,500 Daltons, such as, for example, Jeffamine™ D-230, D-400, D-2000, T-403 and T-5000.

An amine-functional coreactive component may also include an aliphatic secondary amine such as Clearlink® 1000, available from Dor-Ketal Chemicals, LLC.

An amine-functional coreactive component can comprise an amine-functional aspartic acid ester, a polyoxyalkylene primary amine, an aliphatic secondary amine, or a combination of any of the foregoing.

For a polyurea formed from coreactive components comprising an isocyanate and a (meth)acrylate anine reaction product of a monoamine and poly(meth)acrylate, the term "(meth)acrylate" denotes both the acrylate and the corresponding (meth)acrylate. The poly(meth)acrylate may be any suitable poly(meth)acrylate and mixtures thereof. A poly(meth)acrylate can include a di(meth)acrylate, a poly(meth)acrylate can comprise tri(meth)acrylate, or a poly(meth) acrylate can include tetra(meth)acrylate. Suitable di(meth)acrylates include, for example, ethylene glycol, di(meth)acrylate, 1,3-butylene glycol di(meth)acrylate, 1,4-butanediol di(meth)acrylate, 2,3-dimethylpropane 1,3-di(meth)acrylate, 1,6-hexanediol di(meth)acrylate, propylene glycol di(meth)acrylate, dipropylene glycol di(meth)acrylate, tripropylene glycol di(meth)acrylate, tetraethylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, polybutadiene di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxyolated neopentyl glycol di(meth)acrylate, pentanediol di(meth)acrylate, cyclohexane dimethanol di(meth)acrylate, ethoxylated bis-phenol A di(meth) acrylate, and combinations of any of the foregoing. Examples of tri and higher (meth)acrylates include glycerol tri(meth)acrylate, trimethylolpropane tri(meth)acrylate, ethoxylated trimethylolpropane tri(meth)acrylate, propoxylated trimethylolpropane tri(meth)acrylate, ditrimethylolpropane tetra(meth)acrylate, pentaerythritol tetra(meth) acrylate, ethoxylated pentaerythritol tetra(meth)acrylate, propoxylated pentaerythritol tetra(meth)acrylate, and dipentaerythritol penta(meth)acrylate. Other suitable poly(meth) acrylate oligomers include (meth)acrylate of epoxidized soya oil and urethane acrylates of polyisocyanates and hydroxyalkyl (meth)acrylates. Mixtures of poly(meth)acrylate monomers may also be used, including mixtures of mono, di, tri, and/or tetra (meth)acrylate.

Other suitable poly(meth)acrylates include urethane (meth)acrylates such as those formed from the reaction of hydroxyl-functional (meth)acrylate with a polyisocyanate or with an isocyanate-functional adduct of a polyisocyanate and a polyol or a polyamine. Suitable hydroxyl-functional (meth)acrylates include 2-hydroxyethyl, 1-methyl-2-hydroxyethyl, 2-hydroxypropyl, 2-hydroxybutyl, 4-hydroxybutyl, and the like. Suitable polyisocyanates include, for example, any of the monomeric or oligomeric isocyanates, or isocyanate prepolymers disclosed herein.

A polyamine includes diamines, polyamines having an amine functionality, for example, from 3 to 6, and combinations thereof.

Examples of suitable aliphatic polyamines include ethylamine, the isomeric propylamines, butylamines, pentylamines, hexylamines, cyclohexylamine, ethylene diamine, 1,3-bis(aminomethyl)diamine, 1,2-diaminopropane, 1,4-diaminobutane, 1,3-diaminopentane, 16-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. A particular example of an acrylate modified amine is a reaction product of isophorone diamine, dibutyl maleate, and butyl acrylate.

Example of suitable secondary amines may include an aliphatic amine, such as a cycloaliphatic diamine. Such amines are available commercially from Huntsman Corporation (Houston, TX) under the designation of Jefflink® such as Jefflink® 754. Others examples include Clearlink® 1000 (Dorf-Ketal Chemicals, LLC), and aspartic ester functional amines, such as those available under the name Desmophen® such as NH1220, Desmophen® NH 1420, and Desmophen® NH 1520 (Bayer Materials Science LLC). A secondary amine can be the reaction product of isophorone diamine and acrylonitrile, such as Polyclear® 136 (available from BASF/Hansen Group LLC). A polyamine can also be provided as an amine-functional resin. For example, an amine-functional resin may comprise an ester of an organic acid, such as an aspartic ester-based amine-functional reactive resin that is compatible with isocyanates; e.g., one that is solvent-free, and/or has a mole ratio of amine-functionality to the ester of no more than 1:1 so there remains no excess primary amine upon reaction. An example of such polyaspartic esters is the derivative of diethyl maleate and 1,5-diamino-2-methylpentane, available commercially from Bayer Corporation under the trade name Desmophen® NH1220. Other suitable compounds containing aspartate groups may be employed as well. Additionally, the secondary polyamines can include polyaspartic esters which can include derivatives of compounds such as maleic acid, fumaric acid esters, aliphatic polyamines and the like.

A polyamine can include high molecular weight primary amines, such as polyoxyalkyleneamines. Polyoxyalkyleneamines contain two or more primary amino groups attached to a backbone, derived, for example, from propylene oxide, ethylene oxide, or a mixture thereof. Examples of such amines include those available under the designation Jeffamine® from Huntsman Corporation. Such amines typically have a molecular weight ranging from 200 to 7500, such as, without limitation, Jeffamine® D-230, D-400, D-2000, T-403 and T-5000.

Compositions comprising polyisocyanates and polyamines can further comprise a polysiloxanes. Polysiloxanes can be effective in increasing the tensile strength of the polyurea without decreasing the elasticity. A composition can comprise, for example, from 1 wt % to 40 wt % of a polysiloxane, from 5 wt % to 35 wt %, or from 10 wt % to 30 wt %, where wt % is based on the total weight of the polyisocyanate, the polyamine, and the polysiloxane in the composition.

A polysiloxane can have a number average molecular weight, for example from 500 Daltons to 50,000 Daltons. A polysiloxane can have terminal isocyanate groups, amine groups, hydroxyl groups, or other suitable terminal group as appropriate for a particular curing chemistry. A polysiloxane can be a homopolymer, a block copolymer, a graft copolymer, or a combination of any of the foregoing. A polysiloxane can comprise a poly(methylhydrosiloxane), a poly(dimethylsiloxane), or a combination thereof.

Examples of suitable polysiloxane homopolymers include hexamethylsiloxane, bis(3-aminopropyl) terminated poly(dimethylsiloxane), poly(dimethylsiloxane, diglycidyl ether-terminated (polydimethylsiloxane), hydride-terminated (polydimethylsiloxane), hydroxy-terminated (polydimethylsiloxane), monoacrylamidopropyl-terminated (polydimethylsiloxane), vinyl-terminated (polydimethylsiloxane), poly(methylhydrosiloxane), trimethylsilyl-terminated poly(methylhydrosiloxane), poly(methylphenylsiloxane), and combinations of any of the foregoing.

Examples of suitable polysiloxane copolymers include poly(dimethylsiloxane-co-alkylmethylsiloxane), poly(dimethylsiloxane-co-(3-aminopropyl)methylsiloxane), dihydroxy-terminated poly(dimethylsiloxane-co-diphenylsiloxane), divinyl-terminated poly(dimethylsiloxane-co-diphenylsiloxane), poly[dimethylsiloxane-co-(2-(3,4-epxoycyclohexyl)ethyl)methylsiloxane], poly[dimethylsiloxane-co-[3-(2-(2-hydroxyethoxy)ethoxy)propyl]methylsicoxane], trimethylsilyl-terminated poly(dimethylsiloxane-co-methylhydrosiloxane), poly(dimethylsiloxane-co-methylphenylsiloxane), poly(dimethylsiloxane-co-methyl(stearoyloxyalkyl)siloxane], poly(dimethylsiloxane)-graft-polyacrylates, and combinations of any of the foregoing.

A polysiloxane can comprise poly(dimethylsiloxane), poly(methylhydrosiloxane) or a combination thereof. A polysiloxane can comprise an alkylsilyl-terminated poly(dimethylsiloxane), an alkoxysilyl-terminated poly(methylhydrosiloxane), or a combination thereof. A polysiloxane can comprise a trimethylsilyl-terminated poly(dimethylsiloxane), an trimethyl-terminated poly(methylhydrosiloxane), or a combination thereof.

A siloxane can comprise a poly(methylhydrosiloxane) or a combination of poly(methylhydrosiloxane). A polysiloxane can comprise a poly(dimethylsiloxane), or a combination of poly(dimethylsiloxanes).

A polysiloxane such as a poly(methylhydrosiloxane) or a poly(dimethylsiloxane), can have an average molecular weight, for example, from 500 Daltons to 5,000 Daltons, from 750 Daltons to 4,500 Daltons, from 1,000 Daltons to 4,000 Daltons or from 1,500 Daltons to 4,500 Daltons. A polysiloxane such as a poly(methylhydrosiloxane) or a poly(dimethylsiloxane), can have an average molecular weight, for example, from 1,000 Daltons to 100,000 Daltons, from 1,000 Daltons to 50,000 Daltons, or from 3,000 Daltons to 25,000 Daltons. Molecular weight can be determined using gel permeation chromatography using polystyrene standards.

Suitable polysiloxanes include siloxane urethane polyols. Examples of siloxane urethane polyols are disclosed, for example, in U.S. Pat. No. 7,459,515.

A coreactive composition provided by the present disclosure can be based on thiol-ene chemistry.

Coreactive compositions can comprise a polythiol and a polyalkenyl. The polythiol can comprise a monomeric polythiol, a polythiol prepolymer, or a combination thereof. A polythiol can comprise a dithiol, a polythiol having a thiol functionality, for example, from 3 to 6, or a combination thereof. The polyalkenyl can comprise a monomeric polyalkenyl, a polyalkenyl prepolymer, or a combination thereof. A polythiol can comprise a dialkenyl, a polyalkenyl having a thiol functionality, for example, from 3 to 6, or a combination thereof.

A polythiol can comprise any suitable thiol-terminated prepolymers or combination of thiol-terminated prepolymers. Thiol-terminated sulfur-containing prepolymers are useful as sealants due to their solvent resistance and ability to maintain acceptable physical properties over a wide range of temperatures and environmental conditions. Examples of suitable thiol-terminated sulfur-containing prepolymers include thiol-terminated polythioethers, thiol-terminated polysulfides, thiol-terminated sulfur-containing polyformals, and thiol-terminated monosulfides. Sulfur-containing prepolymers can be useful as sealants.

A sulfur-containing prepolymer can comprise a thiol-terminated polythioether. Examples of suitable thiol-terminated polythioether prepolymers are disclosed, for example, in U.S. Pat. No. 6,172,179, which is incorporated by reference in its entirety. A thiol-terminated polythioether prepolymer can comprise Permapol® P3.1E, Permapol® P3.1E-2.8, Permapol® L56086, or a combination of any of the foregoing, each of which is available from PRC-DeSoto International Inc.

A thiol-terminated polythioether prepolymer can comprise a thiol-terminated polythioether prepolymer comprising at least one moiety having the structure of Formula (2):

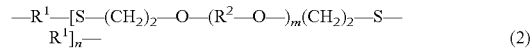

$$-R^1-[S-(CH_2)_2-O-(R^2-O-)_m(CH_2)_2-S-R^1]_n- \quad (2)$$

where,
each $R^1$ can independently comprise a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, or a $-[(CHR^3)_p-X-]_q(CHR^3)_r-$ group, wherein each $R^3$ comprises hydrogen or methyl;

each $R^2$ can independently comprise a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, or a —[(CH$_2$)$_p$—X-]$_q$(CH$_2$)$_r$— group;

each X can independently comprise O, S, or NR, wherein R comprises hydrogen or methyl;

m ranges from 0 to 50;

n is an integer ranging from 1 to 60;

p is an integer ranging from 2 to 6;

q is an integer ranging from 1 to 5; and r is an integer ranging from 2 to 10.

A thiol-terminated polythioether can have the structure of Formula (3a) and the moiety E derived from the thiol-terminated polythioether has the structure of Formula (3b):

HS—R$^1$—[S-A-S—R$^1$—]$_n$—SH  (3a)

—S—R$^1$—[S-A-S—R$^1$—]$_n$—S—  (3b)

where, n is an integer from 1 to 60;

each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—](CHR$^3$)$_r$—, wherein, p is an integer from 2 to 6;

q is an integer from 1 to 5;

r is an integer from 2 to 10;

each $R^3$ is independently selected from hydrogen and methyl; and each X is independently selected from O, S, S—S, and NR, wherein R is selected from hydrogen and methyl; and each A is independently derived from a polyalkenyl.

In thiol-terminated polythioether of Formula (3a) and moieties of Formula (3b), each A can independently be selected from a moiety of Formula (4a) and a moiety of Formula (4b):

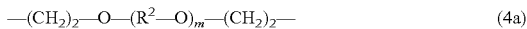

—(CH$_2$)$_2$—O—(R$^2$—O)$_m$—(CH$_2$)$_2$—  (4a)

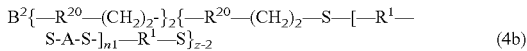

B$^2${—R$^{20}$—(CH$_2$)$_2$-}$_2${—R$^{20}$—(CH$_2$)$_2$—S—[—R$^1$—S-A-S-]$_{n1}$—R$^1$—S}$_{z-2}$  (4b)

where, each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X-]$_q$(CHR$^3$)$_r$—, wherein, p is an integer from 2 to 6;

q is an integer from 1 to 5;

r is an integer from 2 to 10;

each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X-]$_q$(CHR$^3$)$_r$—, wherein p, q, r, $R^3$, and X are as defined as for $R^1$;

m is an integer from 0 to 50; and each n1 is independently selected from an integer from 0 to 60;

B$^2$ represents a core of a z-valent, polyalkenyl polyfunctionalizing agent B$^2$(—R$^{20}$—CH=CH$_2$)$_z$ wherein, z is an integer from 3 to 6; and each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

A thiol-terminated sulfur-containing prepolymer can comprise a thiol-terminated sulfur-containing polyformal. Sulfur-containing polyformal prepolymers useful in aerospace sealant applications are disclosed, for example, in U.S. Pat. Nos. 8,729,216 and 8,541,513, each of which is incorporated by reference in its entirety.

A thiol-terminated sulfur-containing polyformal prepolymer can have the structure of Formula (5):

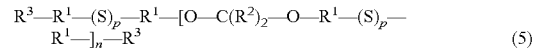

R$^3$—R$^1$—(S)$_p$—R$^1$—[O—C(R$^2$)$_2$—O—R$^1$—(S)$_p$—R$^1$—]$_n$—R$^3$  (5)

where n is an integer selected from 1 to 50; each p is independently selected from 1 and 2; each $R^1$ comprises $C_{2-6}$ alkanediyl; each $R^2$ independently comprises hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, or substituted $C_{6-12}$ aryl; and each $R^3$ is —OR$^{3'}$ wherein $R^{3'}$ comprises a thiol-terminated group.

Sulfur-containing polyformal prepolymers can have the structure of Formula (6):

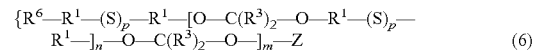

{R$^6$—R$^1$—(S)$_p$—R$^1$—[O—C(R$^3$)$_2$—O—R$^1$—(S)$_p$—R$^1$—]$_n$—O—C(R$^3$)$_2$—O—]$_m$—Z  (6)

where each n is an integer selected from to 50; m is an integer selected from 3 to 6; p is independently comprises 1 or 2; each $R^1$ independently comprises $C_{2-6}$ alkanediyl; each $R^3$ independently comprises hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, or substituted $C_{6-12}$ aryl; each $R^5$ is —OR$^{5'}$ wherein $R^{5'}$ comprises a thiol-terminated.

A thiol-terminated sulfur-containing prepolymer can comprise a thiol-terminated polysulfide prepolymer. A polysulfide prepolymer refers to a prepolymer that contains one or more polysulfide linkages, i.e., —S$_x$— linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Industries, Inc. under the names Thioplast® and Thiokol-LP®, respectively.

Examples of suitable polysulfide prepolymers are disclosed, for example, in U.S. Pat. Nos. 4,623,711; 6,172,179; 6,509,418; 7,009,032; and 7,879,955, each of which is incorporated by reference in its entirety.

Examples of suitable thiol-terminated polysulfides include Thioplast™ G polysulfides such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G resins are liquid polysulfide polymers that are blends of di- and tri-functional molecules where the difunctional polysulfide polymers have the structure of Formula (7):

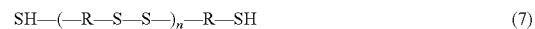

SH—(—R—S—S—)$_n$—R—SH  (7)

and the trifunctional polysulfide polymers have the structure of Formula (8):

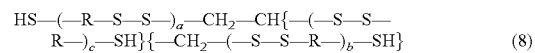

HS—(—R—S—S—)$_a$—CH$_2$—CH{—(—S—S—R—)$_c$—SH}{—CH$_2$—(—S—S—R—)$_b$—SH}  (8)

where each R is —(CH$_2$)$_2$O—CH$_2$—O—(CH$_2$)$_2$—, and n=a+b+c, where the value for n may be from 7 to 38 depending on the amount of the trifunctional cross-linking agent (1,2,3,-trichloropropane; TCP) used during synthesis of the polysulfide polymer. Thioplast™ C polysulfides can have a molecular weight from less than 1,000 Daltons to 6,500 Daltons, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have an average molecular weight from 1,000 Daltons to 7,500 Daltons, a SH content from 0.8% to 7.7%, and a cross-linking density from 0% to 2%.

A thiol-terminated sulfur-containing prepolymer can comprise a Thiokol-LP® polysulfide, a Thioplast® G polysulfide, or a combination thereof.

A thiol-terminated sulfur-containing prepolymer can comprise a thiol-terminated monosulfide.

A thiol-terminated monosulfide can comprise a thiol-terminated monosulfide of Formula (9a), a thiol-terminated monosulfide of Formula (9b), or a combination thereof:

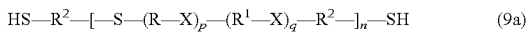

$$HS-R^2-[-S-(R-X)_p-(R^1-X)_q-R^2-]_n-SH \quad (9a)$$

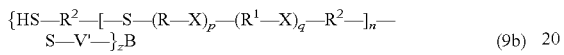

$$\{HS-R^2-[-S-(R-X)_p-(R^1-X)_q-R^2-]_n- S-V'-\}_zB \quad (9b)$$

where,
  each X independently comprises S, O, or $NR^3$, where $R^3$ comprises $C^{1-4}$ alkyl;
  p is an integer from 1 to 5;
  q is an integer from 0 to 5;
  n is an integer from 1 to 60;
  each R independently comprises $C_{2-10}$ alkanediyl, $C_{6-8}$ cycloalkanediyl, $C_{1-4}$ alkylcycloalkanediyl, or $C_{8-10}$ alkylarenediyl;
  each $R^1$ independently comprises $C_{1-10}$ alkanediyl, $C_{6-8}$ cycloalkanediyl, $C_{1-4}$ alkylcycloalkanediyl, or $C_{8-10}$ alkylarenediyl;
  each $R^2$ independently comprises $C_{2-10}$ alkanediyl, $C_{6-8}$ cycloalkanediyl, $C_{1-4}$ alkylcycloalkanediyl, or $C_{8-10}$ alkylarenediyl;
  B represents a core of a z-valent polyfunctionalizing agent $B(-V)_z$ wherein:
    z is an integer from 3 to 6; and
    each V is a moiety comprising a terminal group reactive with a thiol group;
  and
  each —V'— is derived from the reaction of —V with a thiol.

A thiol-terminated monosulfide can comprise a thiol-terminated monosulfide of Formula (10a), a thiol-terminated monosulfide of Formula (10b), or a combination thereof:

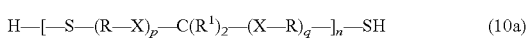

$$H-[-S-(R-X)_p-C(R^1)_2-(X-R)_q-]_n-SH \quad (10a)$$

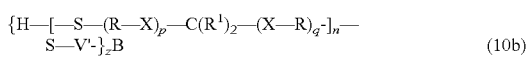

$$\{H-[-S-(R-X)_p-C(R^1)_2-(X-R)_q-]_n- S-V'-\}_zB \quad (10b)$$

where,
  each X can independently be S or O;
  p is an integer from 1 to 5;
  q is an integer from 1 to 5;
  n is an integer from 1 to 60;
  each R independently comprises $C_{2-10}$ alkanediyl;
  each $R^1$ independently comprises hydrogen or $C_{1-10}$ alkanediyl;
  B represents a core of a z-valent polyfunctionalizing agent $B(-V)_z$ wherein:
    z is an integer from 3 to 6; and
    each V is a moiety comprising a terminal group reactive with a thiol group;
  and
  each —V'— is derived from the reaction of —V with a thiol.

A thiol-terminated monosulfide can comprise a thiol-terminated monosulfide of Formula (11a), a thiol-terminated monosulfide of Formula (11b), or a combination thereof:

$$HS-R-(S_y-R)_t-SH \quad (11a)$$

$$\{HS-R-(S_y-R)_t-S-V'-\}_zB \quad (11b)$$

where,
  t is an integer from 1 to 60;
  q is an integer from 1 to 8;
  p is an integer from 1 to 10;
  r is an integer from 1 to 10;
  y has an average value within a range from 1.0 to 1.5;
  each R independently comprises branched alkanediyl, branched arenediyl, or a moiety having the structure $-(CH_2)_p-O-(CH_2)_q-O-(CH_2)_r-$;
  B represents a core of a z-valent polyfunctionalizing agent $B(-V)_z$ wherein:
    z is an integer from 3 to 6; and
    each V is a moiety comprising a terminal group reactive with a thiol group; and
  each —V'— is derived from the reaction of —V with a thiol.

Examples of thiol-terminated monosulfides of Formula (11a) and Formula (11b) are disclosed, for example, in U.S. Application Publication No. 2016/0152775 and in U.S. Pat. No. 9,079,833.

A thiol-terminated monosulfide can comprise a thiol-terminated monosulfide of Formula (12):

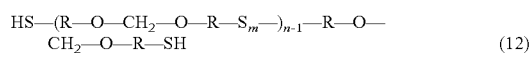

$$HS-(R-O-CH_2-O-R-S_m-)_{n-1}-R-O- CH_2-O-R-SH \quad (12)$$

where R is $C_{2-4}$ alkanediyl, m is 1-8, and n is an integer from 2 to 370.

A polythiol can comprise a monomeric dithiol or combination of monomeric dithiols A polythiol can comprise a monomeric polythiol having a thiol functionality, for example, from 3 to 6, or combination of monomeric polythiol having a thiol functionality, for example, from 3 to 6.

A polythiol can comprise a dithiol having the structure of Formula (13):

$$HS-R^1-SH \quad (13)$$

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(CHR^3)_p-X-]_q(CHR^3)_r-$; wherein, each $R^3$ is independently selected from hydrogen and methyl; each X is independently selected from O, S, S—S, and NR wherein R is selected from hydrogen and methyl; p is an integer from 2 to 6; q is an integer from 1 to 5; and r is an integer from 2 to 10.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

Examples of suitable polythiols having a thiol functionality greater than 2 include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

A polythiol coreactive component refers to polyfunctional compounds containing two or more thiol-functional groups (—SH). Suitable polythiol-functional compounds include polythiols having at least two thiol groups including monomers and prepolymers. A polythiol may have ether linkages (—O—), thioether linkages (—S—), including polysulfide linkages (—$S_x$—), where x is at least 2, such as from 2 to 4, and combinations of such linkages.

Examples of suitable polythiols include compounds of the formula $R^1$—$(SH)_n$, where $R^1$ is a polyvalent organic moiety and n is an integer of at least 2, such as from 2 to 6.

Examples of suitable polythiols include esters of thiol-containing acids formed by reacting a thiol-containing acid of formula HS—$R^2$—COOH where $R^2$ is an organic moiety with a polyhydroxy compounds of the structure $R^3$—$(OH)_n$ where R is an organic moiety and n is at least 2, such as from 2 to 6. These components may be reacted under suitable conditions to give polythiols having the general structure $R^3$—$(OC(O)$—$R^2$—$SH)_n$ wherein $R^2$, $R^3$ and n are as defined above.

Examples of thiol-containing acids include thioglycolic acid (HS—$CH_2$COOH), α-mercaptopropionic acid (HS—CH($CH_3$)—COOH) and β-mercaptopropionic acid (HS—$CH_2CH_2$COCH) with polyhydroxy compounds such as glycols, triols, tetraols, pentaols, hexaols, and combinations of any of the foregoing. Other suitable polythiols include ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), and combinations of any of the foregoing.

A polyalkenyl can comprise any suitable polyalkenyl prepolymer or combination of polyalkenyl prepolymers. A polyalkenyl prepolymer can comprise an alkenyl-terminated sulfur-containing prepolymer, which can be prepared, for example by reacting a dialkenyl compound with a thiol-terminated sulfur-containing prepolymer as described herein.

A polyalkenyl can comprise a monomeric dialkenyl or combination of monomeric dialkenyls.

A polyalkenyl can comprise a monomeric polythiol having an alkenyl functionality, for example, from 3 to 6, or combination of monomeric polyalkenyl having an alkenyl functionality, for example, from 3 to 6.

A polyalkenyl can comprise a polyalkenyl ether or a combination of polyalkenyl ethers. A polyalkenyl can comprise a divinyl ether of Formula (14a), a polyalkenyl polyfunctionalizing agent of Formula (14b), or a combination thereof:

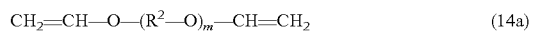 (14a)

 (14b)

where,
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X-]$_q$(CHR$^3$)$_r$—, wherein p, q, r, $R^3$, and X are as defined as for $R^1$;
m is an integer from 0 to 50; and
$B^2$ represents a core of a z-valent, polyalkenyl polyfunctionalizing agent $B^2$(—$R^{20}$—CH=$CH_2$)$_z$ wherein,
z is an integer from 3 to 6; and
each $R^{20}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Examples of suitable bis(alkenyl)ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether (TEG-DVE), tetraethylene glycol divinyl ether, and cyclohexanedimethanol divinyl ether.

Examples of suitable polyalkenyls having an alkenyl functionality greater than 2 include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

For example, a coreactive composition provided by the present invention having thiol-ene functionality may include a polyene coreactive component comprising compounds or prepolymers having terminal and/or pendent olefinic double bonds, such as terminal alkenyl groups. Examples of such compounds include (meth)acrylic-functional (meth)acrylic copolymers, epoxy acrylates such as epoxy resin (meth)acrylates (such as the reaction product of bisphenol A diglycidyl ether and acrylic acid), polyester (meth)acrylates, polyether (meth)acrylates, polyurethane (meth)acrylates, amino (meth)acrylates, silicone (meth)acrylates, and melamine (meth)acrylates.

Examples of suitable polyurethane (meth)acrylates include reaction products of polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. Examples of suitable polyester (meth)acrylates are the reaction products of (meth)acrylic acid or anhydride with polyols, such as diols, triols and tetraols, including alkylated polyols, such as propoxylated diols and triols. Examples of suitable polyols include 1,4-butane diol, 1,6-hexane diol, neopentyl glycol, trimethylol propane, pentaerythritol and propoxylated 1,6-hexane diol. Examples of suitable polyester (meth)acrylates include glycerol tri(meth)acrylate, trimethylolpropane tri(meth)acrylate, pentaerythritol tri(meth)acrylate, and pentaerythritol tetra(meth)acrylate. Mixtures of polyurethane (meth)acrylates and polyester (meth)acrylates may be used.

In addition to (meth)acrylates, (meth)allyl compounds or prepolymers may be used either alone or in combination with (meth)acrylates. Examples of (meth)allyl compounds include polyallyl ethers such as the diallyl ether of 14-butane diol and the allyl ether of trimethylol propane. Examples of other (meth)allyl compounds include polyurethanes containing (meth)allyl groups. For example, reaction products of polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane can be used.

A compound can comprise a polyepoxide or combination of polyepoxides. A polyepoxide can be monomeric, a prepolymer, or a combination thereof.

Examples of suitable polyepoxides hydantoin diepoxide, a diglycidyl ether of bisphenol-A, a diglycidyl ether of bisphenol-F, a novolac-type polyepoxide, epoxidized unsaturated phenolic resins, dimer acid-based epoxy resins, and combinations of any of the foregoing.

Other examples of suitable polyepoxides include a bisphenol A type polyepoxide, a brominated bisphenol A type polyepoxide, a bisphenol F type polyepoxide, a biphenyl type polyepoxide, a novolac type polyepoxide, an alicyclic polyepoxide, a naphthalene type polyepoxide, an ether or polyether polyepoxide, an oxirane ring-containing polybutadiene, and a silicone polyepoxy copolymer.

Additional examples of suitable polyepoxides include a bisphenol A type polyepoxide having an average molecular weight, for example of 400 Daltons or less 600 Daltons or less, 1,000 Daltons or less, 1,200 Daltons or less, or 1,400 Daltons or less; a branched polyfunctional bisphenol A type polyepoxide such as p-glycidyloxyphenyl dimethyltolylbisphenol A diglycidyl ether; a bisphenol F type epoxy resin; a phenol novolac type polyepoxide having an average molecular weight, for example, of 500 Daltons or less, 700 Daltons or less, 1,000 Daltons or less, or 1,500 Daltons or less; an alicyclic polyepoxide such as vinyl(3,4-cyclohexene)dioxide, methyl 3,4-epoxycyclohexylcarboxylate (3,4-epoxycyclohexyl), bis(3,4-epoxy-6-methylcyclohexylmethyl) adipate and 2-(3,4-epoxycyclohexyl)-5,1-spiro(3,4-epoxycyclohexyl)-m-dioxane; a biphenyl type polyepoxide such as 3,3',5,5'-tetramethyl-4,4'-diglycidyloxybiphenyl; a glycidyl ester type polyepoxide such as diglycidyl hexahydrophthalate, diglycidyl 3-methylhexahydrophthalate and diglycidyl hexahydroterephthalate; a glycidylamine type polyepoxide such as diglycidylaniline, diglycidyltoluidine, triglycidyl-p-aminophenol, tetraglycidyl-m-xylene diamine, tetraglycidylbis(aminomethyl)cyclohexane; a hydantoin type polyepoxide such as 1,3-diglycidyl-5-methyl-5-ethylhydantoin; and a naphthalene ring-containing polyepoxide. Also, a polyepoxide having silicone such as 1,3-bis(3-glycidoxy-propyl)-1,1,3,3-tetramethyldisiloxane may be used.

Examples of commercially available polyepoxides suitable for use in compositions and sealants provided by the present disclosure include polyglycidyl derivatives of phenolic compounds, such as those available under the trade names EPON™ 824, EPON™ 825, EPON™ 826, EPON™ 827, EPON™ 828, EPON® 829, EPON™ 830, EPON™ 834, EPON™ 862, EPON™ 863, EPON™ 8280, EPON™ 8281, EPON™ 872, an EPON™ resin blend, EPON™ 1001-A-80, EPON™ 1001-B-80, EPON™ 1001-CX-75, EPON™ 1001-DNT-75, EPON™ 1001-FT-75, EPON™ 1001-G-70, EPON™ 1001-H-75, EPON™ 1001-K-65, EPON™ 1001-O-75, EPON™ 1001-T-75, EPON™ 1001-UV-70, EPON™ 1001-X-75, EPON™ 1004-O-65, EPON™ 1007-CT-55, EPON™ 1007-FMU-50, EPON™ 1007-HT-55, EPON™ 1009-DU-40, EPON™ 1009-MX-40, and other EPON™ epoxy resins, available, for example, from Momentive Specialty Chemicals Inc. and/or from Resolution Performance Products LLC; and DER™ 331, DER™ 332, DER™ 334, DER™ 354, DER™ 383 and DER™ 542 from Dow Chemical Co. Other suitable polyepoxides include polyepoxides prepared from polyols and polyglycidyl derivatives of phenol-formaldehyde novolacs, the latter of which are commercially available under the trade names DEN™ 431, DEN™ 438, and DEN™ 439 from Dow Chemical Company. Cresol analogs are also available commercially ECN™ 1235, ECN™ 1273, and ECN™ 1299 from Ciba Specialty Chemicals, Inc. SU-8 is a bisphenol A-type epoxy Novolac available from Resolution Performance Products LLC. Polyglycidyl adducts of amines, aminoalcohols and polycarboxylic acids are also useful in this invention, commercially available resins of which include Glyamine™ 135, Glyamine™ 125, and Glyamine™ 115; ARALDITE™ MY-720, ARALDITE™ MY-721, ARALDITE™ 0500, and ARALDITE™ 0510 from Ciba Specialty Chemicals, Inc. and PGA-X and PGA-C.

A diglycidyl ether of bisphenol A can comprise pendent hydroxyl groups such as, for example, from 1 to 10 pendent hydroxyl groups, from 1 to 8 hydroxyl groups, from 1 to 6 hydroxyl groups, from 1 to 4 pendent hydroxyl groups, or from 1 to 2 pendent hydroxyl groups, such as 1, 2, 3, 4 5, or 6 pendent hydroxyl groups. A diglycidyl ether of bisphenol A having pendent hydroxyl groups can be referred to as hydroxyl-functional diglycidyl ether of bisphenol A. Hydroxyl-functional diglycidyl ethers of bisphenol A can have an epoxy equivalent weight from 400 Daltons to 1,500 Daltons, from 400 Daltons to 1,000 Daltons or from 400 Daltons to 600 Daltons. A diglycidyl ether of bisphenol A can comprise a diglycidyl ether of bisphenol A without a hydroxyl-functional component, a diglycidyl ether of bisphenol A which is partly hydroxyl-functional, or all of the diglycidyl ether of bisphenol A can be hydroxyl-functional.

Certain coreactive compositions provided by the present disclosure may employ Michael addition reactive components. Coreactive compositions employing a Michael addition curing chemistry can comprise a Michael acceptor compound and a Michael donor compound.

The Michael acceptor compound can comprise a Michael acceptor monomer, a Michael acceptor prepolymer, or a combination thereof. A Michael acceptor compound can comprise a Michael acceptor compound having a Michael acceptor functionality of two, a Michael acceptor functionality from 3 to 6, or a combination thereof.

The Michael donor compound can comprise a Michael donor monomer, a Michael donor prepolymer, or a combination thereof. A Michael donor compound can comprise a Michael donor compound having a Michael donor functionality of two, a Michael donor functionality from 3 to 6, or a combination thereof.

The reactive components may include primary amine-functional components and acrylate, maleic, or fumaric-functional components. Compounds that are useful primary amine-functional components include polyoxyalkyleneamines containing two or more primary amine groups attached to a backbone, derived, for example, from propylene oxide, ethylene oxide, or a mixture thereof. Examples of such amines include those available under the designation Jeffamine™ from Huntsman Corporation. Such amines can have a molecular weight ranging from 200 Daltons to 7500 Daltons, such as, for example, Jeffamine™ D-230, D-400, D-2000, T-403, and T-5000. Compounds useful as acrylate functional components include the acrylate functional components listed previously as embodiments of (poly)methacrylate. Compounds useful as maleic or fumaric components include polyesters prepared from maleic anhydride, maleic acid, fumaric acid, or their corresponding $C_{1-6}$ alkyl esters.

A Michael acceptor group refers to an activated alkenyl group such as an alkenyl group proximate to an electron-withdrawing group such as a ketone, nitro, halo, nitrile, carbonyl, or nitro group. Examples of Michael acceptor groups include vinyl ketone, vinyl sulfone, quinone, enamine, ketimine, aldimine, oxazolidine, acrylate, acrylate esters, acrylonitrile, acrylamide, maleimide, alkylmethacrylates, vinyl phosphonates, and vinyl pyridines.

Suitable examples of catalysts for Michael addition chemistries include tributylphosphine, triisobutylphosphine, tri-tertiary-butylphosphine, trioctyl phosphine, tris(2,4,4-trimethylpentyl)phosphine, tricyclopentylphosphine, tricyclohexalphosphine, tri-n-octylphosphine, tri-n-dodecylphosphine, triphenyl phosphine, and dimethyl phenyl phosphine.

Michael donors include amines, hydroxy group containing oligomers or polymers, acetoacetates, malonates, and combinations of any of the foregoing.

Examples of suitable Michael donors, Michael acceptors and suitable catalysts are provided in Table 2.

TABLE 2

Michael donor/acceptor pairs.

| Michael donors | Michael acceptors | Catalysts |
| --- | --- | --- |
| Acetylacetonates | (Meth)acrylates | Strong bases such as DBU, DBN, TMG, TMP, TBD (MFC) |
| Malonates | Cyanoacrylates | Nucleophilic catalysts such as dimethylphenylphosphine |
| Nitroalkanes | Vinylethers | Tetrabutylammonium fluoride |
| Any other active methylene | Vinylpyridine | |
| | Any α,β-unsaturated carbonyl | |

For example, a Michael donor can comprise an acetylacetonate monomer and/or an acetylacetonate prepolymer and a Michael acceptor can comprise a (methyl)acrylate monomer and/or a (meth)acrylate prepolymer, and a catalyst can comprise DBU, DBN, TMG, TMP, TBD, or a combination of any of the foregoing. For example, a Michael donor can comprise a malonate monomer and/or a malonate prepolymer and a Michael acceptor can comprise a cyanoacrylate monomer and/or a cyanoacrylate prepolymer, and a catalyst can comprise a nucleophilic catalyst such as dimethylphenylphosphine. For example, a Michael donor can comprise a nitroalkane monomer and/or a nitroalkane prepolymer and a Michael acceptor can comprise a vinyl ether monomer and/or a vinyl ether prepolymer, and a catalyst can comprise tetrabutylammonium fluoride. For example, a Michael donor can comprise a monomer and/or a prepolymer comprising an active methylene group and a Michael acceptor can comprise a monomer and/or a prepolymer comprising a vinyl pyridine.

Coreactive compositions used in producing three-dimensional objects can include various additives such as, for example, rheology modifiers (e.g., silica or other fillers), flow control agents, plasticizers, thermal stabilizers, UV stabilizers, wetting agents, dispersing auxiliaries, deformers, fillers, reactive diluents, flame retardants, catalysts, pigments, solvents, adhesion promoters, and combinations of any of the foregoing. In addition, three-dimensional printing of a thermosetting composition can include deposition of a thermosetting composition within a mold to provide temporary structural integrity to the object during the printing process.

An additive or combination of additives can be used to control and/or facilitate the printing operation including mixing and extrusion. For example, an additive can control the viscosity, mixing, hydrophobicity, hydrophilicity, rheology, or a combination of any of the foregoing.

An additive or combination of additives can be used to impart one or more desired properties to the built object including, for example, thermal conductivity, electrical conductivity, EMI/RFI shielding capability, light weight, low density, high tensile strength, high % elongation, fire retardance, flame resistance, anti-static properties, a desired elastic modulus, solvent resistance, or a combination of any of the foregoing.

A coreactive composition can include various additives such as rheology modifiers (e.g., silica or other particulate fillers), flow control agents, plasticizers, stabilizers, wetting agents, dispersing auxiliaries, defoamers, pigment and other colorants, fire retardant, adhesion promoter, catalyst or other performance or property modifiers such as barium sulfate, clay or magnesium compounds as required to impart barrier or corrosion resistance properties.

Compositions can be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Because the thermosetting compositions can have a low viscosity compared to thermoplastic compositions it is possible to use high filler concentrations. The high filler concentrations can be used to modify the properties of the finished object such as the mechanical, thermal, and/or electrical properties of the finished object. Thus, the use of high filler concentrations facilitated by the use of three-dimensional thermosetting compositions can greatly expand the design possibilities of three-dimensional printing. Furthermore, thermosetting compositions can be provided having superior solvent and chemical resistance.

In addition to determining properties of a built object, a filler or combination of fillers can be added to the coreactive components to determine certain processing characteristics. For examples, fillers can be added to adjust the viscosity of the component, the rheology of the component, to facilitate mixing of the coreactive component, to control exotherms generated during reaction of the coreactive components, or a combination of any of the foregoing.

Components, coreactive compositions, and built objects can have a filler content, for example, from 0.1 wt % to 95 wt %, from 1 wt % to 90 wt %, from 2 wt % to 80 wt %, from 5 wt % to 70 wt %, from 10 wt % to 60 wt %, from 15 wt % to 50 wt %, or from 20 wt % to 40 wt %, where wt % is based on the total weight of the component, coreactive composition or built object.

Components, coreactive compositions, and built objects can have a filler content, for example, from 0.1 vol % to 95 vol %, from 1 vol % to 90 vol %, from 2 vol % to 80 vol %, from 5 vol % to 70 vol %, from 10 vol % to 60 vol %, from 15 vol % to 50 vol %, or from 20 vol % to 40 vol %, where vol % is based on the total volume of the component, coreactive composition or built object.

Coreactive compositions provided by the present disclosure can comprise a filler or a combination of filler. A filler can comprise, for example, an inorganic filler, an organic filler, a low-density filler, an electrically conductive filler, or a combination of any of the foregoing. A filler can comprise an organic filler, an inorganic filler, an electrically conductive filler, a low-density filler, or a combination of any of the foregoing. Fillers can be added to a composition, for example, to improve the physical properties of a cured composition, to reduce the weight of a cured composition, and/or to impart electrical conductivity to the composition.

Fillers can include organic filler, inorganic filler, metal filler and combinations of any of the foregoing.

Inorganic fillers useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, precipitated silica, silica gel, and combinations of any of the foregoing. For example, an inorganic filler can include a combination calcium carbonate and fumed silica, and the calcium carbonate and fumed silica can be treated and/or untreated. An inorganic filler can comprise calcium carbonate and fumed silica.

An inorganic filler can be coated or uncoated. For example, an inorganic filler can be coated with a hydrophobic material, such as a coating of polydimethylsiloxane.

Suitable calcium carbonate fillers include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Inorganic filler can be surface treated to provide hydrophobic or hydrophilic surfaces that can facilitate dispersion and compatibility of the inorganic filler with other components of a coreactive composition.

Inorganic fillers useful in compositions include carbon black, calcium carbonate, precipitated calcium carbonate, calcium hydroxide, hydrated alumina (aluminum hydroxide), fumed silica, silica, precipitated silica, silica gel, and combinations of any of the foregoing. For example, an inorganic filler can include a combination calcium carbonate and fumed silica, and the calcium carbonate and fumed silica can be treated and/or untreated.

An inorganic filler can be coated or uncoated. For example, an inorganic filler can be coated with a hydrophobic material, such as a coating of polydimethylsiloxane.

Compositions provided by the present disclosure can comprise silica gel or combination of silica gel. Suitable silica gels include Gasil® silica gel available from PQ Corporation, and Sylysia®, CariAct® and Sylomask® silica gel available from Fuji Silysia Chemical Ltd.

Suitable organic fillers can also have acceptable adhesion to the sulfur-containing polymer matrix. An organic filler can include solid particles, hollow particles, or a combination thereof. The particles can be generally spherical (referred to as powders), generally non-spherical (referred to as particulates), or a combination thereof.

The particles can have a mean particle diameter less than, for example, 100 µm, 50 µm, 40 µm, 30 µm, or less than 25 µm, as determined according to ASTM E-2651-13. A powder can comprise particles having a mean particle diameter with a range from 0.25 µm to 100 µm, 0.5 µm to 50 µm, from 0.5 µm to 40 µm, from 0.5 µm to 30 µm, from 0.5 µm to 20 µm, or from 0.1 µm to 10 µm. Filler particles can comprise nano-powders, comprising particles characterized by a mean particle size, for example, from 1 nm to 100 nm.

An organic filler can have a specific gravity, for example, less than 1.6, less than 1.4, less than 1.15, less than 1.1, less than 1.05, less than 1, less than 0.95, less than 0.9, less than 0.8, or less than 0.7, where specific gravity is determined according to ISO 787 (Part 10). Organic fillers can have a specific gravity, for example, within a range from 0.85 to 1.6, within a range from 0.85 to 1.4, within a range from 0.85 to 1.1, within a range from 0.9 to 1.05, or from 0.9 to 1.05, where specific gravity is determined according to ISO 787 (Part 10).

Organic fillers can comprise thermoplastics, thermosets, or a combination thereof. Examples of suitable organic fillers include epoxies, epoxy-amides, ETFE copolymers, polyethylenes, polypropylenes, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polyether sulfones, thermoplastic copolyesters, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic fillers include polyamides such as polyamide 6 and polyamide 12, polyimides, polyethylene, polyphenylene sulfides, polyether sulfones, polysulfones, polyetherimides, polyvinyl fluorides, thermoplastic copolyesters, and combinations of any of the foregoing.

Examples of suitable polyamide 6 and polyamide 12 particles are available from Toray Plastics as grades SP-500, SP-10, TR-1, and TR-2. Suitable polyamides are also available from the Arkema Group under the tradename Orgasol®, and from Evonik Industries under the tradename Vestosin®. For example, Ganzpearl® polyamides such as Ganzpearl® GPA-550 and GPA-700 are available from Persperse Sakai Trading, New York, NY.

Examples of suitable polyimide fillers are available from Evonik Industries under the tradename P84®NT.

An organic filler can include a polyethylene, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon™.

The use of organic fillers such as polyphenylene sulfide in aerospace sealants is disclosed in U.S. Pat. No. 9,422,451, which is incorporated by reference in its entirety. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4, where specific gravity is determined according to ISO 787 (Part 10). Polyphenylene sulfide particles having a density of 1.34 g/cm$^3$ and a mean particle diameter of 0.2 µm to 0.25 µm (in water, or from 0.4 µm to 0.5 µm in isopropanol) are available from Toray Industries, Inc.

Polyether sulfone particles are available from Toray Industries, Inc., which have a density of 1.37 g/cm$^3$ and a mean particle diameter from 5 µm to 60 µm.

Thermoplastic copolyester particles can be obtained from Toray Industries, Inc.

An organic filler can have any suitable shape. For example, an organic filler can comprise fractions of crushed polymer that has been filtered to a desired size range. An organic filler can comprise substantially spherical particles. Particles can be non-porous or can be porous. A porous particle can have a network of open channels that define internal surfaces.

An organic filler can have a specific gravity, for example, less than 1.15, less than 1.1, less than 1.05, less than 1, less than 0.95, less than 0.9, less than 0.8, or less than 0.7. Organic fillers can have a specific gravity, for example, within a range from 0.85 to 1.15, within a range from 0.9 to 1.1, within a range from 0.9 to 1.05, or from 0.85 to 1.05.

A filler can include a metal.

A filler can include an electrically conductive filler or combination of electrically conductive fillers. Examples of suitable electrically conductive fillers include nickel powder, graphite, nickel-coated graphite, stainless steel, or a combination of any of the foregoing.

Compositions provided by the present disclosure can comprise an electrically conductive filler. Electrical conductivity and EMI/RFI shielding effectiveness can be imparted to composition by incorporating conductive materials within the polymer. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart electrical conductivity and EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used. Electrically conductive fillers also include high band gap materials such as zinc sulfide and inorganic barium compounds.

Other examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel-plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in the compositions of the present disclosure can be any appropriate shape and size to impart electrical conductivity and EMI/RFI shielding effectiveness to the cured composition. For example, fillers can be of any shape generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. The amount of Ni-coated graphite in a base composition can range from 40 wt % to 80 wt %, or can range from 50 wt % to 70 wt %, based on the total weight of the base composition. An electrically conductive filler can comprise Ni fiber. Ni fiber can have a diameter ranging from 10 μm to 50 μm and have a length ranging from 250 μm to 750 μm. A base composition can comprise, for example, an amount of Ni fiber ranging from 2 wt % to 10 wt %, or from 4 wt % to 8 wt %, based on the total weight of the base composition.

Carbon fibers, particularly graphitized carbon fibers, can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 μm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 μm diameter round fiber having an electrical resistivity of 0.00055 Ω-cm.

The average particle size of an electrically conductive filler can be within a range useful for imparting electrical conductivity to a polymer-based composition. For example, the particle size of the one or more fillers can range from 0.25 μm to 250 μm, can range from 0.25 μm to 75 μm, or can range from 0.25 μm to 60 μm. Composition provided by the present disclosure can comprise Ketjenblack® EC-600 JD (AkzoNobel, Inc., Chicago, Ill.), an electrically conductive carbon black characterized by an iodine absorption of 1,000 mg/g to 11,500 mg/g (J0/84-5 test method), and a pore volume of 480 $cm^3/100$ g to 510 $cm^3/100$ g (DBP absorption, KTM 81-3504). An electrically conductive carbon black filler is Black Pearls® 2000 (Cabot Corporation, Boston, MA).

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50 $\Omega/cm^2$, or a sheet resistance less than 0.15 $\Omega/cm^2$. The amount and type of filler can also be selected to provide effective EM/RFI shielding over a frequency range of from 1 MHz to 18 GHz for an aperture sealed using a sealant composition of the present disclosure.

An organic filler can include a low-density filler such as an expanded thermoplastic microcapsule and/or a modified expanded thermoplastic microcapsule. Suitable modified expanded thermoplastic microcapsules can include an exterior coating of a melamine or urea/formaldehyde resin. A filler can be a low-density filler characterized by, for example, a specific gravity less than 0.7, less than 0.3, or less than 0.1. Use of a low-density filler can provide a three-dimensional printed object having a low specific gravity, such as from 0.8 to 1, or from 0.7 to 0.9.

A thermally expandable microcapsule refers to a hollow shell comprising a volatile material that expands at a predetermined temperature. Thermally expandable thermoplastic microcapsules can have an average initial particle size of 5 µm to 70 µm, in some cases 10 µm to 24 µm, or from 10 µm to 17 µm. The term "average initial particle size" refers to the average particle size (numerical weighted average of the particle size distribution) of the microcapsules prior to any expansion. The particle size distribution can be determined using a Fischer Sub-Sieve Sizer.

A thermally expandable thermoplastic microcapsule can comprise a volatile hydrocarbon or volatile halogenated hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Low-density microcapsules can be characterized by a specific gravity within a range, for example, from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787 (Part 10). Low density microcapsules can be characterized by a specific gravity, for example, less than 0.1, less than 0.09, less than 0.08, less than 0.07, less than 0.06, less than 0.05, less than 0.04, less than 0.03, or less than 0.02, wherein the specific gravity is determined according to ISO 787 (Part 10).

Low-density microcapsules can be characterized by a mean particle diameter from 1 µm to 100 µm and can have a substantially spherical shape. Low density microcapsules can be characterized, for example, by a mean particle diameter from 10 µm to 100 µm, from 10 µm to 60 µm, from 10 µm to 40 µm, or from 10 µm to 30 µm, as determined according to ASTM E-2651-13.

Low-density filler can comprise uncoated microcapsules, coated microcapsules, or combinations thereof.

Low-density filler such as low-density microcapsules can comprise expanded microcapsules having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 µm, less than 1 µm, or less than 0.5 µm. The melamine coating on the light weight microcapsules is believed to render the microcapsules reactive with the thiol-terminated polythioether prepolymer and/or the curing agent, which enhances the fuel resistance, and renders the microcapsules resistant to pressure.

The thin coating of an aminoplast resin can have a film thickness of less than 25 µm, less than 20 µm, less than 15 µm, or less than 5 µm. The thin coating of an aminoplast resin can have a film thickness of at least 0.1 nm, such as at least 10 nm, or at least 100 nm, or, in some cases, at least 500 nm.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion.

Examples of suitable melamine resins include methylated melamine resins such as Cymel™ 300, Cymel™ 301, Cymel™ 303LF, Cymel™ 303ULF, Cymel™ 304, Cymel™ 350, Cymel™ 3745, Cymel™ XW-3106, Cymel™ MM-100, Cymel™ 370, Cymel™ 373 Cymel™ 380, ASTRO MEL™ 601, ASTRO MEL™ 601ULF, ASTRO MEL™400, ASTRO MEL™ NVV-3A, Aricel PC-6A, ASTRO MEL™ CR-1, and ASTRO SET™ 90. A suitable aminoplast resin can comprise a urea-formaldehyde resin.

Low-density microcapsules can be prepared by any suitable technique, including, for example, as described U.S. Pat. Nos. 8,816,023 and 8,993,691, each of which is incorporated by reference in its entirety. Coated low density microcapsules can be obtained, for example, by preparing an aqueous dispersion of microcapsules in water with a melamine resin, under stirring. A catalyst may then be added and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added and the mixture stirred for 10 minutes. The solids can be filtered, rinsed with distilled water, and dried overnight at room temperature. The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ISO 787 (Part 10). For example, Expancel™ 920 DE 40 and Expancel® 920DE 80 can be characterized by a specific gravity of about 0.03, wherein the specific gravity is determined according to ISO 787 (Part 10).

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ISO 787 (Part 10).

Aminoplast-coated microcapsules and method of making aminoplast-coated microcapsules are disclosed, for example in U.S. Application Publication No. 2016/0083619, which is incorporated by reference in its entirety.

Compositions provided by the present disclosure can comprise, for example, from 0.1 wt % to 6 wt %, from 0.5 wt % to 5 wt %, from 1 wt % to 4 wt %, or from 2 wt % to 4 wt % of a lightweight filler or combination of lightweight fillers, where wt % is based on the total weight of the composition. Compositions provided by the present disclosure can comprise, for example, from 1 vol % to 80 vol %, from 2 vol % to 60 vol %, from 5 vol % to 50 vol %, from 10 vol % to 40 vol %, or from 20 vol % to 40 vol %, of a lightweight filler or combination of lightweight fillers, where vol % is based on the total volume of the composition.

Compositions and sealants provided by the present disclosure can comprise an inorganic filler or combination of inorganic fillers. An inorganic filler can be included to provide mechanical reinforcement and to control the rheological properties of the composition. Inorganic fillers may be added to compositions to impart desirable physical properties such as, for example, to increase the impact strength, to control the viscosity, or to modify the electrical properties of a cured composition.

Suitable fillers also include magnetic fillers and opaque fillers.

Fillers can include fiber. A fiber can comprise an inorganic fiber, an organic fiber, a ceramic fiber, a metal fiber, or a combination of any of the foregoing. Examples of suitable fiber include, glass, silica, carbon, boron, silica carbide, ceramic, metal, organic materials, and synthetic fibers. Examples of suitable synthetic fibers include nylon, polyester, polypropylene, meta-aramid, para-aramid, polyphenylene sulfide, and rayon. Fiber can serve to impart tensile strength, electrical conductivity, thermal conductivity, EMI/RFI shielding, flexural modulus, flexural strength, and/or tensile modulus, to a built object.

Examples of suitable metal fiber include steel, titanium, aluminum, gold, silver, and alloys of any of the foregoing.

Examples of suitable ceramic fiber include metal oxide (e.g., alumina) fibers, aluminosilicate fibers, boron nitride fibers, silicon carbide fibers, and combination of any of the foregoing.

Examples of suitable inorganic fiber include carbon, alumina, basalt, calcium silicate, and rock wool.

A fiber can be a glass fiber such as S-glass fibers, E-glass fibers, soda-lime-silica fibers, basalt fibers, or quartz fibers. Glass fibers may be in the form of woven and/or braided glass fibers, or non-woven glass fibers.

A fiber can include carbon (e.g., graphite) fibers, glass fibers, ceramic fibers, silicon carbide fibers, polyimide fibers, polyamide fibers, or polyethylene fibers. Continuous fibers can comprise titanium, tungsten, boron, shape memory alloy, graphite, silicon carbide, boron, aramid, poly(p-phenylene-2,6-benzobisoxazole), and combinations of any of the foregoing.

Fiber capable of withstanding high temperature include, for example, carbon fiber, high-strength glass ($SiO_2$) fiber, oxide fiber, alumina fiber, ceramic fiber, metal fiber, and fibers of high temperature thermoplastics or thermosets.

A filler can include carbon nanotubes, fullerenes, or a combination thereof.

A filler can include graphene or other, flat polycyclic aromatic hydrocarbon. Graphene can be used to impart thermal conductivity, electrical conductivity EMI/RFI shielding capability, and/or anti-static properties to a build object.

A filler can include surface-modified particles such as, for example, surface modified silica. The surface of silica particles can be modified, for example, to be tailor the hydrophobicity or hydrophilicity of the surface of the silica particle. The surface modification can affect the dispensability of the particles, the viscosity, the curing rate, and/or the adhesion.

A coreactive composition can also include a reactive rheological modifier such as a polyethylene, a polyethylene or a propylene/ethylene copolymer. Examples of suitable propylene/ethylene copolymers include Petrolite® 5000 (Baker Hughes).

Coreactive components and compositions provided by the present disclosure can include an adhesion promoter or combination of adhesion promoters.

Coreactive components and compositions provided by the present disclosure can comprise, for example, less than 0.1 wt % of an adhesion promoter, less than 0.2 wt %, less than 0.3 wt % or less than 0.4 wt % of an adhesion promoter, where wt % is based on the total weight of the curable composition. A curable composition provided by the present disclosure can comprise, for example from 0.05 wt % to 0.4 wt %, from 0.05 wt % to 0.3 wt %, from 0.05 wt % to 0.2 wt % of an adhesion promoter.

Coreactive components and compositions provided by the present disclosure can comprise an adhesion promoter or combination of adhesion promoters. An adhesion promoter can include a phenolic adhesion promoter, a combination of phenolic adhesion promoters, an organo-functional silane, a combination of organo-functional silanes, or a combination of any of the foregoing. An organosilane can be an amine-functional silane.

Coreactive components and compositions provided by the present disclosure can comprise a phenolic adhesion promoter, an organosilane, or a combination thereof. A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-mercapto- or amine-functional silanes, such as Silquest® organosilanes.

Phenolic adhesion promoters can comprise the reaction product of a condensation reaction of a phenolic resin with one or more thiol-terminated polysulfides. Phenolic adhesion promoters can be thiol-terminated.

Examples of suitable phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum®29108, Varcum®29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

Coreactive components and compositions provided by the present disclosure can comprise an organo-functional adhesion promoter such as an organo-functional silane. An organo-functional silane can comprise hydrolysable groups bonded to a silicon atom and at least one organofunctional group. An organo-functional silane can have the structure $R^a$—$(CH_2)_n$—$Si(-OR)_{3-n}R^b_n$, where $R^a$ is an organofunctional group, n is 0, 1, or 2, and R and $R^b$ is alkyl such as methyl or ethyl. Examples of organofunctional groups include epoxy, amino, methacryloxy, or sulfide groups. An organofunctional silane can be a dipodal silane having two or more silane groups, a functional dipodal silane, a non-functional dipodal silane or a combination of any of the foregoing. An organofunctional silane can be a combination of a monosilane and a dipodal silane.

An amine-functional silane can comprise a primary amine-functional silane, a secondary amine-functional silane, or a combination thereof. A primary amine-functional silane refers to a silane having primary amino group. A secondary amine-functional silane refers to a silane having a secondary amine group. An amine-functional silane can comprise, for example, from 40 wt % to 60 wt % of a primary amine-functional silane; and from 40 wt % to 60 wt % of a secondary amine-functional silane; from 45 wt % to 55 wt % of a primary amine-functional silane and from 45 wt % to 55 wt % of a secondary amine-functional silane; or from 47 wt % to 53 wt % of a primary amine-functional silane and from 47 wt % to 53 wt % of a secondary amine-functional silane; where wt % is based on the total weight of the amine-functional silane in a composition.

A secondary amine-functional silane can be a sterically hindered amine-functional silane. In a sterically hindered amine-functional silane the secondary amine can be proximate a large group or moiety that limits or restricts the degrees of freedom of the secondary amine compared to the degrees of freedom for a non-sterically hindered secondary amine. For example, in a sterically hindered secondary amine, the secondary amine can be proximate a phenyl group, a cyclohexyl group, or a branched alkyl group.

Amine-functional silanes can be monomeric amine-functional silanes having a molecular weight, for example, from 100 Daltons to 1000 Daltons, from 100 Daltons to 800 Daltons, from 100 Daltons to 600 Daltons, or from 200 Daltons to 500 Daltons.

Examples of suitable primary amine-functional silanes include 4-aminobutyltriethoxysilane, 4-amino-3,3-dimethylbutyltrimethoxysilane, N-(2-aminoethyl)-3-aminopropyltriethoxysilane, 3(n-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl)pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include aminoethylaminomethyl)phenethyltrimethoxysilane and N-(2-aminoethyl)-3-aminopropyltrimethoxysilane.

Examples of suitable secondary amine-functional silanes include 3-(A-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and A-phenylaminopropyltrimethoxysilane.

Suitable amine-functional silanes are commercially available, for example, from Gelest Inc. and from Dow Corning Corporation.

Coreactive components and compositions provided by the present disclosure can comprise less than 3 wt % of an adhesion promoter, less than 2 wt %, less than 1 wt % or less than 0.5 wt %, where wt % is based on the total weight of the curable composition.

Coreactive components and compositions provided by the present disclosure can comprise a reactive diluent or combination of reactive diluents. A reactive diluent can be used to reduce the viscosity of the composition. A reactive diluent can be a low molecular weight compound having at least one functional group capable of reacting with at least one of the major reactants of the composition and become part of the cross-linked network. A reactive diluent can have, for example, one functional group, or two functional group. A reactive dilute can be used to control the viscosity of a composition or improve the wetting of fillers in a composition.

Coreactive components and compositions can comprise one or more colorants.

A colorant refers to a substance that imparts color and/or other visual effect to the built object. A colorant can be added to the composition in any suitable form, such as discrete particles, dispersions, solutions and/or flakes. A single colorant or a mixture of two or more colorants can be used.

Examples of colorants include pigments, dyes and tints, such as those used in the paint industry and/or listed in the Dry Color Manufacturers Association (DCMA), as well as special effect compositions and materials. A colorant can include, for example, a finely divided solid powder that is insoluble but wettable under the conditions of use. A colorant can be organic or inorganic and can be agglomerated or non-agglomerated. Colorants can be incorporated into the compositions by grinding or simple mixing. Colorants can be incorporated by grinding into the composition by use of a grind vehicle, such as an acrylic grind vehicle.

Examples of suitable pigments and/or pigment compositions include carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red (DPPBO red), carbon black, and combinations of any of the foregoing.

Examples of suitable dyes include those that are solvent and/or aqueous based such as add dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, quinizarin blue (D&C violet No. 2), and triphenyl methane.

Examples of suitable tints include pigments dispersed in water-based or water miscible carriers such as Aqua-Chem® 896 commercially available from Degussa, Inc., Charisma Colorants® and Maxitoner® Industrial Colorants, commercially available from Accurate Dispersions division of Eastman Chemical, Inc.

A colorant can be in the form of a dispersion including, for example, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Examples of nanoparticle dispersions and methods for making them are identified in U.S. Pat. No. 6,875,800 B2, U.S. Application Publication No. 2005/0287354, and U.S. Application No. 2006/0251896. Nanoparticle dispersions can also be produced by crystallization, precipitation, gas phase condensation, and chemical attrition (i.e., partial dissolution). To minimize re-agglomeration of nanoparticles within the composition, a dispersion of resin-coated nanoparticles can be used. A "dispersion of resin-coated nanoparticles" refers to a continuous phase in which is dispersed discreet "composite microparticles" that comprise a nanoparticle and a resin composition on the nanoparticle.

Dispersions of non-hiding, color-imparting organic pigment nanoparticles offer particularly useful aesthetic properties in the electronics industry. Such pigment dispersions are available from PPG Industries, Inc. under the trademark Andaro™. Low levels of blue nanopigments can offset any yellowing that may occur during curing of film-forming compositions. Blue or black nanopigments enhance the appearance of the anti-glare composition, particularly over black underlayers on a substrate. Moreover, colored nanopigments may be chosen to enhance or complement the underlying color of the substrate, such as a substrate of an additively manufactured part. Nanoparticle dispersion are particularly suitable for use in curable film-forming sol-gel compositions of the present invention that comprise (i) a tetraalkoxysilane; (ii) an epoxy functional trialkoxysilane; (iii) a metal-containing catalyst; (iv) a solvent component; and (v) non-oxide particles, as described herein.

Other suitable special effect colorants include those with in the Vibrance Collection® available from PPG Industries, Inc., including the Crystal Pearl, Crystallance®, Ditzler®, Flamboyance®, Harlequin®, Liquidmetal®, Starfire®, Radiance®, and others.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. A special effect composition can produce a color shift, such that the color of the composition changes when the composition is viewed at different angles. Examples of color effect compositions are disclosed in U.S. Pat. No. 6,894,086. Additional color effect compositions can include transparent coated mica and/or synthetic mica, coated silica, coated alumina, a transparent liquid crystal pigment, a liquid crystal composition, and/or any composition wherein interference results from a refractive index differential within the material and not because of the refractive index differential between the surface of the material and the air.

In general, a colorant can be present in a composition in any amount sufficient to impart a desired property, visual and/or color effect. For example, a colorant may be present in an amount from 1 wt % to 65 wt %, such as from 3 wt % to 40 wt % or from 5 wt % to 35 wt %, where weight percent based on the total weight of a composition A composition can comprise, for example, from 1 wt % to 10 wt %, from 1 wt % to 8 wt %, or from 5 wt % to 8 wt %, where wt % is based on total weight of the composition.

Coreactive components and compositions provided by the present disclosure can include infrared (IR) reflective pigments. IR reflective pigment can be useful to reduce the temperature of an object exposed to solar radiation. An IR reflective pigment can also be useful for LIDAR detection. An IR reflective pigment can exhibit high reflectivity at a wavelength of 905 nm, such as a greater than 95% reflectivity, or greater than 99% reflectivity. Examples of useful IR reflective pigments include $TiO_2$, nickel and chromium rutile pigments, (inverse) spinel pigments, and various metal oxide based pigments available from Shepherd under the tradenames Arctic®, from BASF under the tradename Sicopal®, or from Clariant under the tradename Colanyl®.

Suitable pigments for certain embodiments of the reactive compositions may be selected from organic or inorganic color pigments and may include, for example, titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like.

A pigment can include a phosphorescent or fluorescent pigment, which can be in the form, for example, of particles or nanoparticles.

Extrusions provided by the present disclosure can comprise one or more surface coatings. The surface coatings can be used to impart a desired surface property such as, for example, electrical conductivity, reflectivity such as IR reflectivity, color, wavelength-dependent absorption, wavelength-dependent reflectivity, scratch resistance, abrasion resistance, stain resistance, fingerprint resistance, resistance to cleaning fluids, impart aesthetic qualities, and/or impart tactile properties. The coating can comprise a multilayer coating. A coating can be a haptic coating such as a soft-touch coating. The coating can be applied to an extrudate using an extrusion coating die.

A multilayer coating can include a sealer, basecoat and amid-coat basecoat, and a topcoat. A sealer can be used to improve the surface adhesion of the coating system by providing a barrier to solvent migration to the underlying primer/substrate interface. Examples of suitable sealers include ECS25. A basecoat can include a colorant such as a pigment or color-effect material. A mid-basecoat layer can include special effect pigments and can be applied overlying an in addition to the basecoat. An example of a suitable mid-basecoat is the Andaro® special effects coating available from PPG Industries, Inc. A topcoat can be applied as the outer coating layer of the multi-layer coating system. A topcoat can serve a number of purposes including abrasion resistance, scratch resistance, stain resistance, fingerprint resistance, or to facilitate cleaning. A topcoat can also impart desired optical properties such as being visually clear or having a matte finish to reduce reflection. Examples of suitable clear coats include, DC4000, available from PPG Industries, Inc. Examples of suitable matte topcoats include D8115.

The selection and thickness of the coating layers can dramatically impact the visual appearance of an intentionally textured surface. The effects include amplifying the topography and modifying the directional reflectivity. The effects can be enhanced, for example, when a mid-basecoat containing a special effect pigment such as the Vibrance Collection® including the Crystal Peal™ and Crystallance® product lines and the Andaro® pigments available from PPG Industries, Inc.

An exterior coating can comprise a coating that provides a tactile property or haptic property. For example, a coating can impart a soft-touch feel.

For example, suitable soft-touch coatings are disclosed in International Application Publication No. WO 2016/201103, and in U.S. Application Publication No. 2014/0220354, and U.S. Application Publication No. 2015/0307738.

Coating systems provided by the present disclosure can contain a colorant. A colorant can be present in one or more of the coating layers. For example, a colorant can be present in the primer coating, the sealer coating layer, the basecoat layer, the mid-coat layer or a combination of any of the foregoing. Coating layers within the coating system can comprise one or more colorants. A coating layer can comprise a colorant that is the same or different than a colorant in another coating layer.

Coreactive components and compositions provided by the present disclosure can include a photoinitiator or combination of photoinitiators. The radiation can be actinic radiation that can apply energy that can generate an initiating species from a photopolymerization initiator upon irradiation therewith, and widely includes α-rays, γ-rays, X-rays, ultraviolet (UV) light, visible light, or an electron beam. For example, the photoinitiator can be a UV photoinitiator.

For example, coreactive compositions comprising a polythiol and a polyalkenyl can be cured using actinic radiation. The polythiol/polyalkenyl system can be cured solely be free radical photoinitiation or can be partially cured by a photoinitiated free-radical mechanism. The polythiol/polyalkenyl composition include an amine catalyst. The polythiol/polyalkenyl composition can include a dark cure catalyst. For example, dark cure thiol/alkenyl catalysts are disclosed in U.S. Pat. No. 9,796,858 B2, in PCT International Publication No. WO 2017/087055 A1, and in PCT International Application No. PCT/US2018/36746, filed on Jun. 8, 2018.

Examples of suitable UV photoinitiators include α-hydroxyketones, benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacyclphosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(O-benzoyloxime), 1-[9-ethyl-6-(2-methylbenzoyl)-9H-carbazol-3-yl]-ethanone-1-(O-acetyloxim-e), trichloromethyl-triazine derivatives), 4-(4-methoxystyryl)-2,6-trichloromethyl-1,3,5-triazine), 4-(4-methoxyphenyl)-2,6-trichloromethyl-1,3,5-triazine, and α-aminoketone (1-(4-morpholinophenyl)-2-dimethylamino-2-benzyl-butan-1-one).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Other examples of suitable UV photoinitiators include the Irgacure™ products from BASF, for example the products Irgacure™ 184, Irgacure™ 500, Irgacure™ 1173, Irgacure™ 2959, Irgacure™ 745, Irgacure™ 651, Irgacure™ 369, Irgacure™ 907, Irgacure™ 1000, Irgacure™ 1300, Irgacure™ 819, Irgacure™ 819DW, Irgacure™ 2022, Irgacure™ 2100, Irgacure™ 784, Irgacure™ 250; in addition, the Irgacure™ products from BASF are used, for example the products Irgacure™ MBF, Darocur™ 1173, Darocur™ TPO, Darocur™ 4265.

A UV photoinitiator can comprise, for example, 2,2-dimethoxy-1,2-diphenylethan-1-one (Irgacure® 651, Ciba Specialty Chemicals), 2,4,6-trimethylbenzoyl-diphenyl-phosphineoxide (Darocur® TPO, Ciba Specialty Chemicals), or a combination thereof.

Other examples of suitable photoinitiators include Darocur® TPO (available from Ciba Specialty Chemicals), Lucirin® TPO (available from BASF), Speedcure® TPO (available from Lambson), Irgacure® TPO (available from Ciba Specialty Chemicals, and Omnirad® (available from IGM Resins), and combinations of any of the foregoing.

Compositions provided by the present disclosure can comprise from 1 wt % to 5 wt %, from 1.5 wt % to 4.5 wt %, from 2 wt % to 4 wt %, from 2.5 wt % to 3.5 wt % of a UV photoinitiator or combination of UV photoinitiators.

Coreactive components and compositions can comprise one or more corrosion inhibitor. Examples of suitable corrosion inhibitors include, but are not limited to, zinc phosphate-based corrosion inhibitors, for example, micronized Halox® SZP-391, Halox® 430 calcium phosphate, Halox® ZP zinc phosphate, Halox® SW-1T1 strontium phosphosilicate Halox® 720 mixed metal phosphor-carbonate, and Halox® 550 and 650 proprietary organic corrosion inhibitors commercially available from Halox, Hammond, Ind. Other suitable corrosion inhibitors may include Heucophos® ZPA zinc aluminum phosphate and Heucophos® ZMP zinc molybdenum phosphate, commercially available from Heucotech Ltd, PA.

Coreactive compositions provided by the present disclosure can be used to fabricate metal objects. The low viscosity components can incorporate a high-volume percent of metal particles. After deposition and curing, the cured composition can be fired to burn off the organic materials leaving the metal. The metal can be sintered to provide a metal part. n a similar manner, inorganic objects may be formed by incorporated a high level of a suitable filler such as silicas, glasses or other inorganic objects.

he polyisocyanate component can comprise, for example, from 80 wt % to 100 wt % of a polyisocyanate prepolymer, from 85 wt % to 95 wt %, or from 80 wt % to 90 wt %, wherein wt % is based on the total weight of the polyisocyanate component.

The polyamine component can comprise, for example, from 10 wt % to 30 wt % of a monomeric polyamine having a molecular weight from 200 Daltons to 500 Daltons; from 40 wt % to 90 wt % of a polyamine prepolymer having a molecular weight from 3,000 Daltons to 7,000 Daltons; and from 1 wt % to 20 wt % of a reactive rheological modifier, wherein wt % is based on the total weight of the polyamine component. The polyamine component can comprise, for example, from 15 wt % to 25 wt % of a monomeric polyamine having a molecular weight from 200 Daltons to 500 Daltons; from 50 wt % to 80 wt % of a polyamine prepolymer having a molecular weight from 3,000 Daltons to 7,000 Daltons; and from 5 wt % to 15 wt % of a reactive rheological modifier, wherein wt % is based on the total weight of the polyamine component.

The polyisocyanate prepolymer can comprise an isophorone diisocyanate-terminated polytetramethylene prepolymer; and the polyamine prepolymer can comprise a polyetheramine prepolymer.

The polyamine component can comprise from 0.1 wt % to 20 wt % of a filler, where wt % is based on the total weight of the polyamine component. The polyamine component can comprise from 0.1 wt % to 20 wt % of hydrophilic fumed silica, where wt % is based on the total weight of the polyamine component.

The polyisocyanate component and/or the polyamine component can be combined and extruded at room temperature. The polyisocyanate component and/or the polyamine component can be heated prior to combination in the static and/or dynamic mixer. The static and/or dynamic mixer can be at room temperature or can be heated. Prior to mixing, the polyisocyanate component and/or the polyamine component can be heated to facilitate mixing of the various components. In some cases, sufficient heat can be generated during pumping such as progressive cavity pumping, to reduce the viscosity of the polyisocyanate component and/or the polyamine component to facilitate mixing of the various components.

Additively printed objects can be fabricated using the compositions provided by the present disclosure. An additively printed object can be fabricated by deposited successive layers of a compositions comprising coreactive components. The compositions can be deposited, for example, using extrusion or using inkjet printing techniques.

Extrusion of coreactive components is well known. The coreactive components can be mixed in a barrel head pushed under pressure through a suitably shaped nozzle. The extruded composition or extrusion can be characterized by a cross-sectional profile. The cross-sectional profile can be characterized by a constant ratio of the coreactive components or by a variable ratio of the coreactive components, where the ratio can refer to the mole % ratio of the coreactive components, by the equivalents ratio of the functional groups, the wt % ratio of the reactive components, or other useful ratio. An inhomogeneous composition across the cross-sectional profile of an extrusion can be useful to impart different properties to different parts of the profile. For example, it may be useful to impart solvent resistance or electrically conductive properties to the outer portion of a profile. To facilitate adhesion between adjacent or adjoining layers such as underlying or overlying layers, it may be useful to include an excess of one or more of the coreactive functional groups. For example, a top surface or a portion of a top surface of a layer may have an excess of a first coreactive functional group, and a bottom surface or a portion of a bottom surface of an overlying layer may have an excess of a second coreactive functional group, where the first and second coreactive functional groups are reactive with each other. In this way, formation of covalent bonding between the adjoining layers is facilitated and the physical integrity of a finished three-dimensional printed object can be increased.

The rate of the curing reaction between the coreactive components can also be controlled such that the reaction is not complete when a subsequent layer is deposited on an underlying layer. In this way, coreactive components of an overlying layer can react with the coreactive components of an underlying layer to increase the strength between layers. Coreactive thermoset materials with a high degree of cross-linking can also be used to provide high solvent and chemical resistance to the finished part.

Methods provided by the present disclosure can have a high vertical to horizontal aspect ratio. The rapid curing rate afforded by additive manufacturing using coreactive components facilitates the ability to fabricate parts that tall and thin. A panel is an example of the part that is long in one dimension and thin in an orthogonal dimension. Successive layers can be built up in the vertical dimension and will not sag or distort because of the rapid rate of cure. For example, the height of a part can be at least 2 times a width, at least 4 times, 6 times, 10 times, 25 time, 50 times, 100 time, or 200 times a width of the part. After the initial few layers are deposited, the initially deposited layers can be secured such as by using a clamp to hold the part, and subsequent layers can be deposited to fabricate the tall narrow part.

The rapid curing rate of the coreactive components can be used to fabricate parts in which the overlying layer is only partially supported by the underlying layer.

Also, as a consequence of the low viscosity of the coreactive composition and the fast curing rate the rate deposition or printing speed can be high. For example, depositions can be greater than 5 cm/sec, greater than 10 cm/sec, 29 cm/sec, 50 cm/sec, 100 cm/sec, or 200 cm/sec.

The ability of an extruded curable composition to maintain structural integrity and support an overlying layer of the composition was quantified by correlating the shear storage modulus G', the shear loss modulus G", the tan δ (G"/G'), the complex viscosity $|\eta^*|$, and the viscosity, of the curable composition with the desired properties. Desired properties, also referred to as build criteria, include the ability to be deposited, the ability to maintain the shape of a deposited layer, the ability to support one or more overlying layers, and the ability to adhere or co-react with an adjacent layer. Desired properties also include parameters that impact the printability of a coreactive composition including the ability to extrude the coreactive composition from a dispensing apparatus at reasonable pressures and before the coreactive composition reaches a sufficiently high viscosity that the coreactive composition can no longer be dispensed.

The viscoelasticity of a curable composition can be determined using a rotational rheometer to measure the shear storage modulus G' and the shear loss modulus G". For purposes of the present disclosure, values for the shear storage modulus G' and the shear loss modulus G" are measured using an Anton Paar MCR 302 rheometer with a gap set to 1 mm, with a 25 mm-diameter parallel plate spindle, and an oscillation frequency of 1 Hz and amplitude of 0.3%. The tests are performed with the temperature of the rheometer plate set to be 25° C.

The printability of a reactive additive manufacturing system can depend on a number of properties such as, for example, the rate of reaction and the viscosity of the reactants. Based on empirical measurements, the printability of a coreactive composition has been defined in terms of an algorithm based on the gel time of the reactive composition, the low shear viscosity or each component before mixing, and the high shear viscosity of each component before mixing. The gel time refers to the duration from when the first and second coreactive components are first mixed until the coreactive composition solidifies and is no longer stirrable by hand. The low shear viscosity (LSV) was measured using an Anton Paar MCR 302 rheometer with a gap from 1 mm at 25° C. and a shear rate of 1 $\sec^{-1}$. The high shear viscosity (HSV) was measured using an Anton Paar MCR 302 rheometer with a gap from 1 mm at 25° C. and a shear rate of 100 $\sec^{-1}$. Buildability was based on an overall qualitative assessment of the ease of mixing, ease of extrusion, and ability of the extruded composition to maintain a deposited shape. The algorithm that modeled the experimental data shown in EQN. 1:

$$500 \times \{0.460 + \{(\text{Gel time} - 4.00) \times [(\text{Gel Time} - 4.00) \times (-0.00913)]\} + \{(\text{Log}_{10}\text{LSV1} - 5.30) \times [(\text{Log}_{10}\text{LSV1} - 5.30) \times (-0.00428)]\} + \{(\text{Log}_{10}\text{HSV1} - 5.30) \times [(\text{Log}_{10}\text{HSV1} - 5.30) \times (-0.00426)]\} + \{(\text{Log}_{10}\text{LSV2} - 5.30) \times [(\text{Log}_{10}\text{LSV2} - 5.30) \times (-0.00427)]\} + \{(\text{Log}_{10}\text{LSV2} - 5.30) \times [(\text{Log}_{10}\text{LSV2} - 5.30) \times (-0.00425)]\} \geq 100 \quad \text{EQN. 1}$$

where LSV1 and HSV1 are the low and high shear viscosity of the first component and the LSV2 and HSV2 are the low and high shear viscosity of the second component. The model represented by EQN. 1 was based on experimental data obtained for the polyurea system of Example 1, where the first component contained a polyisocyanate and the second component contained a polyamine. The parameters were scaled such that the composition was printable above a threshold value of 100. Similar models can be developed for different curing systems and especially systems with significantly different gel times than polyureas.

Methods provided by the present disclosure include coextrusion. In addition to a first coreactive composition, other compositions which may or may not be coreactive compositions can be coextruded. The additional compositions can be included to vary the composition of an extrudate across the profile of the extrudate. The coextrusion may add a surface layer to impart a surface property to the part such as a barrier coating, a color coating, a solvent resistant coating, as scratch resistant coating, an adhesive coating, a flame-resistant coating, a haptic or tactile effects coating, or an electrically conductive coating. Many possible coextruded parts can be fabricated.

Methods comprise, for example, providing a third component into a third pump; and pumping the third component into the mixer. The third component can comprise a third compound, wherein the third compound is reactive with the first compound, the third compound is reactive with the second compound, or the third compound is reactive with both the first component and the second component. The third compound may not reactive with the first compound and the second compound Methods can comprise providing one or more additional components into one or more respective pumps; and pumping the one or more additional components into the mixer to provide the coreactive composition.

Other material properties that can but adjusted to establish properties suitable for coreactive additive manufacturing include, for example, the use of aromatic polyamines or aliphatic polyamines, the amount and proportion of hard and soft segments in the prepolymer backbone, the molecular weight and functionality of the prepolymer, the presence of non-reactive pendent groups, the presence of pendent hydroxyl groups, the glass transition temperature of the prepolymer, the reactivity of the isocyanate and amine groups, the amount and types of fillers used, the isocyanate to amine mix ration, the steric hindrance of the reactants, and a combination of any of the foregoing.

Three-dimensional objects printed according to methods provided by the present disclosure provide benefits over previous additively manufactured objects in both the process for producing the object and in the properties of final object. For example, the deposition methods may not require any use of added heat, therefore avoiding the creation of stress buildup in the finished object during cooling as can occur with three-dimensional printing of thermoplastic materials. The coreactive compositions provided by the present disclosure can have sufficiently low viscosity that the compositions may be pumped and printed quickly and accurately. By using coreactive compositions that react fast and remain in place following deposition, improved control over the shape and dimensions of a printed object may be realized. In addition, the coreactive compositions provided by the present disclosure may include materials that provide additional properties to the object such as magnetic or conductive including electrical and/or thermally conductive, properties, and strength. Strengthening components include, for example, carbon fiber, glass fiber, and graphene. Colorants such as pigments or dyes can also be included in a printing composition. For coreactive compositions that crosslink quickly, strength in the printed object allows for rapid addition of further layers on top of the previously printed portion of the object. Another benefit of the disclosed materials and methods is strength as provided in the "z direction" of the printed object, where the x and y direction are the general planes of the building of the three-dimensional object. Traditional three-dimensional printing provides minimal adhesion between layers of the printed object, particularly when thermoplastic materials are used. By providing material that forms covalent crosslinks between successive layers, the final printed object can have increased strength in the z direction.

Because the reaction product of coreactive materials can be adhesive the use of a low surface energy build surface may be appropriate. Low surface energy build surfaces include, for example, polyolefins and fluoropolymers. Alternatively, a build surface may be coated with a mold release agent such as those used in polyurethane injection molding.

The use of low viscosity coreactive or thermoset compositions can facilitate deposition at room temperature thereby avoiding the high temperature print heads characteristic of thermoplastic three-dimensional printing apparatus. The use of thermosetting materials can facilitate the use of simple and light weight print heads that can be moved rapidly and precisely and can further simplify the various drive mechanisms.

Depending in part on control of the rheology profile and cure rate of the thermosetting compositions, it is possible to rapidly build parts with high structural integrity. The structural strength between adjacent layers can also facilitate the ability to construct shapes that overhang an underlying layer.

The at least two coreactive components can be deposited from a single nozzle. In such cases the coreactive components can be mixed and deposited before the curing reaction significantly proceeds, or the coreactive components may have, for example, a sufficiently slow curing rate that they remain in liquid form following mixing. The slowly reacting components can be deposited and a catalyst can then be deposited from a separate nozzle to initiate the curing reaction between the two coreactive components. Rather than be deposited as large droplets, the coreactive components can be deposited as a spray. Deposition in the form of a spray can facilitate the ability of the two coreactive components to mix prior to deposition. Because reactive thermoset compositions can have low viscosities, compared to thermoplastic compositions, deposition using sprays can be facilitated.

Compositions and methods provided by the present disclosure can be used to fabricate an object. Examples of objects include seal caps, shoe soles, medical implants, automotive parts (interior or exterior), aerospace parts, tools, tooling for metal casting, military parts, and any other suitable part or apparatus.

Aspects of the Invention

Aspect 1. A method of reactive additive manufacturing, comprising: providing a first component comprising a first prepolymer into a first pump; providing a second component comprising a second prepolymer into a second pump, wherein the second prepolymer is reactive with the first prepolymer; pumping the first component from the first pump, and the second component from the second pump through a mixer to provide a reactive compositions; and depositing the reactive composition through a nozzle connected to the mixer.

Aspect 2. The method of aspect 1, wherein the first component comprises a polyisocyanate prepolymer; and the second component comprises a polyamine prepolymer.

Aspect 3. The method of any one of aspects 1 to 2, wherein each of the first pump and the second pump independently comprise a syringe pump, a peristaltic pump, or a progressive cavity pump.

Aspect 4 The method of any one of aspects 1 to 3, wherein each of the first pump and the second pump comprise a progressive cavity pump.

Aspect 5. The method of any one of aspects 1 to 4, wherein the mixer comprises a static mixer, a dynamic mixer, or a combination thereof.

Aspect 6. The method of any one of aspects 1 to 5, wherein the mixer comprises a static mixer.

Aspect 7. A reactive additive manufacturing composition, comprising: a first component comprising a polyisocyanate prepolymer and a first viscosity; and a second component comprising a polyamine prepolymer and a second viscosity, wherein the first viscosity is within 20% of the second viscosity, wherein viscosity is measured using an Anton Paar MCR 301 or 302 rheometer with a 25 mm-diameter parallel plate spindle, an oscillation frequency of 1 Hz and amplitude of 0.3%, and with a rheometer plate temperature of 25° C.

Aspect 8. The composition of aspect 7, wherein the first viscosity is within +10% of the second viscosity.

Aspect 9. The composition of any one of aspects 7 to 8, wherein the first component, the second component, or both the first component and the second component comprise from 0.1 wt % to 30 wt % of a filler, wherein wt % is based on the total weight of the first component, the second component, or both the first and second components, respectively.

Aspect 10. The composition of any one of aspects 7 to 9, wherein the filler comprises an inorganic filler, an organic filler, or a combination thereof.

Aspect 11. The composition of any one of aspects 7 to 10, wherein, the polyisocyanate prepolymer comprises a difunctional polyisocyanate prepolymer; and the polyamine prepolymer comprises a difunctional polyamine prepolymer.

Aspect 12. The composition of anyone of aspects 7 to 11, wherein the polyisocyanate prepolymer comprises an isocyanate-terminated polytetramethylene prepolymer.

Aspect 13. The composition of any one of aspects 7 to 12, wherein the polyisocyanate prepolymer comprises an isophorone-terminated polytetramethylene prepolymer.

Aspect 14. The composition of any one of aspects 7 to 13, wherein the polyamine prepolymer comprises a trifunctional polyetheramine.

Aspect 15. The composition of any one of aspects 7 to 14, wherein the polyamine prepolymer comprising a difunctional polyamine, a trifunctional polyamine, or a combination thereof.

Aspect 16. The composition of any one of aspects 7 to 15, wherein the second component comprises a monomeric diamine and a rheology modifier.

Aspect 17. The composition of any one of aspects 7 to 16, wherein the second component comprises a secondary aliphatic diamine and a polyethylene/polypropylene copolymer.

Aspect 18. The composition of any one of aspects 7 to 17, wherein, the first component comprises from 80 wt % to 100 wt % of the polyisocyanate prepolymer, wherein wt % is based on the total weight of the first component; and the second component comprises: from 10 wt % to 30 wt % of a monomeric polyamine having a molecular weight within a range from 200 Daltons to 500 Daltons; from 40 wt % to 90 wt % of a polyamine prepolymer having a molecular weight within a range from 3,000 Daltons to 7,000 Daltons; and from 1 wt % to 20 wt % of a rheology modifier, wherein wt % is based on the total weight of the second component.

Aspect 19. The composition of aspect 18, wherein, the polyisocyanate prepolymer comprises an isophorone diisocyanate-terminated polytetramethylene prepolymer; and the polyamine prepolymer comprises a polyetheramine prepolymer.

Aspect 20. The composition of aspect 18, wherein, the polyisocyanate prepolymer comprises an isophorone diisocyanate-terminated polyetheramine prepolymer, such as an isophorone diisocyanate-terminated polyoxypropylenediamine prepolymer; and the polyamine prepolymer comprises a polyetheramine prepolymer.

Aspect 21. The composition of aspect 18, wherein, the polyisocyanate prepolymer comprises an isophorone diisocyanate-terminated polyoxypropylenediamine prepolymer; and the polyamine prepolymer comprises a polyetheramine prepolymer.

Aspect 22. The composition of any one of aspects 18 to 21, wherein the monomeric amine comprises a secondary aliphatic diamine; and the rheology modifier comprises a propylene/ethylene copolymer.

Aspect 23. The composition of any one of aspects 18 to 22, wherein the second component comprises from 0.1 wt % to 20 wt % of a filler, wherein wt % is based on the total weight of the second component.

Aspect 24. The composition of any one of aspects 18 to 23, wherein the second component comprises from 0.1 wt % to 20 wt % of hydrophilic fumed silica wherein wt % is based on the total weight of the second component.

Aspect 25. The composition of any one of aspects 7 to 24, wherein the composition has an initial G"/G' ratio, immediately after mixing the first and second component, of greater than 2, wherein the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

Aspect 26. The composition of any one of aspects 7 to 25, wherein the composition has a G"/G' ratio at 7 minutes after mixing the first and second component of greater than 1, wherein the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

Aspect 27. The composition of anyone of aspects 7 to 26, wherein the composition is characterized by a tack free time of greater than 3 minutes.

Aspect 28. An object formed using the composition of any one of aspects 7 to 27.

Aspect 29. The object of aspect 28, wherein the object comprises a plurality of layers, wherein adjacent layers forming the object are covalently bonded.

Aspect 30. A method of additive manufacturing, comprising extruding the composition of any one of aspects 7 to 27 using a two-component progressive cavity pump.

Aspect 31. The method of aspect 30, wherein the method comprises extruding each of the first component and the second component into a mixer.

Aspect 32. The method of any one of aspects 30 to 31, wherein the method comprises extruding each of the first component and the second component into a mixer having an exit orifice diameter from 0.6 mm to 2.5 mm, and a length from 30 mm to 150 mm.

Aspect 33. The method of any one of aspects 30 to 32, wherein the method comprises extruding each of the first component and the second component into a mixer, wherein the composition has a residence time in the mixer within a range from 0.25 seconds to 5 seconds.

Aspect 1A. A method of reactive additive manufacturing, comprising providing a first component comprising a first compound into a first pump; providing a second component comprising a second compound into a second pump, wherein the first compound is reactive with the second compound; pumping the first component from the first pump, and pumping the second component from the second pump through a mixer to provide a coreactive composition; and depositing the coreactive composition.

Aspect 2A. The method of aspect 1A, wherein the first pump and the second pump are coupled in series.

Aspect 3A. The method of any one of aspects 1A to 2A, wherein the first pump and the second pump are coupled in parallel.

Aspect 4A. The method of any one of aspects 1A to 3A, wherein each of the first pump and the second pump independently comprising a positive displacement pump, a syringe pump, a piston pump, or a progressive cavity pump.

Aspect 5A. The method of any one of aspects 1A to 3A, wherein each of the first pump and the second pump comprises a progressive cavity pump.

Aspect 6A. The method of any one of aspects 1A to 3A, wherein each of the first pump and the second pump comprises a static pump, a dynamic pump, or a combination thereof.

Aspect 7A. The method of any one of aspects 1A to 6A, wherein the mixer comprises a static mixer, a dynamic mixer, or a combination thereof.

Aspect 8A. The method of any one of aspects 1A to 7A, wherein the first component comprises a prepolymer, the second component comprises a prepolymer, or both the first component and the second component comprise a prepolymer.

Aspect 9A. The method of any one of aspects 1A to 8A, wherein, the first component comprises two or more first compounds; and the second component comprises two or more second compounds.

Aspect 10A. The method of aspect 9A, wherein, the two or more first compounds comprise an average functionality of a first functional group from 2 to 6; and the two or more second compounds comprise an average functionality of a second functional group from 2 to 6, wherein the first functional group is reactive with the second functional group.

Aspect 11A. The method of any one of aspects 1A to 10A, wherein the first component, the second component, or both the first and second components independently comprise a viscosity from 200 centipoise to 20,000,000 centipoise, measured using an Anton Paar MCR 302 rheometer with a gap from 1 mm at 25° C. and a shear rate of 100 sec$^{-1}$.

Aspect 12A. The method of any one of aspects 1A to 10A, wherein the first component, the second component, or both the first and second components independently comprise a viscosity from 5,000 centipoise to 15,000,000 centipoise, measured using an Anton Paar MCR 302 rheometer with a gap from 1 mm at 25° C. and a shear rate of 100 sec$^{-1}$.

Aspect 13A. The method of any one of aspects 1A to 10A, wherein, the first component comprises a first viscosity; and the second component comprises a second viscosity, wherein the first viscosity is within 50% of the second viscosity, wherein viscosity is measured using an measured using an Anton Paar MCR 302 rheometer with a 1 mm gap at a plate temperature of 25° C. and a shear rate of 100 sec$^{-1}$.

Aspect 14A. The method of any one of aspects 1A to 13A, wherein, the first compound comprises a first monomer, a first prepolymer, or a combination thereof; the second compound comprises a second monomer, a second prepolymer, or a combination thereof; and the first monomer and the first prepolymer is reactive with the second monomer and the second prepolymer.

Aspect 15A. The method of any one of aspects 1A to 14A, wherein, the first compound comprises at least one first prepolymer; the second compound comprises at least one second prepolymer; and the at least one first prepolymer is reactive with the at least one second prepolymer.

Aspect 16A. The method of any one of aspects 1A to 15A, wherein the first compound comprises a polyamine and the second compound comprises a polyisocyanate.

Aspect 17A. The method of any one of aspects 1A to 15A, wherein the first compound comprises a polyalkenyl compound and the second compound comprises a polythiol.

Aspect 18A. The method of any one of aspects 1A to 15A, wherein the first compound comprises a Michael acceptor and the second compound comprises a Michael donor.

Aspect 19A. The method of any one of aspects 1A to 15A, wherein the first compound comprises a polyepoxide and the second compound comprises a polythiol.

Aspect 20A. The method of any one of aspects 1A to 15A, wherein the first compound comprises a polyepoxide and the second compound comprises a polyamine.

Aspect 21A. The method of any one of aspects 1A to 15A, wherein, the first compound comprises a polyisocyanate prepolymer, wherein the polyisocyanate prepolymer comprises a difunctional polyisocyanate prepolymer, a trifunctional polyisocyanate prepolymer, or a combination thereof; and the second compound comprises a polyamine prepolymer, wherein the polyamine prepolymer comprises a difunctional polyamine prepolymer, a trifunctional polyamine prepolymer, or a combination thereof.

Aspect 22A. The method of any one of aspects 1A to 15A, wherein, the first compound comprises a first functional group; the second a compound comprises a second functional group; and the first functional group is reactive with the second functional group.

Aspect 23A. The method of aspect 22A, wherein, the first compound comprises from 2 to 6 first functional groups; and the second compound comprises from 2 to 6 second functional groups; and the first functional group is reactive with the second functional group.

Aspect 24A. The method of aspect 22A, wherein, the first functional group is isocyanate and the second functional group is a primary amine, a secondary amine or a combination thereof.

Aspect 25A. The method of aspect 22A, wherein, the first functional group comprises a thiol and the second functional group comprises an alkenyl.

Aspect 26A. The method of aspect 22A, wherein the first functional group comprises a thiol and the second functional group comprises an epoxy.

Aspect 27A. The method of aspect 22A, wherein the first functional group comprises a Michael donor and the second functional group comprises a Michael acceptor.

Aspect 28A. The method of aspect 22A, wherein the first functional group comprises an acrylate group, a maleic group, a fumaric group, an acetoacetonate group, or a combination of any of the foregoing, and the second functional group comprises a primary amine, a secondary amine, a malonate; or a combination of any of the foregoing.

Aspect 29A. The method of aspect 22A, wherein the first functional group comprises an epoxy; and the second functional group comprise a primary amine, a secondary amine or a combination thereof.

Aspect 30A. The method of any one of aspects 1A to 29A, wherein the coreactive composition comprises a dynamic viscosity from 200 centipoise to 20,0000 centipoise, wherein the dynamic viscosity is measured using an Anton Paar MCR 302 rheometer with a 25 mm-diameter parallel plate spindle, an oscillation frequency of 1 Hz and amplitude of 0.3%, and with a rheometer plate temperature of 25° C.

Aspect 31A. The method of any one of aspects 1A to 29A, wherein the coreactive composition comprises a dynamic viscosity from 5,000 centipoise to 15,000,000 centipoise, wherein the dynamic viscosity is measured using an Anton Paar MCR 302 rheometer with a 25 mm-diameter parallel plate spindle, an oscillation frequency of 1 Hz and amplitude of 0.3%, and with a rheometer plate temperature of 25° C.

Aspect 32A. The method of any one of aspects 1A to 31A, wherein the coreactive composition is characterized by a gel time less than 5 minutes at 25° C.

Aspect 33A. The method of any one of aspects 1A to 32A, wherein a residence time of the coreactive composition is less than the gel time of the coreactive composition.

Aspect 34A. The method of any one of aspects 1A to 33A, wherein the first component, the second component, or both the first component and second component independently comprise a filler; and the coreactive composition comprises a filler.

Aspect 35A. The method of aspect 34A, wherein the filler comprises a lightweight filler.

Aspect 36A. The method of any one of aspects 34A to 35A, wherein the filler has a specific gravity less than 0.7.

Aspect 37A. The method of any one of aspects 34A to 37A, wherein the filler comprises an electrically-conductive filler, a magnetic filler, a thermally-conductive filler, or a combination of any of the foregoing.

Aspect 38A. The method of aspect 34A, wherein the filler comprises carbon fiber, glass fiber, graphene, metal, or a combination of any of the foregoing.

Aspect 39A. The method of any one of aspects 34A to 38A, wherein the first component, the second component, or both the first and second components independently comprise from 0.1 wt % to 95 wt % of a filler, wherein wt % is based on the total weight of the first component or the second component.

Aspect 40A. The method of any one of aspects 34A to 38A, wherein the first component, the second component, or both the first and second components independently comprise from 0.1 vol % to 95 vol % of a filler, wherein vol % is based on the total weight of the first component or the second component.

Aspect 41A. The method of any one of aspects 1A to 40A, wherein the coreactive composition comprises from 0.1 wt % to 95 wt % of a filler, wherein wt % is based on the total weight of the coreactive composition.

Aspect 42A. The method of any one of aspects 1A to 40A, wherein the coreactive composition comprises from 0.1 vol % to 95 vol % of a filler, wherein vol % is based on the total weight of the coreactive composition.

Aspect 43A. The method of any one of aspects 1A to 42A, wherein depositing comprises extrusion.

Aspect 44A. The method of any one of aspects 1A to 43A, wherein depositing comprises depositing a first layer and a depositing a second layer adjoining the first layer, wherein the second layer chemically reacts with the first layer.

Aspect 45. The method of any one of aspects 1A to 44A, wherein depositing comprises depositing the first layer and the second layer simultaneously.

Aspect 46A. The method of any one of aspects 1A to 45A, wherein depositing comprises depositing the first layer and the second layer sequentially.

Aspect 47A. The method of any one of aspects 1A to 44A, wherein, depositing comprises depositing a first layer and depositing a second layer adjoining the first layer; and the second layer is deposited before the first compound and the second compound are fully reacted.

Aspect 48A. The method of any one of aspects 1A to 47A, wherein depositing comprises extruding the coreactive composition through an orifice having a dimension from 0.2 mm to 50 mm.

Aspect 49A. The method of any one of aspects 1A to 48A, wherein depositing comprises depositing two or more successive layers.

Aspect 50A. The method of any one of aspects 1A to 49A, comprising applying actinic radiation to the coreactive composition during mixing, during depositing, after depositing, or a combination of any of the foregoing.

Aspect 51A. The method of any one of aspects 1A to 50A, wherein the first component, the second component, or both the first and second components comprise a photoinitiator.

Aspect 52A. The method of any one of aspects 1A to 51A, wherein the first component, the second component, or both the first and second components comprise a catalyst, wherein the catalyst is effective in catalyzing the reaction between the first compound and the second compound.

Aspect 53A. The method of any one of aspects 1A to 52A, wherein depositing comprises coextrusion.

Aspect 54A. The method of any one of aspects 1A to 53A, wherein the method comprises: providing a third component into a third pump; and pumping the third component into the mixer.

Aspect 55A. The method of aspect 54A, wherein the third component comprises a third compound, wherein the third compound is reactive with the first compound, the third compound is reactive with the second compound, or the third compound is reactive with both the first component and within the second component.

Aspect 56A. The method of any one of aspects 54A to 55A, wherein the third compound is not reactive with the first compound and the second compound.

Aspect 57. The method of any one of aspects 1A to 56A, wherein the method comprises providing one or more additional components into one or more respective pumps; and pumping the one or more additional components into the mixer to provide the coreactive composition.

Aspect 58A. The method of any one of aspects 1A to 57A, wherein depositing comprises forming an extrudate.

Aspect 59A. The method of aspect 58A, wherein the extrudate is characterized by a cross-sectional profile having a first portion and a second portion.

Aspect 60A. The method of aspect 59A, wherein, the first portion comprises a molar ratio of the first compound to the second compound greater than 1 and the second portion comprises a molar ratio of the first compound to the second compound less than 1.

Aspect 61A. The method of any one of aspects 59A to 60A, wherein the first portion and the second portion are on opposite sides of a cross-sectional profile of the extrudate.

Aspect 62A. The method of any one of aspects 59A to 61A, wherein, the first portion comprises an equivalent ratio of a first functional group to a second functional group greater than 1; and the second portion comprises an equivalent ratio of a first functional group to a second functional group less than 1, wherein the first functional group is reactive with the second functional group.

Aspect 63A. The method of any one of aspects 59A to 61A, wherein an equivalents ratio of the first component to the second component is not homogeneous throughout a cross-sectional profile of the extrudate.

Aspect 64A. The method of any one of aspects 59A to 61A, wherein an equivalents ratio of the first component to the second component is homogeneous throughout the cross-sectional profile of the extrudate.

Aspect 65A. An extrudate formed by the method of any one of aspects 1A to 64A.

Aspect 66A. An object formed using the method of any one of aspects 1A to 64A.

Aspect 67A. The object of aspect 66A, wherein the object comprises a plurality of layers, wherein adjacent layers forming the object are covalently bonded.

Aspect 68A. The object of any one of aspects 66A to 67A, wherein the object is characterized by a sheet resistance less than 0.5 $\Omega/cm^2$ or less 0.15 $\Omega/cm^2$.

Aspect 69A. The object of any one of aspects 66A to 68A, wherein the object provides an attenuation of at least 10 dB within a frequency range between 1 MHz to 18 GHz.

Aspect 70A. The object of any one of aspects 66A to 69A, wherein the object is characterized by a specific gravity less than 0.9.

It should be understood that, where not mutually exclusive, the various features of the embodiments of the present disclosure described, shown and/or claimed herein may be used in combination with each other. In addition, the following Examples are presented to demonstrate the general principles of the methods and compositions provided by the present disclosure. All amounts listed are described in parts by weight, unless otherwise indicated. The invention should not be considered as limited to the specific Examples presented.

EXAMPLES

Example 1

Polyurea Rheology Characterization

The rheology of three-dimensional printing formulations was determined using an Anton Paar 302 rheometer. Two-component (a polyamine component and; a polyisocyanate component) samples were dispensed using a ViscoTec ecoDUO 450 precision dosing system fitted with an in-line static mixer having an orifice diameter of 0.9 mm, a static mixing length of 16 turns, and a dispensing length of 2.54 cm, and then immediately deposited onto the rheometer to fill the sample gap (1 mL to 2 mL). A disposable sample plate (Anton Paar, Cat. No. 4847) was placed on the rheometer and used as the bottom plate in the measurements. A disposable parallel plate spindle with a diameter of 25 mm (PP25) was used for the measurements. The spindle was brought toward the sample immediately after loading, with the gap set at 1 mm. An oscillation measurement (frequency 1 Hz, amplitude 0.3%) was then applied. Rheological parameters (G', G", tan δ, |η*|) were recorded over time. The tests were performed under ambient condition with the temperature of the rheometer plate set to be 25° C. The results are shown in Table 3.

The polyamine component contained 66 wt % Jeffamine® T5000 (polyoxyalkylene primary amine (glycerol tris[poly(propylene glycol), amine terminated] ether) of approximately 5,000 MW, available from Huntsman Corp.), 19 wt % Clearlink® 1000 (aliphatic secondary amine, available from Dorf-Ketal Chemicals, LLC.), and 10 wt % Petrolite® 5000 (propylene/ethylene copolymer, available from Baker Hughes), where wt % is based on the total weight of the polyamine component The polyamine component further contained either 5 wt % or 8.5 wt % of Cab-o-Sil® TS-720 (fumed silica available from Cabot Corp.) filler.

The isocyanate component contained either the reaction product of 77 wt % Jeffamine® D-2000 (polyoxypropylenediamine) and 23 wt % isophorone diisocyanate; or the reaction product of 73 wt % Polymeg® 2000 (polytetramethylene ether glycol) and 27 wt % isophorone diisocyanate, where wt % is based on the total weight of the composition.

TABLE 3

Dynamic modulus parameters for the polyurea formulations.

| Formulation | Isocyanate Component | Filler wt % Cabosil® TS-720 | G' t = 0 | G" t = 0 | G"/G' | δ |
|---|---|---|---|---|---|---|
| A1 | Polymeg® 2000/IPDI | 5 | 762 | 2050 | 2.69 | 69.61 |
| A2 | Polymeg® 2000/IPDI | 5 | 3500 | 8500 | 2.43 | 67.62 |
| B | Polymeg® 2000/IPDI | 8.5 | 654 | 3110 | 4.76 | 78.12 |
| C1 | Jeffamine® D2000/IPDI | 5 | 102 | 342 | 3.35 | 73.39 |
| C2 | Jeffamine® D2000/IPDI | 5 | 120000 | 120000 | 1.00 | 45.00 |
| D | Jeffamine® D2000/IPDI | 8.5 | 8330 | 9390 | 1.13 | 48.42 |

Formulations A1, A2, B and D could be successfully printed.

Formulations C1 and C2 cured too fast and clogged the dispensing nozzle. The large variability in the G and G" values for C1 and C2 are an artifact of the rapid curing. Compositions C1 and C2 are the same, however, because the C1 and C2 compositions cure very fast it is difficult to establish t=0, which results in a large apparent variability in the initial G' and G" values. Increasing the filler content from 5 wt % to 8.5 wt % slowed the curing rate so that the Jeffamine® D-2000/IPDI composition could be successfully printed.

Example 2

Polyurea Tack-Free Times

A hand pump was used to extrude the polyurea formulations of Example 1. The Jeffamine® D2000 formulations (C1, C2, and D) were considerably more difficult to pump than the Polymeg®2000 formulations (A1, A2, and B), and gelled in the nozzle quickly. The tack-free time was determined using a drawdown method at a 1-mil (0.0254-mm) thickness. For the drawdown method 1-mil (0.0254-mm) thick uniform film was applied the length of an 8%-inch× 11-inch (21.6-cm×27.94-cm) sheet of polyethylene using a square frame 8 path applicator #34 (Precision Gage & Tool Co.). About 10 mL of the polyurea formulation was extruded within the boundaries of the applicator, which is coated with Chem Trend MR-515 release agent to prevent curing on the applicator. When the film is drawn down, a cotton ball is gently pressed against the film and removed (a dab). The quantity of adhered cotton is visually monitored as the cotton ball is repeatedly dabbed against the film without dabbing the same area more than once. As the quantity of adhere cotton decreases, the frequency of dabbing increases, such that the dabbing interval is no longer than 5 see when there is almost no cotton adhered to the film. The time recorded from when the film is drawn down until no cotton adheres to the film is the tack-free time. The results are shown in Table 4.

TABLE 4

Tack-free time of co-reactive formulations.

| Sample | Polyisocyanate Prepolymer | Filler (wt %) Cabosil® TS-720 | Tack-Free Time (min:sec) |
|---|---|---|---|
| C1 | Jeffamine® D2000/IPDI | 5 wt % | 3:26 |
| D | Jeffamine® D2000/IPDI | 8.5 wt % | 2:48 |
| A1 | Polymeg® 2000/IPDI | 5 wt % | 4:47 |
| B1 | Polymeg® 2000/IPDI | 8.5 wt % | 5:39 |
| B2 | Polymeg® 2000/IPDI | 8.5 wt % | 5:36 |

Example 3

Thiol-Epoxy Composition

A viscous, commercially available two-part thiol-epoxy sealant was diluted to lower the viscosity to facilitate reactive extrusion.

The polyepoxide component was prepared by diluting 98.3 g PR-2001 Class B (Part A), a polyepoxide sealant component commercially available from PPG Aerospace, with 1.7 g acetone (Sigma Aldrich). The mixture was then dispersed on a Flacktek Speedmixer™ at 2,000 rpm with vacuum pressure at 5 psi (34.47 kPa), for 2 minutes.

The polythiol component was prepared by diluting 85.9 g PR-2001 Class B (Part B), a polythiol sealant component commercially available from PPG Aerospace with 14.1 g acetone (Sigma Aldrich). The mixture is then dispersed on a Flacktek Speedmixer™ at 2000 rpm with vacuum pressure at 5 psi (34.47 kPa), for 2 minutes.

The formulations were transferred from to an Optimum® cartridge (Nordson EFD) using a Flacktek SpeedDisc™ and are suitable for additive manufacturing by reactive extrusion with a ViscoTec two cavity extruder using finite-difference methods.

Example 4

Rheology Measurement Procedure

An MCR 302 Anton Paar rheometer equipped with a P-PTD200 measurement cell with a flange height of 14 mm was used to measure the rheological properties of the compositions. All measurements were made at a temperature of 25° C. A RheoCompass™ software package (Anton Paar) was used for instrument control and data analysis.

For single components (before combining with the complementary reactive component) the rheometer was equipped with a PP25, 25 mm-diameter parallel plate spindle (Anton Paar). Using the RheoCompass™ software, to obtain a rheology profile the instrument was set to shear mode and 21 data points were collected as the shear rate increased from 0.1 sec$^{-1}$ to 100 sec$^{-1}$ on a log scale. The time (s), viscosity (cP), shear rate (sec$^{-1}$), shear stress (Pa)

and torque (mNm) were recorded. Samples were extruded to cover the diameter of the spindle.

For measurements of the co-reactive composition (after combining the first and second components) the rheometer was equipped with a PP25, 25 mm-diameter parallel plate spindle (Anton Paar) and a disposable aluminum pan (Anton Paar).

Using the RheoCompass™ software, to obtain rheology profile, the rheometer was set to oscillatory mode at an angular frequency of 1 sec$^{-1}$ with the shear strain held constant at 3% and at a temperature of 25° C. For each profile, 100 data points were collected at an interval of 0.2 min. The storage modulus (Pa), loss modulus (Pa), damping factor, complex viscosity (Pa×S), deflection angle (mrad), torque (μNm), time (min), and phase angle (degrees) were recorded. Samples were extruded to cover the diameter of the spindle. This method was also used to measure the dynamic viscosity of the coreactive composition.

Example 5

Thiol-Ene Coreactive Composition

Additive manufacturing using thiol-ene chemistry was performed by combining an acrylate component and a thiol component. The constituents of the acrylate component are provided in Table 5.

TABLE 5

Acrylate component.

| Component | Parts by Weight (g) | | | | |
|---|---|---|---|---|---|
| | A-1 | A-2 | A-3 | A-4 | A-5 |
| $^1$SR399LV | 94.00 | 94.00 | 94.00 | 94.00 | 94.00 |
| $^2$TPP Catalyst Solution | 3.13 | 3.13 | 3.13 | 3.13 | 3.13 |
| $^3$Aerosil ® 200 | 0.00 | 4.70 | 0.00 | 0.00 | 0.00 |
| $^4$Lo-Vel ™ 27 | 0.00 | 0.00 | 14.10 | 0.00 | 0.00 |
| $^5$Hi-Sil ™ EZ160G | 0.00 | 0.00 | 0.00 | 14.10 | 0.00 |
| $^6$Carbon Blend | 0.00 | 0.00 | 0.00 | 0.00 | 2.82 |

$^1$SR399LV, dipentaerythritol pentaacrylate, CAS# 60506-81-2, commercially available from Arkema.
$^2$TPP Catalyst Solution, 15% (by weight) solution of triphenylphosphine in acetone, CAS# 603-35-0 for crystalline triphenylphosphine, commercially available from Fisher Scientific.
$^3$Aerosil ® 200, hydrophilic fumed silica, CAS# 7631-86-9, commercially available from Evonik.
$^4$Lo-Vel ™ 27, silica flattening agent, CAS# 63231-67-4, commercially available from PPG Industries.
$^5$Hi-Sil ™ EZ160G, precipitated silica, CAS# 112926-00-8, commercially available from PPG Industries. ®
$^6$Carbon Blend, 1:1:1 blend of xGnP ® M-5 graphene, xGnP M-25 graphene, and graphene nano-platelets, CAS# 7782-42-5, xGnP ® graphene commercially available from XG Sciences, graphene nano-platelets commercially available as PureWave Graphene (GNP) from Raymor NanoIntegris.

To prepare the acrylate component in Table 5, the SR399LV resin was weighed out into an unlined ½-pint aluminum paint can, and the additives were weighed out into a paper cup. The additives were slowly incorporated into the resin using a high-lift Cowles blade at low RPM. After the additives were combined, the RPM of the Cowles blade was increased slightly and the mixture was allowed to stir for 30 min. After 30 min, the catalyst solution was added to the pot using a syringe on a lab balance. The mixture was then stirred by hand, until homogeneous, and then stirred with the Cowles blade for an additional min. This procedure was carried out with each of four different additives to create four different formulations of the acrylate component, A1 through A4.

The constituents of the thiol component are shown in Table 6.

TABLE 6

Thiol component.

| Component | Part by Weight (g) | | | | |
|---|---|---|---|---|---|
| | B-1 | B-2 | B-3 | B-4 | B-5 |
| $^7$Thiocure ® PETMP | 100.00 | 100.00 | 100.00 | 100.00 | 100.00 |
| $^2$TPP Catalyst Solution | 3.33 | 3.33 | 3.33 | 3.33 | 3.33 |
| $^3$Aerosil ® 200 | 0.00 | 5.00 | 0.00 | 0.00 | 0.00 |
| $^4$Lo-Vel ™ 27 | 0.00 | 0.00 | 15.00 | 0.00 | 0.00 |
| $^5$Hi-Sil ™ EZ160G | 0.00 | 0.00 | 0.00 | 15.00 | 0.00 |
| $^6$Carbon Blend | 0.00 | 0.00 | 0.00 | 0.00 | 3.00 |

$^7$Thiocure ® PETMP, pentaerythritol tetra-3-mercaptopropionate, CAS# 7575-23-7, commercially available from Bruno Bock.

Using the amounts from Table 6, the thiol component was produced using the same procedure as described from the acrylate component. The procedure was carried out for each of four different additives to create four different formulations of the thiol component, B1 through B5.

All formulations were transferred from the ½-pint aluminum cans to 50 mL two-component cartridges from Nordson EFD for use in a two-component hand pump. The formulations were paired A-1 to B-1, A-2 to B-2, etc., until four total cartridges were filled. One at a time, a bayonet static mixer from Nordson EFD was attached to the end of the cartridge and the components combined and the coreactive thiol-ene composition extruded onto a sheet of polyethylene terephthalate (PET) in a 1:1 by volume ratio using the hand pump. The extruded material was then drawn down with a 50-mil bar and allowed to fully cure. All formulations were successfully extruded and drawn down, which suggested a high probability of success for 3D-printing applications.

The formulation gel times for the thiol-ene compositions are provided in Table 7.

TABLE 7

Gel times of thiol-ene composition

| Formulation | Gel Time (sec) |
|---|---|
| A-1 + B-1 | 25 |
| A-2 + B-2 | 25 |
| A-3 + B-3 | 45 |
| A-4 + B-4 | 45 |
| A-5 + B-5 | 25 |

Example 6

Thiol-Ene Coreactive Composition

The Michael donor component (a multifunctional acetylacetonate synthesized by PPG Industries, Inc.) was first weighed into a Max 300 L DAC cup from Flacktek. A catalyst solution containing 40 wt % 1,5,7-triazabicyclo[4.4.0]dec-5-ene in a solvent was added to the Michael donor solution to make the final catalyst concentration 4 wt %. The catalyst and Michael donor resin are mixed in a Flacktek Speedmixer™ at 2000 rpm with vacuum pressure at 5 psi, for 2 min.

The Michael acceptor component was prepared by adding 5 wt % Cab-O-Sil® TS720 to a proprietary multifunctional acrylate (synthesized by PPG Industries, Inc.) into a Max 300 L DAC cup. The mixture was then dispersed using a Flacktek Speedmixer™ at 2000 rpm with vacuum pressure at 5 psi, for 2 min.

The components were transferred from DAC cup to an Optimum cartridge via a Flacktek SpeedDisc and were suitable for printing by reactive extrusion using a ViscoTec 2 k extruder. Whereas particular embodiments of this invention have been described above for purposes of illustration, it will be evident to those skilled in the art that numerous variations of the details of the present invention may be made without departing from the invention as defined in the appended claims.

What is claimed is:

1. A method of reactive additive manufacturing, comprising:
   providing a first component comprising a first compound into a first pump;
   providing a second component comprising a second compound into a second pump,
      wherein the first compound is reactive with the second compound;
   pumping the first component from the first pump, and pumping the second component from the second pump through a mixer to provide a first coreactive composition; and
   depositing, by coextrusion, the first coreactive composition and a second coreactive composition;
      wherein the second coreactive composition comprises a compound that is reactive with the first component, the second component, or both the first and second components;
      wherein the first coreactive composition and the second coreactive composition are reactive at a temperature of less than 50° C.; and
      wherein the first component has a first viscosity;
      the second component has a second viscosity,
         wherein the first viscosity is within ±20% of the second viscosity,
         wherein viscosity is measured using an Anton Paar MCR 30 rheometer with a 1 mm gap at a plate temperature of 25° C. and a shear rate of 100 sec·1; and
      wherein the first coreactive composition and the second coreactive composition each have a tack free time of greater than 4 minutes.

2. The method of claim 1, wherein each of the first pump and the second pump comprises a progressive cavity pump.

3. The method of claim 1, wherein, the first component comprises two or more first compounds; and the second component comprises two or more second compounds.

4. The method of claim 3, wherein, the two or more first compounds comprise an average functionality of a first functional group from 2 to 6; and
   the two or more second compounds comprise an average functionality of a second functional group from 2 to 6,
      wherein the first functional group is reactive with the second functional group.

5. The method of claim 1, wherein the first component, the second component, or both the first and second components independently comprise a viscosity from 200 centipoise to 20,000,000 centipoise, measured using an Anton Paar MCR 302 rheometer with a gap from 1 mm at 25° C. and a shear rate of 100 sec·1.

6. The method of claim 1, wherein,
   the first compound comprises a first monomer, a first prepolymer, or a combination thereof;
   the second compound comprises a second monomer, a second prepolymer, or a combination thereof; and
   the first monomer and the first prepolymer is reactive with the second monomer and the second prepolymer.

7. The method of claim 1, wherein,
   the first compound comprises at least one first prepolymer;
   the second compound comprises at least one second prepolymer; and
   the at least one first prepolymer is reactive with the at least one second prepolymer.

8. The method of claim 1, wherein the first compound comprises a polyamine and the second compound comprises a polyisocyanate.

9. The method of claim 1, wherein the first compound comprises a polyalkenyl compound and the second compound comprises a polythiol.

10. The method of claim 1, wherein the first compound comprises a Michael acceptor and the second compound comprises a Michael donor.

11. The method of claim 1, wherein the first compound comprises a polyepoxide and the second compound comprises a polythiol.

12. The method of claim 1, wherein the first compound comprises a polyepoxide and the second compound comprises a polyamine.

13. The method of claim 1, wherein the coreactive composition comprises a dynamic viscosity from 200 centipoise to 20,000,000 centipoise, wherein the dynamic viscosity is measured using an Anton Paar MCR 302 rheometer with a 25 mm-diameter parallel plate spindle, an oscillation frequency of 1 Hz and amplitude of 0.3%, and with a rheometer plate temperature of 25° C.

14. The method of claim 1, wherein the coreactive composition is characterized by a gel time less than 5 minutes at 25° C.

15. The method of claim 1, wherein the first component, the second component, or both the first and second components independently comprise from 0.1 vol % to 95 vol % of a filler, wherein vol % is based on the total weight of the first component or the second component.

16. The method of claim 1, wherein depositing comprises extrusion.

17. An object formed using the method of claim 1.

18. The object of claim 17, wherein the object provides an attenuation of at least 10 dB within a frequency range between 1 MHz to 18 GHz.

19. The object of claim 17, wherein the object is characterized by a specific gravity less than 0.9.

20. The method of claim 1, wherein the first component, the second component, or both the first and second components independently comprise from 0.1 wt. % to 15 wt. % of a filler configured to modify at least one of the first viscosity, the second viscosity, and a combination of the first viscosity and second viscosity, wherein wt. % is based on the total weight of the first component or the second component.

* * * * *